(12) United States Patent
Suzuki

(10) Patent No.: US 11,901,829 B2
(45) Date of Patent: Feb. 13, 2024

(54) POWER CONVERTER

(71) Applicant: KABUSHIKI KAISHA TOYOTA JIDOSHOKKI, Kariya (JP)

(72) Inventor: Sadanori Suzuki, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/903,501

(22) Filed: Sep. 6, 2022

(65) Prior Publication Data

US 2023/0073818 A1 Mar. 9, 2023

(30) Foreign Application Priority Data

Sep. 7, 2021 (JP) .................................. 2021-145589

(51) Int. Cl.
| | |
|---|---|
| H02M 7/53 | (2006.01) |
| H02M 3/335 | (2006.01) |
| H02M 1/42 | (2007.01) |
| H02M 1/08 | (2006.01) |
| H02M 1/00 | (2006.01) |

(52) U.S. Cl.
CPC ....... *H02M 3/33592* (2013.01); *H02M 1/083* (2013.01); *H02M 1/42* (2013.01); *H02M 1/0058* (2021.05)

(58) Field of Classification Search
CPC ............ H02M 7/42; H02M 7/44; H02M 7/48; H02M 7/53; H02M 7/537; H02M 7/5387; H02M 7/53871; H02M 7/66; H02M 7/68; H02M 7/79; H02M 7/797
See application file for complete search history.

(56) References Cited

U.S. PATENT DOCUMENTS

| | | | |
|---|---|---|---|
| 9,369,064 B2 * | 6/2016 | Chen ...................... | H02M 3/335 |
| 2016/0308457 A1 * | 10/2016 | Yuzurihara ............. | H02M 1/34 |
| 2017/0025962 A1 | 1/2017 | Davidson | |
| 2022/0294228 A1 * | 9/2022 | Mozaffari ............... | H02J 3/381 |

FOREIGN PATENT DOCUMENTS

JP 2014-007904 A 1/2014

OTHER PUBLICATIONS

Kwang-Seop Kim et al.," Bidirectional Single Power-Conversion DC-AC Converter With Noncomplementary Active-Clamp Circuits," IEEE Transactions on Industrial Electronics, vol. 63, No. 8, Aug. 1, 2016, pp. 4860-4867 (8 pages total), XP011616276, ISSN: 0278-0046.

* cited by examiner

*Primary Examiner* — Gary L Laxton
(74) *Attorney, Agent, or Firm* — Sughrue Mion, PLLC

(57) ABSTRACT

A power converter includes an alternating-current-side circuit, a direct-current-side inductor, an alternating-current-side inductor, a direct-current-side circuit, a controlling unit, a transformer, a direct-current-side capacitor, and an alternating-current-side capacitor. The alternating-current-side circuit includes an alternating-current-side buffer circuit and a bridge circuit, and is connected to an alternating-current-side winding of the transformer via the alternating-current-side capacitor. The direct-current-side circuit includes a direct-current-side buffer circuit and a rectification switching element, and is connected to a direct-current-side winding of the transformer via the direct-current-side capacitor. The controlling unit controls switching of the switching elements.

6 Claims, 32 Drawing Sheets

POWER CONVERTER

BACKGROUND

1. Field

The present disclosure relates to a power converter.

2. Description of Related Art

A bidirectional power converter insulates an input side and an output side from each other, converts a direct-current voltage to an alternating-current voltage, and converts an alternating-current voltage to a direct-current voltage. For example, a bidirectional power converter disclosed in Japanese Laid-Open Patent Publication No. 2014-7904 includes a transformer and a total of three full-bridge circuits: one on the direct-current side of the transformer and two on the alternating-current side of the transformer. When converting an alternating-current voltage to a direct-current voltage, the power converter disclosed in Japanese Laid-Open Patent Publication No. 2014-7904 converts the alternating-current voltage to the direct-current voltage while performing power-factor correction in the full-bridge circuit to which the alternating-current voltage is fed directly. Subsequently, the power converter converts the direct-current voltage to a high-frequency alternating-current voltage in the full-bridge circuit that is connected to an alternating-current-side winding of the transformer. The power converter then transfers the high-frequency alternating-current voltage to the direct current side with the alternating-current side and the direct-current side being insulated from each other by the transformer. The high-frequency alternating-current voltage is again converted to a direct-current voltage in the full-bridge circuit on the direct-current side. When converting a direct-current voltage to an alternating-current voltage, the power converter converts an applied direct-current voltage to a high-frequency alternating-current voltage in the full-bridge circuit on the direct-current side of the transformer, and transfers the high-frequency alternating-current voltage to the alternating-current side with the alternating-current side and the direct-current side being insulated from each other by the transformer. The high-frequency alternating-current voltage is converted to a direct-current voltage in the full-bridge circuit connected to the alternating-current-side winding of the transformer. The direct-current voltage is converted to a desired alternating-current voltage in the other full-bridge circuit on the alternating-current side.

Since the conventional technique uses a total of three bridge circuits, it is difficult to reduce the number of active components. Active component is a general term for switching elements and rectifiers.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a power converter includes a transformer, a direct-current-side capacitor, an alternating-current-side capacitor, a direct-current-side circuit, and an alternating-current-side circuit. The transformer includes a direct-current-side winding and an alternating-current-side winding. The direct-current-side circuit includes a direct-current-side inductor, a rectification switching element, first and second direct-current connection terminals forming a pair, and a direct-current-side buffer circuit. The alternating-current-side circuit includes first and second alternating-current connection terminals forming a pair, an alternating-current-side inductor, a first upper arm switching element, a second upper arm switching element, a first lower arm switching element, a second lower arm switching element, and alternating-current-side buffer circuit. A series connection of the first upper arm switching element and the first lower arm switching element and a series connection of the second upper arm switching element and the second lower arm switching element form a bridge circuit. A node between the first upper arm switching element and the first lower arm switching element and a node between the second upper arm switching element and the second lower arm switching element are connected to each other via the first and second alternating-current connection terminals and the alternating-current-side inductor. The direct-current-side buffer circuit includes a direct-current-side buffer switching element and a direct-current-side buffer capacitor. The alternating-current-side buffer circuit includes an alternating-current-side buffer switching element and an alternating-current-side buffer capacitor and is connected in parallel with the bridge circuit. The direct-current-side circuit is connected to the direct-current-side winding of the transformer via the direct-current-side capacitor. The alternating-current-side circuit is connected to the alternating-current-side winding of the transformer via the alternating-current-side capacitor.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A first embodiment of the present disclosure will now be described with reference to the drawings. A power converter 1 according to the present embodiment converts a direct-current voltage supplied by a direct-current power supply V2 to an alternating-current voltage and supplies it to a load (not shown) connected to the power converter 1.

Figure 1:
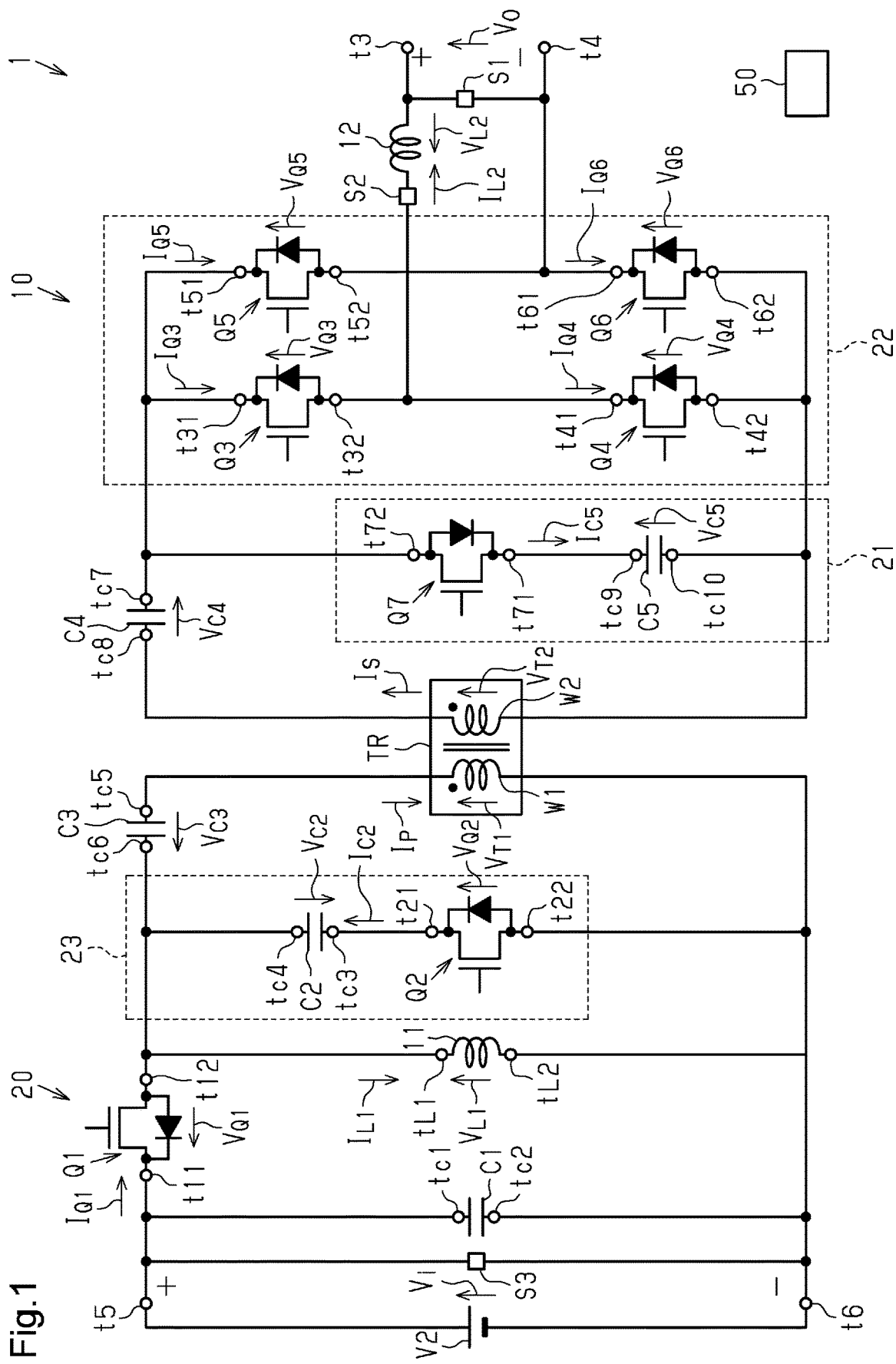
FIG. 1 is a diagram showing one example of a configuration of a power converter 1.

As shown in FIG. 1, the power converter 1 includes, for example, an alternating-current-side circuit 10, a direct-current-side circuit 20, a controlling unit 50, a direct-current-side capacitor C3, an alternating-current-side capacitor C4, and a transformer TR.

[Alternating-Current-Side Circuit 10]

The alternating-current-side circuit 10 includes, for example, an alternating-current-side inductor 12, a first alternating-current connection terminal t3, a second alternating-current connection terminal t4, an alternating-current-side buffer circuit 21, and a bridge circuit 22. The bridge circuit 22 includes a first upper arm switching element Q3, a first lower arm switching element Q4, a second upper arm switching element Q5, and a second lower arm switching element Q6.

The first upper arm switching element Q3 includes a first terminal t31 and a second terminal t32, and the first lower arm switching element Q4 includes a first terminal t41 and a second terminal t42. The second terminal t32 of the first upper arm switching element Q3 and the first terminal t41 of the first lower arm switching element Q4 are connected to each other. Thus, the first upper arm switching element Q3 and the first lower arm switching element Q4 are connected in series. The first upper arm switching element Q3 and the first lower arm switching element Q4 are n-channel power MOSFETs in the present embodiment in which the first terminals t31, t41 serve as drains, and the second terminals t32, t42 serve as sources. The first upper arm switching element Q3 and the first lower arm switching element Q4 are not limited to MOSFETs, but may be any devices such as IGBTs having antiparallel diodes.

The second upper arm switching element Q5 includes a first terminal t51 and a second terminal t52, and the second lower arm switching element Q6 includes a first terminal t61 and a second terminal t62. The second terminal t52 of the second upper arm switching element Q5 and the first terminal t61 of the second lower arm switching element Q6 are connected to each other. Thus, the second upper arm switching element Q5 and the second lower arm switching element Q6 are connected in series. The second upper arm switching element Q5 and the second lower arm switching element Q6 are n-channel power MOSFETs in the present embodiment in which the first terminals t51, t61 serve as drains, and the second terminals t52, t62 serve as sources. The second upper arm switching element Q5 and the second lower arm switching element Q6 are not limited to MOSFETs, but may be any devices such as IGBTs having antiparallel diodes.

The switching elements Q3 to Q6 respectively include body diodes. The cathodes of the body diodes are respectively connected to the first terminals of the switching elements Q3 to Q6, and the anodes of the body diodes are respectively connected to the second terminals of the switching elements Q3 to Q6. The series connection of the first upper arm switching element Q3 and the first lower arm switching element Q4 and the series connection of the second upper arm switching element Q5 and the second lower arm switching element Q6 form the bridge circuit 22.

The first alternating-current connection terminal t3 is connected to a node between the first upper arm switching element Q3 and the first lower arm switching element Q4 via the alternating-current-side inductor 12. The second alternating-current connection terminal t4 is connected to a node between the second upper arm switching element Q5 and the second lower arm switching element Q6. Thus, the node between the switching elements Q3 and Q4 and the first alternating-current connection terminal t3 are connected to each other via the alternating-current-side inductor 12, and the node between the switching elements Q5 and Q6 and the second alternating-current connection terminal t4 are connected to each other.

The transformer TR is an isolation transformer that includes a direct-current-side winding W1 and an alternating-current-side winding W2. A head of the alternating-current-side winding W2 (an end marked with a black circle in FIG. 1) is connected to the first terminal t31 of the first upper arm switching element Q3 and to the first terminal t51 of the second upper arm switching element Q5 via the alternating-current-side capacitor C4.

Specifically, the alternating-current-side capacitor C4 includes a first terminal tc7 and a second terminal tc8. The head of the alternating-current-side winding W2 is connected to the second terminal tc8 of the alternating-current-side capacitor C4, and the first terminal tc7 of the alternating-current-side capacitor C4 is connected to the first terminal t31 of the first upper arm switching element Q3 and to the first terminal t51 of the second upper arm switching element Q5. A tail of the alternating-current-side winding W2 (an end without a black circle in FIG. 1) is connected to the second terminal t42 of the first lower arm switching element Q4 and to the second terminal t62 of the second lower arm switching element Q6. The alternating-current-side circuit 10 is connected to the alternating-current-side winding W2 of the transformer TR via the alternating-current-side capacitor C4.

The "head" and the "tail" of the alternating-current-side winding W2 are terms used for illustrative purposes only in order to indicate polarities of the wiring (indicated by presence or absence of a black circle) and are not related to the actual beginning or ending of winding in the manufacture.

[Alternating-Current-Side Buffer Circuit 21]

The alternating-current-side buffer circuit 21 includes an alternating-current-side buffer switching element Q7 and an alternating-current-side buffer capacitor C5. The alternating-current-side buffer switching element Q7 and the alternating-current-side buffer capacitor C5 are connected in series. The alternating-current-side buffer switching element Q7 includes a first terminal t71 and a second terminal t72, and the alternating-current-side buffer capacitor C5 includes a first terminal tc9 and a second terminal tc10. The first terminal t71 of the alternating-current-side buffer switching element Q7 and the first terminal tc9 of the alternating-current-side buffer capacitor C5 are connected to each other. The alternating-current-side buffer switching element Q7 includes a body diode. The anode of the body diode of the alternating-current-side buffer switching element Q7 is connected to the second terminal t72, and the cathode of the body diode of the alternating-current-side buffer switching element Q7 is connected to the first terminal t71.

The alternating-current-side buffer circuit 21 and the bridge circuit 22 are connected in parallel. Specifically, the second terminal t72 of the alternating-current-side buffer switching element Q7 is connected to the node between the first terminal t31 of the first upper arm switching element Q3 and the first terminal t51 of the second upper arm switching element Q5. Also, the second terminal tc10 of the alternating-current-side buffer capacitor C5 is connected to the node between the second terminal t42 of the first lower arm switching element Q4 and the second terminal t62 of the second lower arm switching element Q6.

[Direct-Current-Side Circuit 20]

The direct-current-side circuit 20 includes a direct-current-side inductor 11, a direct-current-side buffer circuit 23, a rectification switching element Q1, a smoothing capacitor C1, a first direct-current connection terminal t5, and a second connection terminal t6. The direct-current power supply V2 and the direct-current-side circuit 20 are electrically connected to each other. Specifically, one end, or a first end of the direct-current power supply V2 is connected to the first direct-current connection terminal t5 of the direct-current-side circuit 20. Another end, or a second end of the direct-current power supply V2 is connected to the second connection terminal t6 of the direct-current-side circuit 20. Accordingly, a direct-current voltage is applied between the direct-current connection terminals t5 and t6.

The rectification switching element Q1 includes a first terminal t11 and a second terminal t12. In the present embodiment, the rectification switching element Q1 is an n-channel power MOSFET in which the first terminal t1 serves as a drain and the second terminal t12 serves as a source. The rectification switching element Q1 is not limited to a MOSFET, but may be any device such as an IGBT having an antiparallel diode. The direct-current-side inductor 11 includes a first terminal tL1 and a second terminal tL2. The first terminal tL1 is one example of "one end, or a first end of a direct-current-side inductor," and the second terminal tL2 is one example of "an other end, or a second end of the direct-current-side inductor." The smoothing capacitor C1 includes a first terminal tc1 and a second terminal tc2. The first terminal tc1 is one example of "one end, or a first end of a smoothing capacitor, and the second terminal tc2 is one example of "an other end, or a second end of the smoothing capacitor."

The first terminal tc1 of the smoothing capacitor C1 is connected to the first direct-current connection terminal t5. The second terminal tc2 of the smoothing capacitor C1 is connected to the second direct-current connection terminal t6.

The direct-current-side inductor 11 is connected to both of the rectification switching element Q1 and the second connection terminal t6. Specifically, the first terminal tL1 of the direct-current-side inductor 11 is connected to the second terminal t12 of the rectification switching element Q1, and the second terminal tL2 of the direct-current-side inductor 11 is connected to the second connection terminal t6.

The rectification switching element Q1 is connected to the direct-current-side inductor 11 and to the smoothing capacitor C1. Specifically, the second terminal t12 of the rectification switching element Q1 and the first terminal tL1 of the direct-current-side inductor 11 are connected to each other. Also, the first terminal t1 of the rectification switching element Q1 and the first terminal tc1 of the smoothing capacitor C1 are connected to each other.

A head of the direct-current-side winding W1 (an end marked with a black circle in FIG. 1) is connected to the first terminal tL1 of the direct-current-side inductor 11 and to the second terminal t12 of the rectification switching element Q1 via the direct-current-side capacitor C3. Specifically, the direct-current-side capacitor C3 includes a first terminal tc5 and a second terminal tc6. The head of the direct-current-side winding W1 is connected to the first terminal tc5 of the direct-current-side capacitor C3, and the second terminal tc6 of the direct-current-side capacitor C3 is connected to the first terminal tL1 of the direct-current-side inductor 11 and to the second terminal t12 of the rectification switching element Q1. A tail of the direct-current-side winding W1 (an end without a black circle in FIG. 1) is connected to the second terminal tL2 of the direct-current-side inductor 11. The direct-current-side circuit 20 is connected to the direct-current-side winding W1 of the transformer TR via the direct-current-side capacitor C3.

The "head" and the "tail" of the alternating-current-side winding W2 are terms used for illustrative purposes only in order to indicate polarities of the wiring (indicated by presence or absence of a black circle) and are not related to the actual beginning or ending of winding in the manufacture.

[Direct-Current-Side Buffer Circuit 23]

The direct-current-side buffer circuit 23 includes a direct-current-side buffer switching element Q2 and a direct-current-side buffer capacitor C2. The direct-current-side buffer switching element Q2 and the direct-current-side buffer capacitor C2 are connected in series. The direct-current-side buffer switching element Q2 includes a first terminal t21 and a second terminal t22, and the direct-current-side buffer capacitor C2 includes a first terminal tc3 and a second terminal tc4. The first terminal t21 of the direct-current-side buffer switching element Q2 and the first terminal tc3 of the direct-current-side buffer capacitor C2 are connected to each other. The direct-current-side buffer switching element Q2 includes a body diode. The anode of the body diode of the direct-current-side buffer switching element Q2 is connected to the second terminal t22, and the cathode of the body diode of the direct-current-side buffer switching element Q2 is connected to the first terminal t21.

The direct-current-side buffer circuit 23 and the direct-current-side inductor 11 are connected in parallel. Specifically, the second terminal t22 of the direct-current-side buffer switching element Q2 is connected to the second terminal tL2 of the direct-current-side inductor 11. Also, the second terminal tc4 of the direct-current-side buffer capacitor C2 and the first terminal tL1 of the direct-current-side inductor 11 are connected to each other.

[Controlling Unit 50]

As shown in FIG. 1, the power converter 1 includes a voltage sensor S1 that detects a voltage between the first alternating-current connection terminal t3 and the second alternating-current connection terminal t4, a current sensor S2 that detects a current flowing through the alternating-current-side inductor 12, and a voltage sensor S3 that detects a voltage between the first direct-current connection terminal t5 and the second direct-current connection terminal t6. The voltage sensor S1, the current sensor S2, and the voltage sensor S3 output detection results to the controlling unit 50.

The controlling unit 50 controls the switching elements Q1 to Q7 between a conducting state (ΦON state) and a non-conducting state (ΦOFF state) based on signals from the voltage sensor S1, the current sensor S2, and the voltage sensor S3.

The power converter 1 switches the respective switching elements Q1 to Q7 between the conducting state and the non-conducting state, so as to convert the direct-current voltage supplied by the direct-current power supply V2 to an alternating-current voltage, and outputs the alternating-current voltage from the first and second alternating-current connection terminals t3, t4, which form a pair.

[Currents and Voltages at Several Parts]

For illustrative purposes, voltages in the power converter 1 and currents flowing through the power converter 1 are denoted in the following manner. A voltage between the alternating-current connection terminals t3 and t4 is defined as an alternating-current voltage Vo. Since the voltage between the alternating-current connection terminals t3 and t4 is an alternating-current voltage, there are times when the electric potential of the first alternating-current connection terminal t3 is higher than the electric potential of the second alternating-current connection terminal t4, and times when the electric potential of the first alternating-current connection terminal t3 is lower than the electric potential of the second alternating-current connection terminal t4. When the electric potential of the first alternating-current connection terminal t3 is higher than the electric potential of the second alternating-current connection terminal t4, the alternating-current voltage Vo is defined to have a positive polarity. When the electric potential of the second alternating-current connection terminal t4 is higher than the electric potential of the first alternating-current connection terminal t3, the alternating-current voltage Vo is defined to have a negative polarity. A voltage between opposite ends of the alternating-current-side inductor 12 is defined as an alternating-current-side inductor voltage $V_{L2}$. Specifically, when the electric potential at the end corresponding to the alternating-current-side circuit 10 is higher than the electric potential at the end corresponding to the first alternating-current connection terminal t3, the alternating-current-side inductor voltage $V_{L2}$ is defined to be positive. Also, a direction from the alternating-current-side circuit 10 toward the first alternating-current connection terminal t3 is defined as a positive direction of an alternating-current-side inductor current $I_{L2}$.

A voltage between opposite ends of the first upper arm switching element Q3 is defined as a first upper arm switching element voltage $V_{Q3}$. Specifically, when the electric potential of the first terminal t31 is higher than the electric potential of the second terminal t32, the first upper arm switching element voltage $V_{Q3}$ is defined to be positive. Also, a direction from the first terminal t31 toward the second terminal t32 is defined as a positive direction of a first upper arm switching element current $I_{Q3}$. A voltage between opposite ends of the first lower arm switching element Q4 is defined as a first lower arm switching element voltage $V_{Q4}$. Specifically, when the electric potential of the first terminal t41 is higher than the electric potential of the second terminal t42, the first lower arm switching element voltage $V_{Q4}$ is defined to be positive. Also, a direction from the first terminal t41 toward the second terminal t42 is defined as a positive direction of a first lower arm switching element current $I_{Q4}$.

A voltage between opposite ends of the second upper arm switching element Q5 is defined as a second upper arm switching element voltage $V_{Q5}$. Specifically, when the electric potential of the first terminal t51 is higher than the electric potential of the second terminal t52, the second upper arm switching element voltage $V_{Q5}$ is defined to be positive. Also, a direction from the first terminal t51 toward the second terminal t52 is defined as a positive direction of a second upper arm switching element current IQs. A voltage between opposite ends of the second lower arm switching element Q6 is defined as a second lower arm switching element voltage $V_{Q6}$. Specifically, when the electric potential of the first terminal t61 is higher than the electric potential of the second terminal t62, the second lower arm switching element voltage $V_{Q6}$ is defined to be positive. Also, a direction from the first terminal t61 toward the second terminal t62 is defined as a positive direction of a second lower arm switching element current $I_{Q6}$.

A voltage between opposite ends of the alternating-current-side buffer capacitor C5 is defined as an alternating-current-side buffer capacitor voltage $V_{C5}$. Specifically, when the electric potential of the first terminal tc9 is higher than the electric potential of the second terminal tc10, the alternating-current-side buffer capacitor voltage $V_{C5}$ is defined to be positive. A direction from the first terminal tc9 toward the second terminal tc10 of the alternating-current-side buffer capacitor C5 is defined as a positive direction of an alternating-current-side buffer capacitor current $I_{C5}$. A voltage between opposite ends of the alternating-current-side capacitor C4 is defined as an alternating-current-side capacitor voltage $V_{C4}$. Specifically, when the electric potential of the first terminal tc7 is higher than the electric potential of the second terminal tc8, the alternating-current-side capacitor voltage $V_{C4}$ is defined to be positive.

A voltage between opposite ends of the alternating-current-side winding W2 is defined as an alternating-current-side winding voltage $V_{T2}$. Specifically, when the electric potential at the head of the alternating-current-side winding W2 is higher than the electric potential at the tail of the alternating-current-side winding W2, the alternating-current-side winding voltage $V_{T2}$ is defined to be positive. A direction from the tail toward the head of the alternating-current-side winding W2 is defined as a positive direction of an alternating-current-side winding current Is.

A voltage between opposite ends of the direct-current-side winding W1 is defined as a direct-current-side winding voltage $V_{T1}$. Specifically, when the electric potential at the head of the direct-current-side winding W1 is higher than the electric potential at the tail of the direct-current-side winding W1, the direct-current-side winding voltage $V_{T1}$ is defined to be positive. A direction from the head toward the tail of the direct-current-side winding W1 is defined as a positive direction of a direct-current-side winding current Ip.

A voltage between opposite ends of the direct-current-side capacitor C3 is defined as a direct-current-side capacitor voltage $V_{C3}$. Specifically, when the electric potential of the second terminal tc6 is higher than the electric potential of the first terminal tc5, the direct-current-side capacitor voltage $V_{C3}$ is defined to be positive.

A voltage between opposite ends of the direct-current-side buffer switching element Q2 is defined as a direct-current-side buffer switching element voltage $V_{Q2}$. Specifically, when the electric potential of the first terminal t21 is higher than the electric potential of the second terminal t22, the direct-current-side buffer switching element voltage $V_{Q2}$ is defined to be positive. A voltage between opposite ends of the direct-current-side buffer capacitor C2 is defined as a direct-current-side buffer capacitor voltage $V_{C2}$. Specifically, when the electric potential of the first terminal tc3 is higher than the electric potential of the second terminal tc4, the direct-current-side buffer capacitor voltage $V_{C2}$ is defined to be positive. A direction from the first terminal tc3 toward the second terminal tc4 of the direct-current-side buffer capacitor C2 is defined as a positive direction of a direct-current-side buffer capacitor current $I_{C2}$.

A voltage between opposite ends of the direct-current-side inductor 11 is defined as a direct-current-side inductor voltage $V_{L1}$. Specifically, the direct-current-side inductor voltage $V_{L1}$ is defined to be positive when the electric potential of the first terminal $t_{L1}$ is higher than the electric potential of the second terminal tL2. A direction from the first terminal $t_{L1}$ toward the second terminal tL2 of the direct-current-side inductor 11 is defined as a positive direction of a direct-current-side inductor current $I_{L1}$.

A voltage between opposite ends of the rectification switching element Q1 is defined as a rectification switching element voltage $V_{Q1}$. Specifically, when the electric potential of the first terminal t1 is higher than the electric potential of the second terminal t12, the rectification switching element voltage $V_{Q1}$ is defined to be positive. Also, a direction from the first terminal t11 toward the second terminal t12 of the rectification switching element Q1 is defined as a positive direction of a rectification switching element current $I_{Q1}$. A voltage applied to the power converter 1 by the direct-current power supply V2 is defined as a direct-current voltage Vi.

[Detailed Description of Switching Control by Controlling Unit 50]

Combinations of conducting states and non-conducting states of the switching elements Q1 to Q7 are referred to as switching patterns. The present embodiment has eleven switching patterns: a first pattern α1 to an eleventh pattern α11. A series of switching actions for changing the switching pattern in the order of α1, α2, α3, α4, α5, α6, α7, α8, α9, α10, α11, and back to α1 is regarded as one unit. The controlling unit 50 executes a switching control by repeatedly performing the unit of switching actions at a specific cycle (switching cycle). The switching cycle is sufficiently short in relation to the cycle of the alternating-current voltage Vo. For example, the cycle of the alternating-current voltage Vo is 20 ms, whereas the switching cycle is 10 μs.

The first pattern α1 is a switching pattern in which the rectification switching element Q1, the first upper arm switching element Q3, the second lower arm switching element Q6, and the alternating-current-side buffer switching element Q7 are in the conducting state, and the direct-current-side buffer switching element Q2, the first lower arm switching element Q4, and the second upper arm switching element Q5 are in the non-conducting state.

The second pattern α2 is a switching pattern in which the rectification switching element Q1 and the alternating-current-side buffer switching element Q7 are in the conducting state, and the direct-current-side buffer switching element Q2, the first upper arm switching element Q3, the first lower arm switching element Q4, the second upper arm switching element Q5, and the second lower arm switching element Q6 are in the non-conducting state.

The third pattern α3 is a switching pattern in which the rectification switching element Q1, the first lower arm switching element Q4, the second upper arm switching element Q5, and the alternating-current-side buffer switching element Q7 are in the conducting state, and the direct-current-side buffer switching element Q2, the first upper arm switching element Q3, and the second lower arm switching element Q6 are in the non-conducting state.

The fourth pattern α4 is a switching pattern in which the rectification switching element Q1 and the alternating-current-side buffer switching element Q7 are in the conducting state, and the direct-current-side buffer switching element Q2, the first upper arm switching element Q3, the first lower arm switching element Q4, the second upper arm switching element Q5, and the second lower arm switching element Q6 are in the non-conducting state.

The fifth pattern α5 is a switching pattern in which the rectification switching element Q1, the first upper arm switching element Q3, and the alternating-current-side buffer switching element Q7 are in the conducting state, and the direct-current-side buffer switching element Q2, the first lower arm switching element Q4, the second upper arm switching element Q5, and the second lower arm switching element Q6 are in the non-conducting state.

The sixth pattern α6 is a switching pattern in which the rectification switching element Q1 and the first upper arm switching element Q3 are in the conducting state, and the direct-current-side buffer switching element Q2, the first lower arm switching element Q4, the second upper arm switching element Q5, the second lower arm switching element Q6, and the alternating-current-side buffer switching element Q7 are in the non-conducting state.

The seventh pattern α7 is a switching pattern in which the first upper arm switching element Q3 is in the conducting state, and the rectification switching element Q1, the direct-current-side buffer switching element Q2, the first lower arm switching element Q4, the second upper arm switching element Q5, the second lower arm switching element Q6, and the alternating-current-side buffer switching element Q7 are in the non-conducting state.

The eighth pattern α8 is a switching pattern in which the direct-current-side buffer switching element Q2 and the first upper arm switching element Q3 are in the conducting state, and the rectification switching element Q1, the first lower arm switching element Q4, the second upper arm switching element Q5, the second lower arm switching element Q6, and the alternating-current-side buffer switching element Q7 are in the non-conducting state.

The ninth pattern α9 is a switching pattern in which the first upper arm switching element Q3 is in the conducting state, and the rectification switching element Q1, the direct-current-side buffer switching element Q2, the first lower arm switching element Q4, the second upper arm switching element Q5, the second lower arm switching element Q6, and the alternating-current-side buffer switching element Q7 are in the non-conducting state.

The tenth pattern α10 is a switching pattern in which the rectification switching element Q1 and the first upper arm switching element Q3 are in the conducting state, and the direct-current-side buffer switching element Q2, the first lower arm switching element Q4, the second upper arm switching element Q5, the second lower arm switching element Q6, and the alternating-current-side buffer switching element Q7 are in the non-conducting state.

The eleventh pattern α11 is a switching pattern in which the rectification switching element Q1, the first upper arm switching element Q3, and the alternating-current-side buffer switching element Q7 are in the conducting state, and the direct-current-side buffer switching element Q2, the first lower arm switching element Q4, the second upper arm switching element Q5, and the second lower arm switching element Q6 are in the non-conducting state.

Operation of the power converter 1 will now be described with reference to FIGS. 2 to 14. In the description of the first embodiment below, a state in which an alternating-current potential is positive refers to a state in which the alternating-current voltage Vo output by the power converter 1 has a positive polarity, and a state in which the alternating-current potential is negative refers to a state in which the alternating-current voltage Vo output by the power converter 1 has a negative polarity.

An action of causing the alternating-current potential to be negative is the same as an action of causing the alternating-current potential to be positive except that the action of the first upper arm switching element Q3 and the action of the second upper arm switching element Q5 are interchanged, and the action of the first lower arm switching element Q4 and the action of the second lower arm switching element Q6 are interchanged.

Accordingly, the action of causing the alternating-current potential to be positive will be described, and description of the action of causing the alternating-current potential to be negative will be omitted.

For illustrative purposes, it is assumed that the power converter 1 is in a steady state when the power converter 1 starts operating. That is, it is assumed that the capacitors C1 to C5 are each charged with a corresponding voltage. Also, it is assumed that a current is flowing through each of the direct-current-side inductor 11, the direct-current-side winding W1 of the transformer TR, and the alternating-current-side winding W2 of the transformer TR, the alternating-current-side inductor 12. The direct-current-side circuit 20, the direct-current-side capacitor C3, and the direct-current-side winding W1 are also referred to as a direct-current side of the power converter 1, and the alternating-current-side circuit 10, the alternating-current-side capacitor C4, and the alternating-current-side winding W2 are also referred to as an alternating-current side of the power converter 1.

The controlling unit 50 repeatedly executes the switching control in which the switching pattern is changed from the first pattern α1, then sequentially changed from the second pattern α2 to the eleventh pattern α11, and back to the first pattern α1. This shifts the state of the power converter 1 from a first state Φ1 to a thirteenth state Φ13. Each of these states will now be described.

[First State Φ1]

Figure 2:
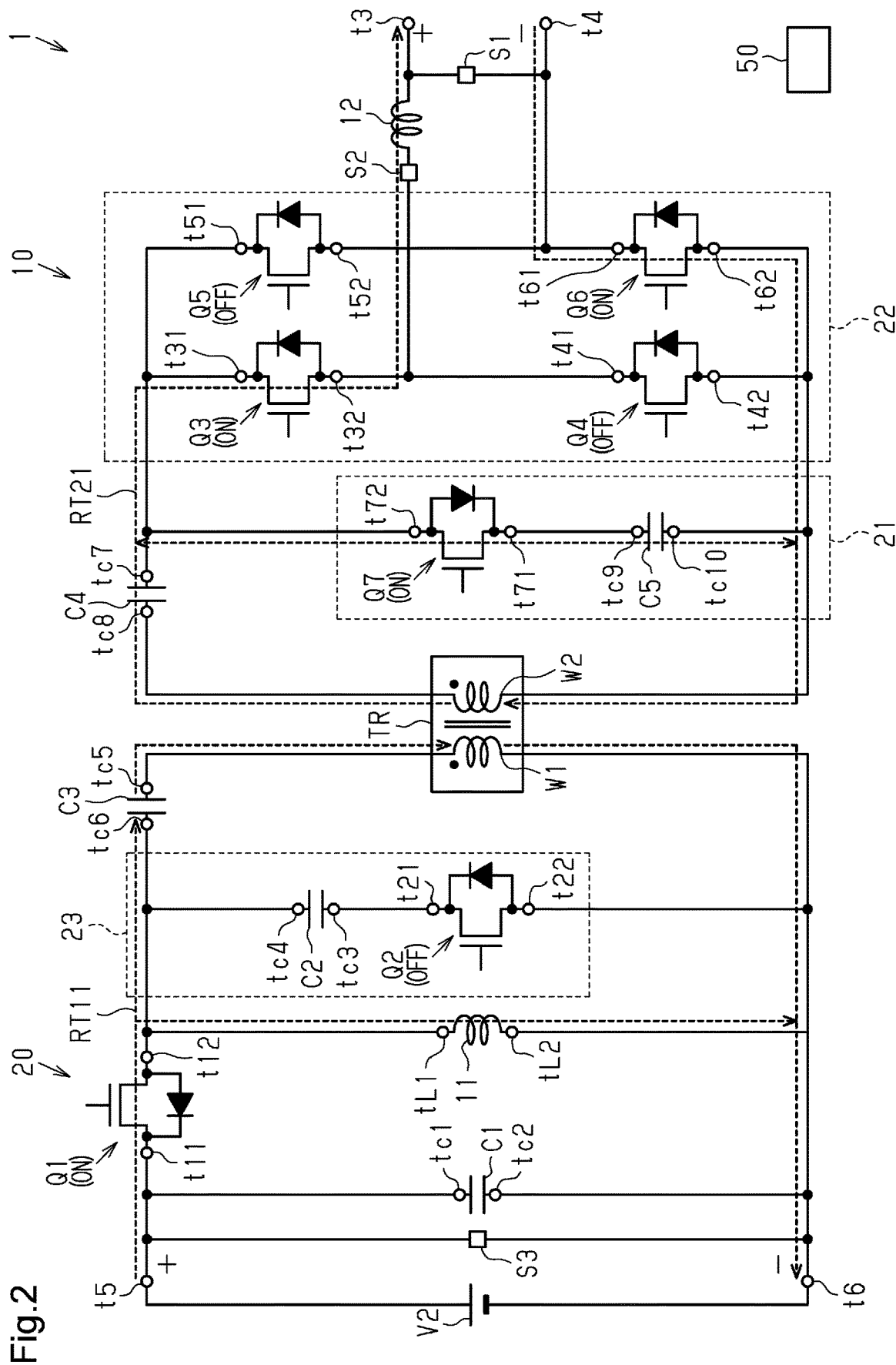
FIG. 2 is a diagram showing one example of the power converter 1 in a first state $\Phi 1$.

The first state Φ1 shown in FIG. 2 is a state in which the controlling unit 50 has set the switching pattern to the first pattern α1. In the first state Φ1, a current flows through a current path RT11, which is created by supply of power from the direct-current power supply V2, on the direct-current side of the power converter 1 as shown in FIG. 2.

The current path RT11 includes a first path and a second path. The first path leads from the positive terminal of the direct-current power supply V2 to the negative terminal of the direct-current power supply V2 via the first direct-current connection terminal t5, the rectification switching element Q1, the direct-current-side capacitor C3, the direct-current-side winding W1, and the second connection terminal t6. That is, the direct-current-side winding current Ip in the positive direction flows through the first path. The second path branches from the first path at the node between the second terminal t12, the second terminal tc4, and the second terminal tc6, and joins the first path via the direct-current-side inductor 11. In the first state Φ1, the direct-current voltage Vi of the direct-current power supply V2 is applied to the opposite ends of the direct-current-side inductor 11 in the positive direction. This increases the direct-current-side inductor current $I_{L1}$. The direct-current-side winding voltage $V_{T1}$ is applied to the opposite ends of the direct-current-side winding W1 in the positive direction. The direct-current-side winding current Ip in the positive direction flows through the current path RT11, so that the direct-current-side capacitor C3 is charged.

In the first state Φ1, a current flows through the current path RT21 on the alternating-current side of the power converter 1. The current path RT21 leads from the head of the alternating-current-side winding W2 to the tail of the alternating-current-side winding W2 via the alternating-current-side capacitor C4, the first upper arm switching element Q3, the alternating-current-side inductor 12, the load connected to the alternating-current connection terminals t3, t4, and the second lower arm switching element Q6. That is, the alternating-current-side winding current Is in the positive direction flows through the current path RT21. The direct-current-side winding voltage $V_{T1}$ in the positive direction applied to the opposite ends of the direct-current-side winding W1 of the transformer TR generates the alternating-current-side winding voltage $V_{T2}$ in the positive direction at the opposite ends of the alternating-current-side winding W2, so that the alternating-current-side winding current Is in the positive direction flows through the current path RT21. As the current flows through current path RT21, the alternating-current-side capacitor C4 is discharged. The voltage difference between the alternating-current-side buffer capacitor voltage $V_{C5}$ and the alternating-current voltage Vo is applied to the alternating-current-side inductor 12 in the positive direction. This increases the alternating-current-side inductor current $I_{L2}$, so that the alternating-current voltage Vo increases.

The current difference between the alternating-current-side winding current Is and the alternating-current-side inductor current $I_{L2}$ flows through the alternating-current-side buffer capacitor C5. Specifically, when the alternating-current-side inductor current $I_{L2}$ is greater than the alternating-current-side winding current Is, the alternating-current-side buffer capacitor current $I_{C5}$ flows in the negative direction. When the alternating-current-side winding current Is is greater than the alternating-current-side inductor current $I_{L2}$, the alternating-current-side buffer capacitor current $I_{C5}$ flows in the positive direction. The alternating-current-side buffer capacitor current $I_{C5}$ in the positive direction charges the alternating-current-side buffer capacitor C5. In the first state Φ1, since the alternating-current-side buffer switching element Q7 is set to the conducting state, the alternating-current-side buffer capacitor current $I_{C5}$ flows through the alternating-current-side buffer switching element Q7.

[Second State Φ2]

Figure 3:
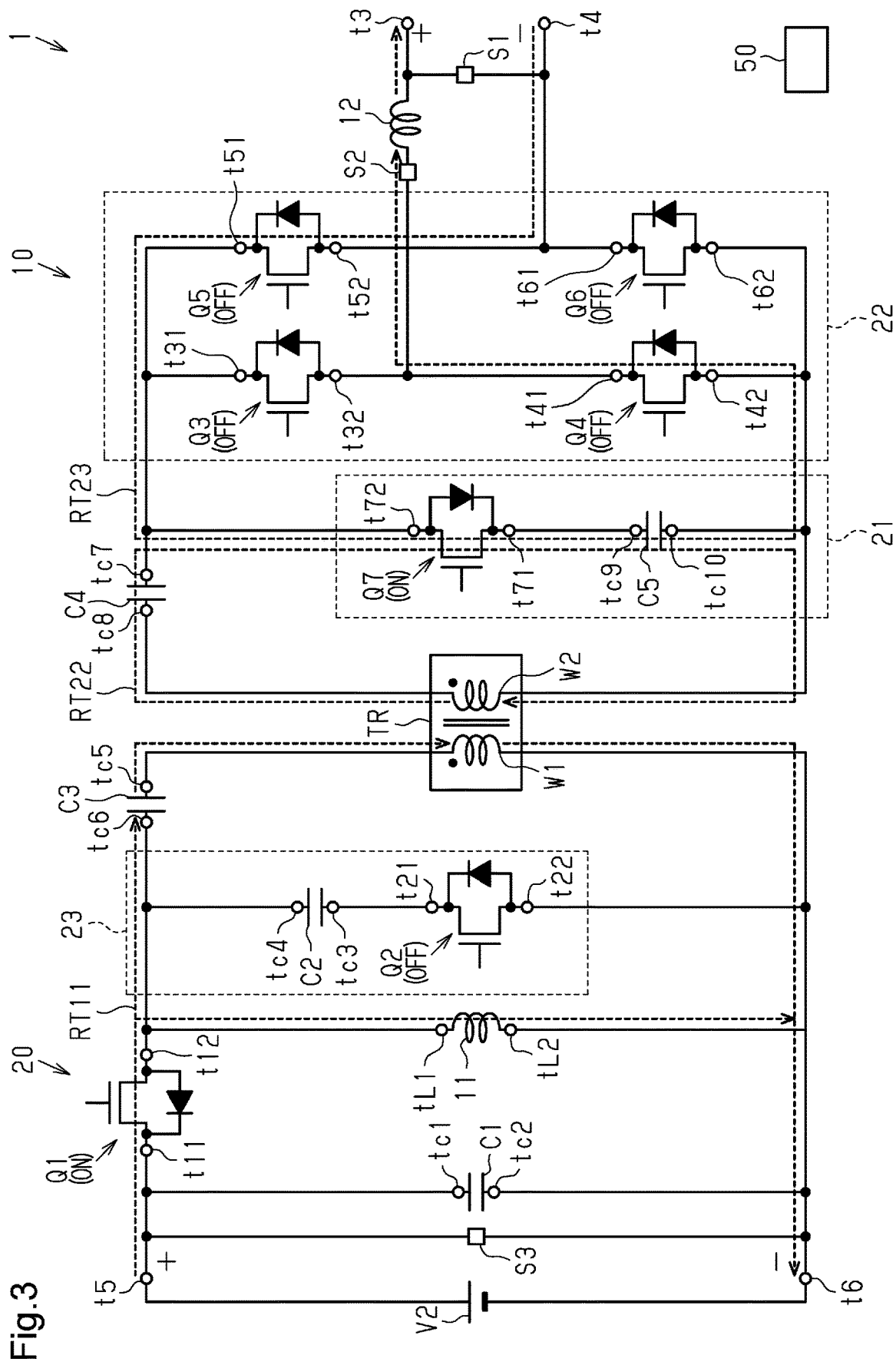
FIG. 3 is a diagram showing one example of the power converter 1 in a second state $\Phi 2$.

The second state Φ2 shown in FIG. 3 is a state in which the controlling unit 50 has set the switching pattern to the second pattern α2. In the second state Φ2, a current flows through the current path RT11 on the direct-current side of the power converter 1 as shown in FIG. 3. The current path RT11 is configured in the above-described manner.

In the second state Φ2, a current flows through a current path RT22 and a current path RT23 on the alternating-current side of the power converter 1. The current path RT22 leads from the head of the alternating-current-side winding W2 to the tail of the alternating-current-side winding W2 via the alternating-current-side capacitor C4, the alternating-current-side buffer switching element Q7, and the alternating-current-side buffer capacitor C5. That is, the alternating-current-side winding current Is in the positive direction flows through the current path RT22.

The current path RT23 leads from the alternating-current-side inductor 12 to the alternating-current-side inductor 12 via the load connected to the alternating-current connection terminals t3, t4, the body diode of the second upper arm switching element Q5, the alternating-current-side buffer switching element Q7, the alternating-current-side buffer capacitor C5, and the body diode of the first lower arm switching element Q4. The current path RT23 is ensured by the continuity of current through the alternating-current-side inductor 12. The alternating-current-side inductor current $I_{L2}$ flows to the alternating-current-side buffer capacitor C5 via the body diode of the second upper arm switching element Q5 and the alternating-current-side buffer switching element Q7. The current flowing through the current path RT23 causes the alternating-current-side buffer capacitor current $I_{C5}$ in the positive direction to flow through the alternating-current-side buffer capacitor C5, so that the alternating-current-side buffer capacitor C5 is charged. The sum of the alternating-current-side buffer capacitor voltage $V_{C5}$ and the alternating-current voltage Vo is applied to the alternating-current-side inductor 12 in the negative direction. This reduces the alternating-current-side inductor current $I_{L2}$, which flows through the alternating-current-side inductor 12.

The period of the second state Φ2 is a period of dead time for preventing the alternating-current-side buffer capacitor C5 from being short-circuited due to the switching elements Q3 to Q6 being simultaneously set to the conducting state. The period of the second state Φ2 may be relatively short as long as time is ensured for the first upper arm switching element Q3 and the second lower arm switching element Q6 to be completely set to the non-conducting state. In other words, in the period in which the first state Φ1 (the first pattern α1) is shifted to the third state Φ3 (the third pattern α3), which will be discussed below, the period of the second state Φ2 may be relatively short if the alternating-current-side buffer capacitor C5 will not be short-circuited due to the switching elements Q3 to Q6 all being in the conductive state.

[Third State Φ3]

Figure 4:
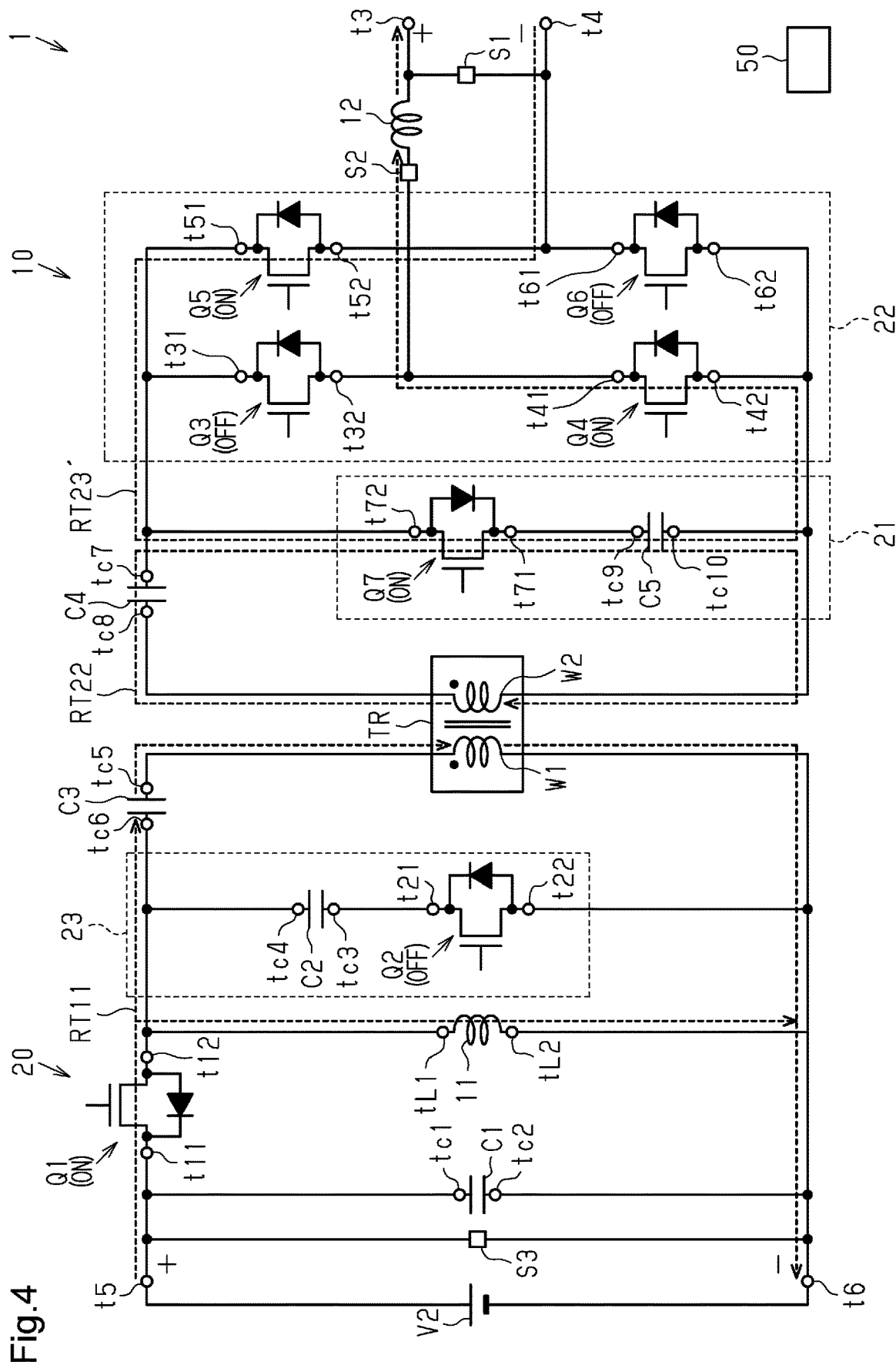
FIG. 4 is a diagram showing one example of the power converter 1 in a third state $\Phi 3$.

The third state Φ3 shown in FIG. 4 is a state in which the controlling unit 50 has set the switching pattern to the third pattern α3. In the third state Φ3, a current flows through the current path RT11 on the direct-current side of the power converter 1 as shown in FIG. 4. The current path RT11 is configured in the above-described manner.

In the third state Φ3, a current flows through the current path RT22 and a current path RT23' on the alternating-current side of the power converter 1. The current path RT22 is configured in the above-described manner. The current that would flow through the body diode of the first lower arm switching element Q4 and the body diode of the second upper arm switching element Q5 in the current path RT23 flows through the first lower arm switching element Q4 and the second upper arm switching element Q5 in the current path RT23'. The sum of the alternating-current-side buffer capacitor voltage $V_{C5}$ and the alternating-current voltage Vo continues to be applied to the alternating-current-side inductor 12 in the negative direction. This continues to reduce the alternating-current-side inductor current $I_{L2}$, which flows through the alternating-current-side inductor 12.

[Fourth State Φ4]

Figure 5:
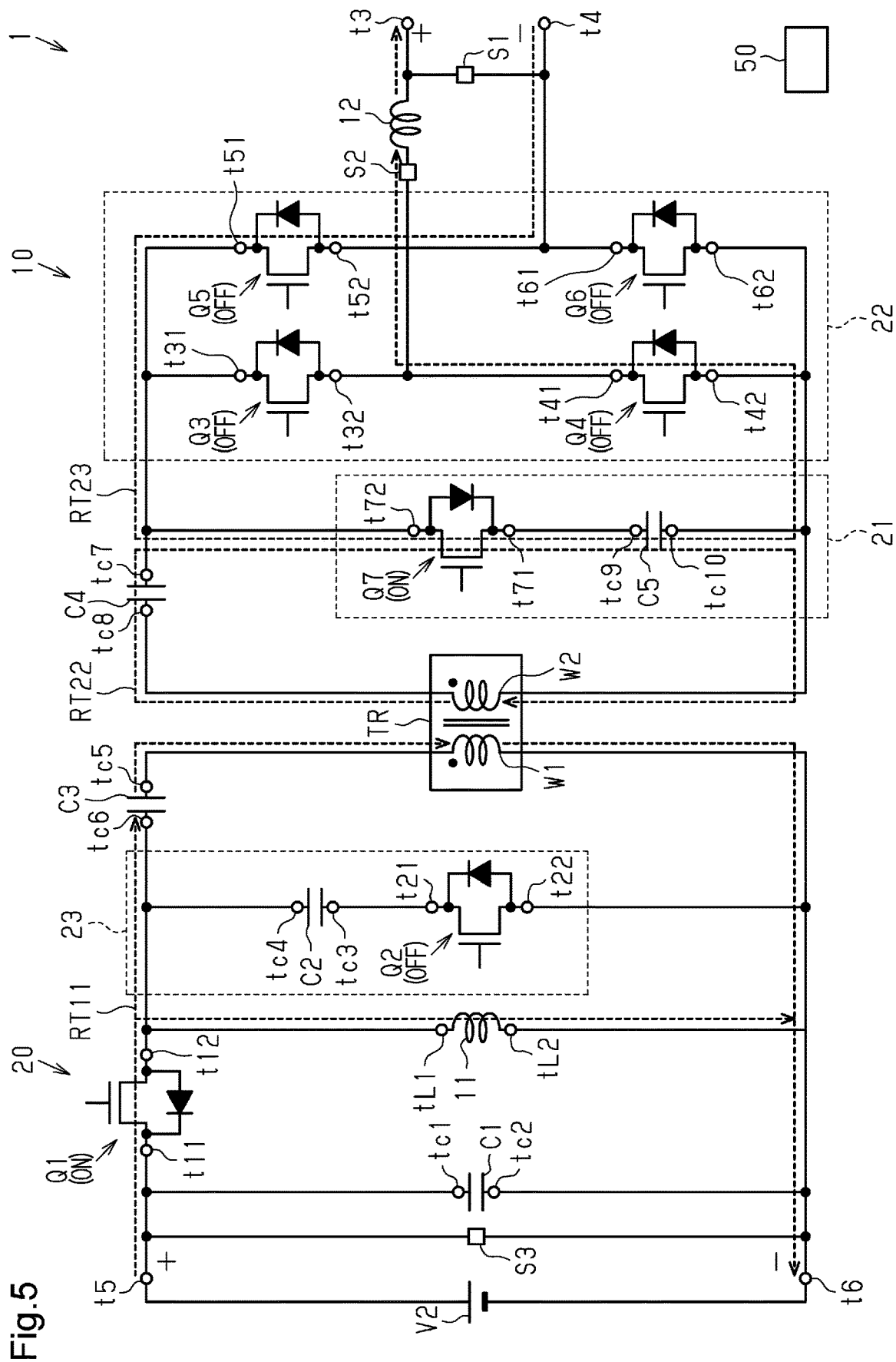
FIG. 5 is a diagram showing one example of the power converter 1 in a fourth state $\Phi 4$.

The fourth state Φ4 shown in FIG. 5 is a state in which the controlling unit 50 has set the switching pattern to the fourth pattern α4. In the fourth state Φ4, a current flows through the current path RT11 on the direct-current side of the power converter 1, and a current flows through a current path RT22 and a current path RT23 on the alternating-current side of the power converter 1 as shown in FIG. 5. The current path RT11, the current path RT22, and the current path RT23 are configured in the above-described manner.

The period of the fourth state Φ4 is a period of dead time for preventing the alternating-current-side buffer capacitor C5 from being short-circuited due to the switching elements Q3 to Q6 being simultaneously set to the conducting state. The period of the fourth state Φ4 may be relatively short as long as time is ensured for the first upper arm switching element Q3 and the second lower arm switching element Q6 to be completely set to the non-conducting state. In other words, in the period in which the third state Φ3 (the third pattern α3) is shifted to the fifth state Φ5 (the fifth pattern α5), which will be discussed below, the period of the fourth state Φ4 may be relatively short if the alternating-current-side buffer capacitor C5 will not be short-circuited due to the switching elements Q3 to Q6 all being in the conductive state.

The third state Φ3 and the fourth state Φ4 are periods for synchronous rectification that reduces conduction losses in the first lower arm switching element Q4 and the second upper arm switching element Q5. If the synchronous rectification is not necessary, the third state Φ3 and the fourth state Φ4 may be skipped, so that the second state Φ2 is directly shifted to the fifth state Φ5.

[Fifth State Φ5]

Figure 6:
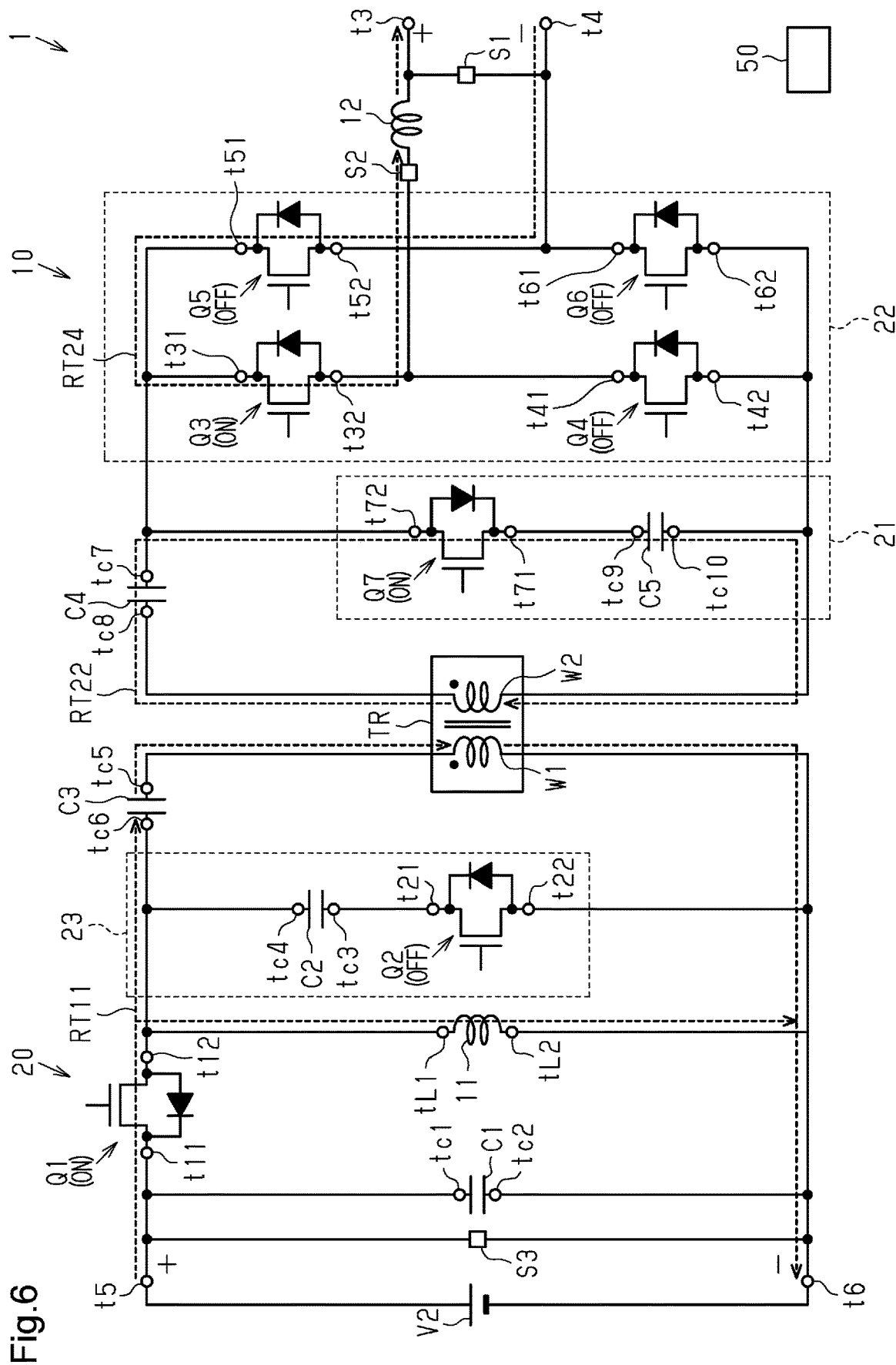
FIG. 6 is a diagram showing one example of the power converter 1 in a fifth state $\Phi 5$.

The fifth state Φ5 shown in FIG. 6 is a state in which the controlling unit 50 has set the switching pattern to the fifth pattern α5. In the fifth state Φ5, a current flows through the current path RT11 on the direct-current side of the power converter 1 as shown in FIG. 6.

The current path RT11 is configured in the above-described manner.

In the fifth state Φ5, a current flows through the current path RT22 and a current path RT24 on the alternating-current side of the power converter 1. The current path RT22 is configured in the above-described manner. The current path RT24 leads from the alternating-current-side inductor 12 to the alternating-current-side inductor 12 via the load connected to the alternating-current connection terminals t3, t4, the body diode of the second upper arm switching element Q5, and the first upper arm switching element Q3. The alternating-current voltage Vo is applied to the alternating-current-side inductor 12 in the negative direction, so that the degree of reduction in the alternating-current-side inductor current $I_{L2}$ is reduced.

The degree of reduction in the alternating-current-side inductor current $I_{L2}$ varies between a case in which it flows through the current path RT23 and a case in which it flows through the current path RT24. In a case in which the alternating-current-side inductor current $I_{L2}$ flows through the current path RT23, the sum of the alternating-current-side buffer capacitor voltage $V_{C5}$ and the alternating-current voltage Vo is applied to the alternating-current-side inductor 12 in the negative direction. In contrast, in a case in which the alternating-current-side inductor current $I_{L2}$ flows through the current path RT24, the alternating-current voltage Vo is applied to the alternating-current-side inductor 12 in the negative direction. Thus, the degree of reduction is greater when the alternating-current-side inductor current $I_{L2}$ flows through the current path RT23.

When a large degree of reduction in the alternating-current-side inductor current $I_{L2}$ is desired to be maintained, the second state Φ2 may be directly shifted to the sixth state Φ6, skipping the third state Φ3 to the fifth state Φ5. When a small degree of reduction in the alternating-current-side inductor current $I_{L2}$ is desired to be maintained, the first state 4l may be directly shifted to the fifth state Φ5 by setting only the second lower arm switching element Q6 to the non-conducting state.

[Sixth State Φ6]

Figure 7:
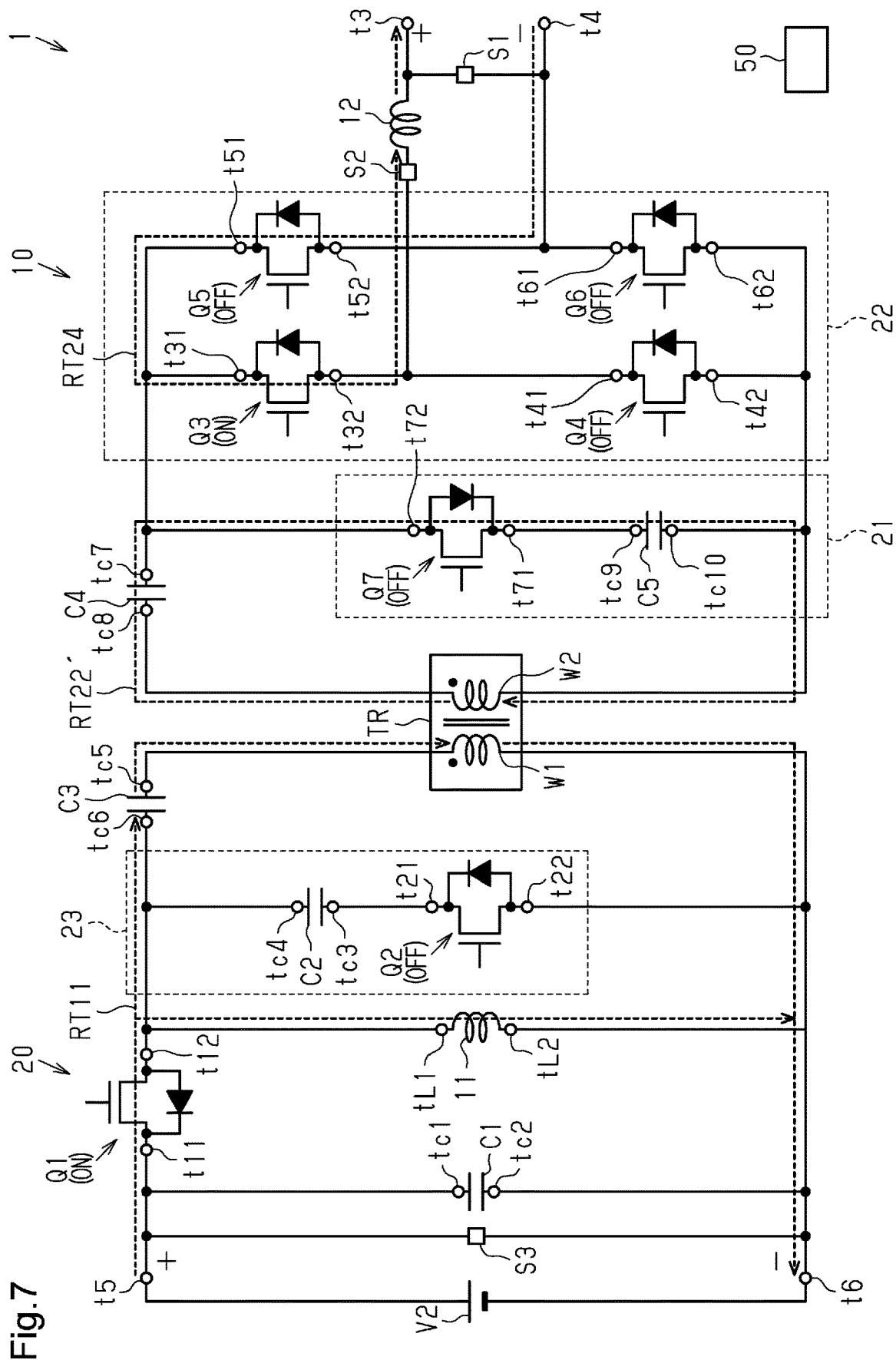
FIG. 7 is a diagram showing one example of the power converter 1 in a sixth state $\Phi 6$.

The sixth state Φ6 shown in FIG. 7 is a state in which the controlling unit 50 has set the switching pattern to the sixth pattern β6. In the sixth state Φ6, a current flows through the current path RT11 on the direct-current side of the power converter 1 as shown in FIG. 7. The current path RT11 is configured in the above-described manner.

In the sixth state Φ6, a current flows through a current path RT22' and a current path RT24 on the alternating-current side of the power converter 1. The current path RT24 is configured in the above-described manner. The current that would flow through the alternating-current-side buffer switching element Q7 in the current path RT22 flows through the body diode of the alternating-current-side buffer switching element Q7 in the current path RT22'.

[Seventh State Φ7]

Figure 8:
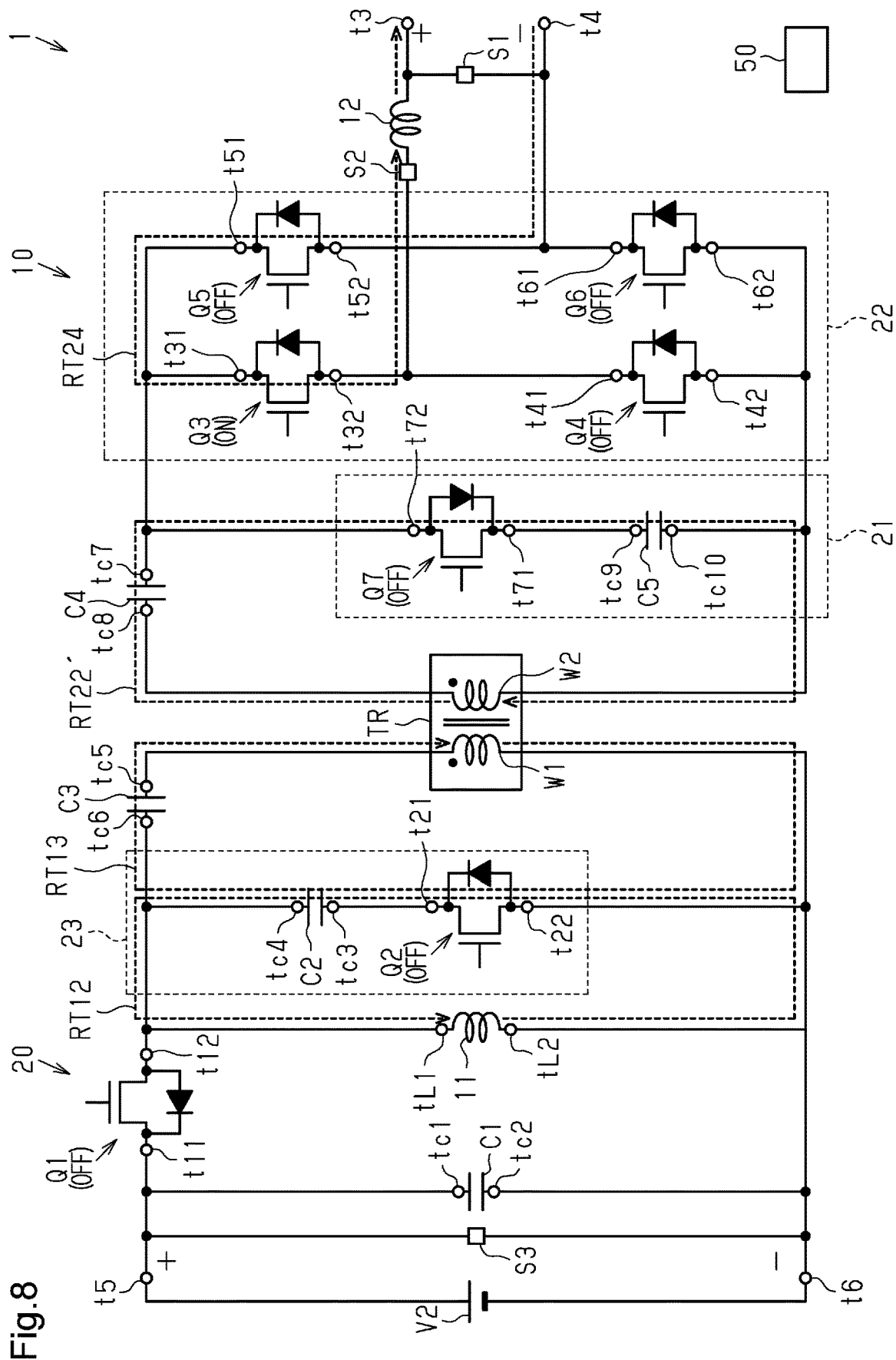
FIG. 8 is a diagram showing one example of the power converter 1 in a seventh state $\Phi 7$.

The seventh state Φ7 shown in FIG. 8 is a state in which the controlling unit 50 has set the switching pattern to the seventh pattern β7. In the seventh state Φ7, a current flows through a current path RT12 and a current path RT13 on the direct-current side of the power converter 1 as shown in FIG. 8.

The current path RT12 leads from the second terminal tL2 of the direct-current-side inductor 11 to the first terminal $t_{L1}$ via the body diode of the direct-current-side buffer switching element Q2 and the direct-current-side buffer capacitor C2. The current path RT12 is ensured by the continuity of current through the direct-current-side inductor 11. The direct-current-side inductor current $I_{L1}$ flows through the current path RT12. The current path RT13 leads from the tail of the direct-current-side winding W1 to the head of the direct-current-side winding W1 via the body diode of the direct-current-side buffer switching element Q2, the direct-current-side buffer capacitor C2, and the direct-current-side capacitor C3. The direct-current-side winding current Ip in the positive direction flows through the current path RT13 by the continuity of current through the excitation inductor of the direct-current-side winding W1.

The direction of the direct-current-side winding voltage $V_{T1}$ changes since the state in which the direct-current voltage Vi is applied is changed to the state in which the sum of the direct-current-side buffer capacitor voltage $V_{C2}$ and the direct-current-side capacitor voltage $V_{C3}$ is applied in the negative direction. This reduces the direct-current-side winding current Ip in the positive direction.

In the seventh state Φ7, a current flows through the current path RT22' and the current path RT24 on the alternating-current side of the power converter 1. The current path RT22' and the current path RT24 are configured in the above-described manner. When the direction of the direct-current-side winding voltage $V_{T1}$ is changed, the direction of the alternating-current-side winding voltage $V_{T2}$ is changed, so that the alternating-current-side winding current Is in the positive direction is reduced.

Since the period of the sixth state Φ6 and the period of the seventh state Φ7 are periods of dead time that last until the state is shifted to the eighth state Φ8, the period of the sixth state Φ6 and the period of the seventh state Φ7 may be relatively short.

[Eighth State Φ8]

Figure 9:
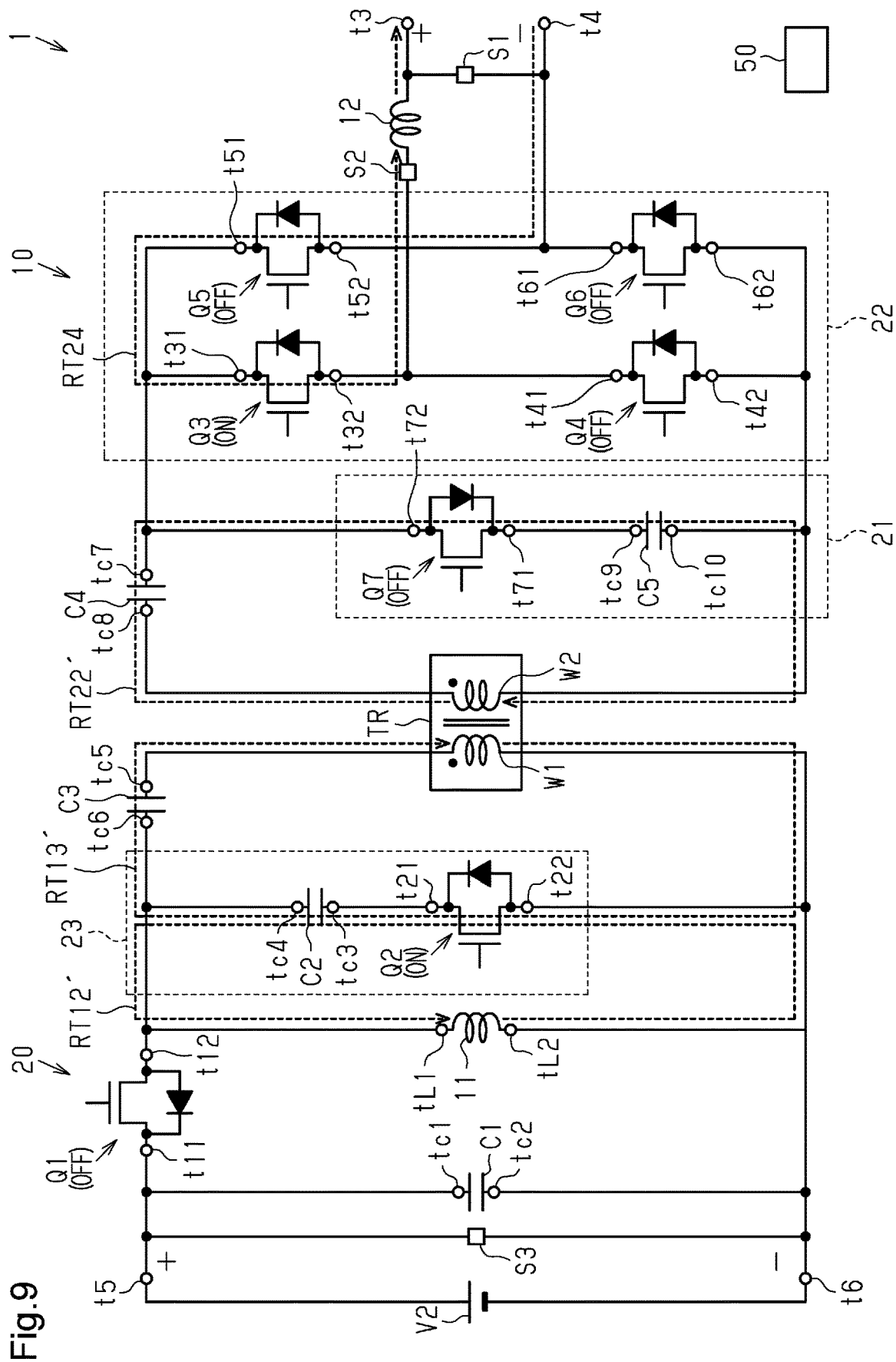
FIG. 9 is a diagram showing one example of the power converter 1 in an eighth state $\Phi 8$.

The eighth state Φ8 shown in FIG. 9 is a state in which the controlling unit 50 has set the switching pattern to the eighth pattern β8. In the eighth state Φ8, a current flows through a current path RT12' and a current path RT13' on the direct-current side of the power converter 1 as shown in FIG. 9. The current that would flow through the body diode of the direct-current-side buffer switching element Q2 in the current path RT12 flows through the direct-current-side buffer switching element Q2 in the current path RT12'. Also, the current that would flow through the body diode of the direct-current-side buffer switching element Q2 in the current path RT13 flows through the direct-current-side buffer switching element Q2 in the current path RT13'. As in the case of the seventh state Φ7, the direct-current-side winding current Ip in the positive direction continues to decrease in the eighth state Φ8.

In the eighth state Φ8, a current flows through the current path RT22' and the current path RT24 on the alternating-current side of the power converter 1. The current path RT22' and the current path RT24 are configured in the above-described manner. As in the case of the seventh state Φ7, the alternating-current-side winding current Is in the positive direction continues to decrease in the eighth state Φ8.

[Ninth State Φ9]

Figure 10:
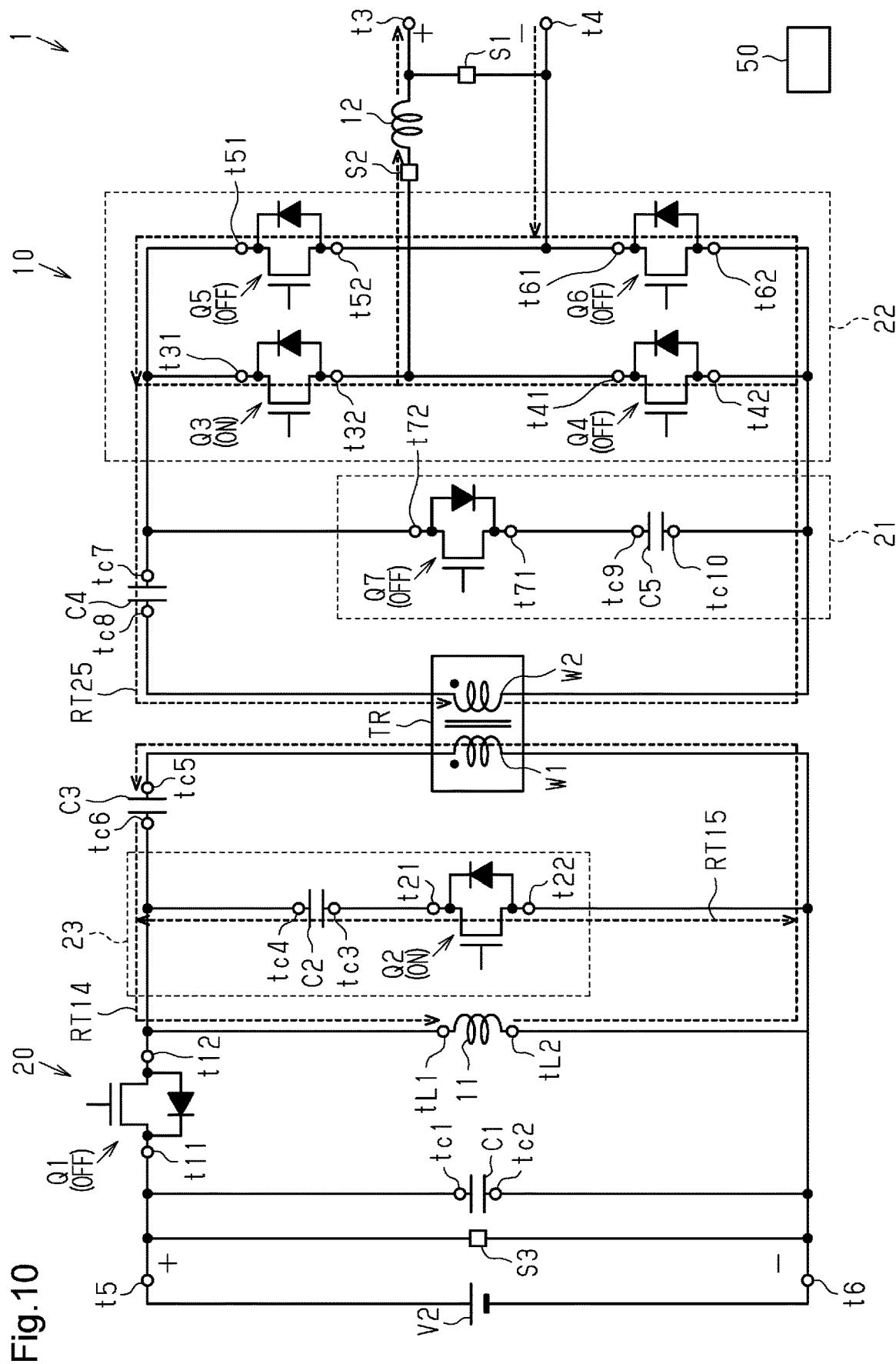
FIG. 10 is a diagram showing one example of the power converter 1 in a ninth state $\Phi 9$.

The ninth state Φ9 shown in FIG. 10 is a state after a specific time has elapsed since the controlling unit 50 set the switching pattern to the eighth pattern β8 so that the state was shifted to the eighth state Φ8. In the ninth state Φ9, a current flows through a current path RT14 and a current path RT15 on the direct-current side of the power converter 1 as shown in FIG. 10.

The current path RT14 leads from the second terminal tL2 of the direct-current-side inductor 11 to the first terminal tL1 of the direct-current-side inductor 11 via the direct-current-side winding W1 and the direct-current-side capacitor C3. During the period from the seventh state Φ7 to the eighth state Φ8, the direct-current-side winding current Ip in the positive direction is reduced, and the direction of the direct-current-side winding current Ip is changed from the positive direction to the negative direction, so that the state is shifted to the ninth state Φ9.

The current difference between the direct-current-side inductor current $I_{L1}$ and the direct-current-side winding current Ip flows through the current path RT15. Specifically, when the direct-current-side inductor current $I_{L1}$ is greater than the direct-current-side winding current Ip, the direct-current-side buffer capacitor current $I_{C2}$ in the positive direction flows. Since the direct-current-side buffer capacitor current $I_{C2}$ in the positive direction flows, the direct-current-side buffer capacitor C2 is charged. When the direct-current-side winding current Ip is greater than the direct-current-side inductor current $I_{L1}$, the direct-current-side buffer capacitor current $I_{C2}$ in the negative direction flows. Since the direct-current-side buffer capacitor current $I_{C2}$ in the negative direction flows, the direct-current-side buffer capacitor C2 is discharged.

In the ninth state Φ9, a current flows through a current path RT25 on the alternating-current side of the power converter 1. The current path RT25 includes a first path, a second path, and a third path. The first path leads from the tail of the alternating-current-side winding W2 to the head of the alternating-current-side winding W2 via the body diode of the first lower arm switching element Q4, the first upper arm switching element Q3, and the alternating-current-side capacitor C4. That is, the alternating-current-side winding current Is in the negative direction flows through the first path. The second path branches from the first path at the second terminal t42 of the first lower arm switching element Q4 and joins the first path via the body diode of the second lower arm switching element Q6 and the body diode of the second upper arm switching element Q5. The third path branches from the first path at the node between the first upper arm switching element Q3 and the first lower arm switching element Q4 and joins the second path at the node between the second upper arm switching element Q5 and the second lower arm switching element Q6 via the alternating-current-side inductor 12 and the load connected to alternating-current connection terminals t3, t4. The alternating-current-side winding current Is in the positive direction is reduced during the period from the seventh state Φ7 to the eighth state Φ8, and the direction of the alternating-current-side winding current Is is changed from the positive direction to the negative direction in the ninth state Φ9. The alternating-current voltage Vo in the negative direction continues to be applied to the alternating-current-side inductor 12, so that the alternating-current-side inductor current $I_{L2}$ decreases.

[Tenth State Φ10]

Figure 11:
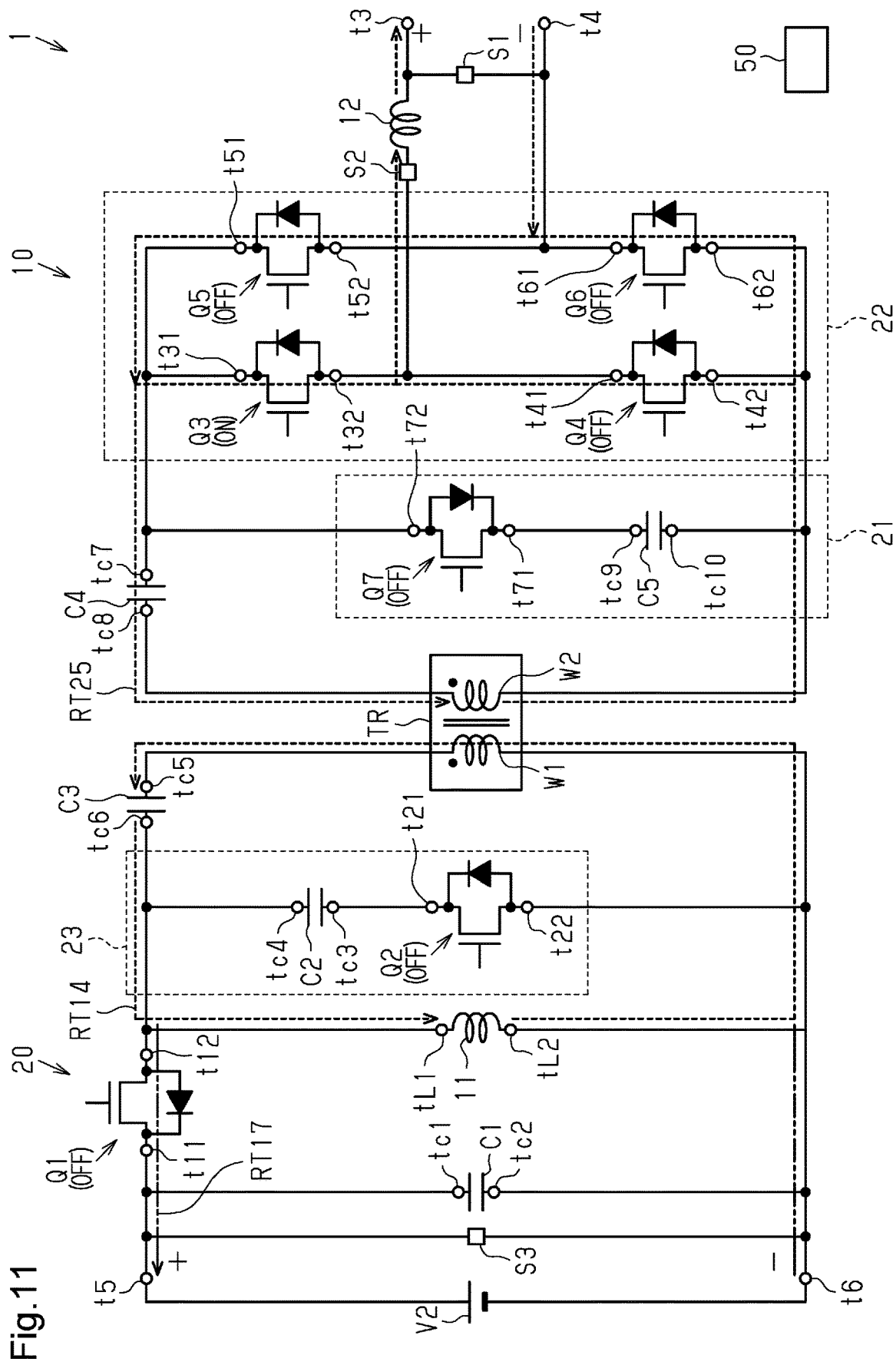
FIG. 11 is a diagram showing one example of the power converter 1 in a tenth state $\Phi 10$.

The tenth state Φ10 shown in FIG. 11 is a state in which the controlling unit 50 has set the switching pattern to the ninth pattern α9. In the tenth state Φ10, a current flows through the current path RT14 and a current path RT17 on the direct-current side of the power converter 1 as shown in FIG. 11. The current path RT14 is configured in the above-described manner.

The current path RT17 leads from the head of the direct-current-side winding W1 to the tail of the direct-current-side winding W1 via the direct-current-side capacitor C3, the body diode of the rectification switching element Q1, and the direct-current power supply V2. When the direct-current-side winding current Ip is greater than the direct-current-side inductor current $I_{L1}$, the current difference between the direct-current-side winding current Ip and the direct-current-side inductor current ILI flows to the direct-current power supply V2 via the current path RT17. The direct-current voltage Vi is applied to the direct-current-side inductor 11. This increases the direct-current-side inductor current $I_{L1}$. The voltage difference between the direct-current voltage Vi and the direct-current-side capacitor voltage $V_{C3}$ is applied to the direct-current-side winding W1 in the positive direction, so that the direct-current-side winding current Ip is increased (decreased in the negative direction).

In the tenth state Φ10, a current flows through the current path RT25 on the alternating-current side of the power converter 1. The current path RT25 is configured in the above-described manner.

[Eleventh State Φ11]

Figure 12:
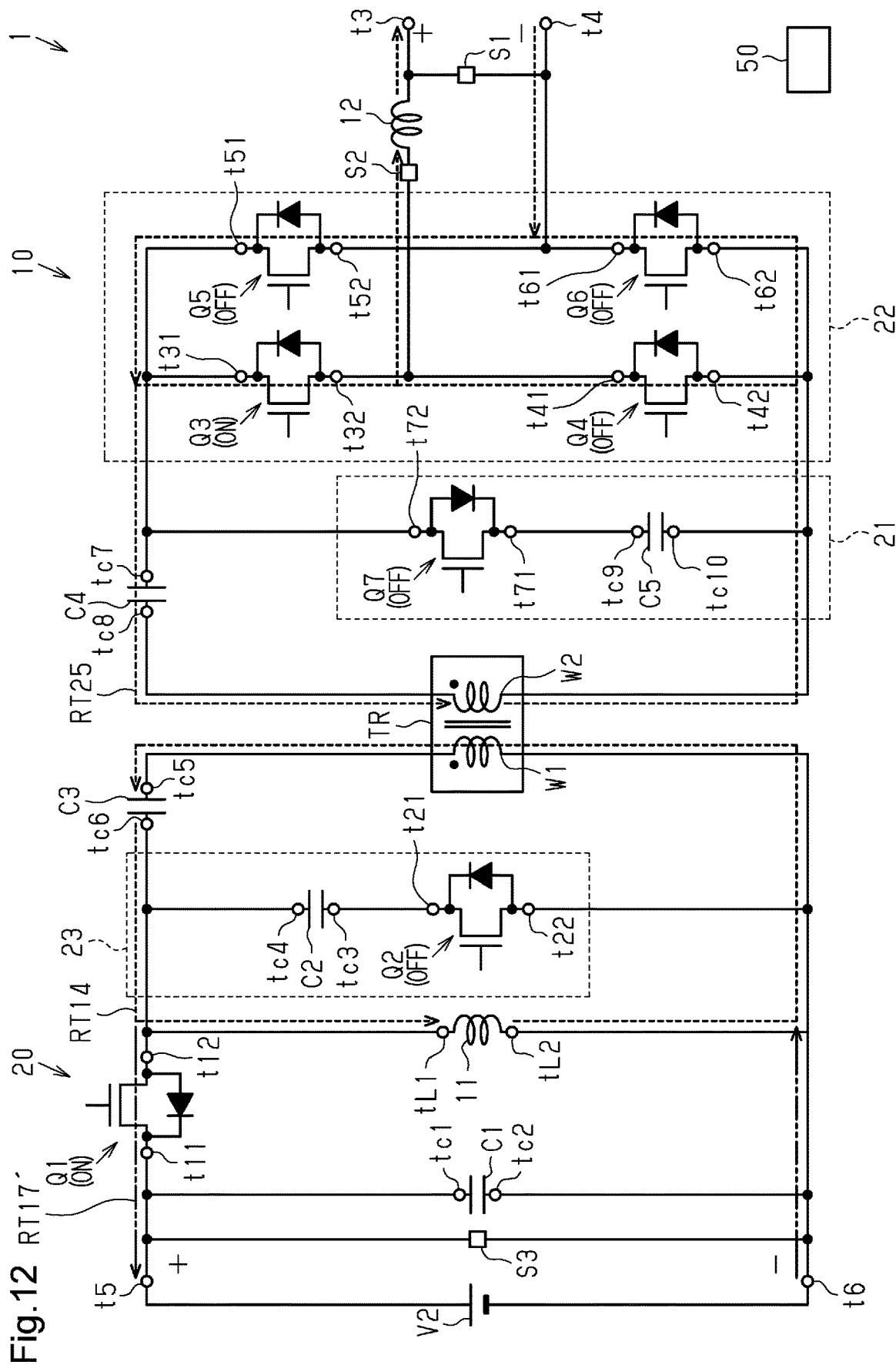
FIG. 12 is a diagram showing one example of the power converter 1 in an eleventh state $\Phi 11$.

The eleventh state Φ11 shown in FIG. 12 is a state in which the controlling unit 50 has set the switching pattern to the tenth pattern α10. In the eleventh state Φ11, a current flows through the current path RT14 and a current path RT17' on the direct-current side of the power converter 1 as shown in FIG. 12. The current path RT14 is configured in the above-described manner. The current that would flow through the body diode of the rectification switching element Q1 in the current path RT17 flows through the rectification switching element Q1 in the current path RT17'. This reduces the resistance of the current path RT17' as compared to that of the current path RT17.

In the eleventh state Φ11, a current flows through the current path RT25 on the alternating-current side of the power converter 1. The current path RT25 is configured in the above-described manner. In the eleventh state Φ11, the alternating-current-side winding current Is increases as the direct-current-side winding current Ip increases.

[Twelfth State Φ12]

Figure 13:
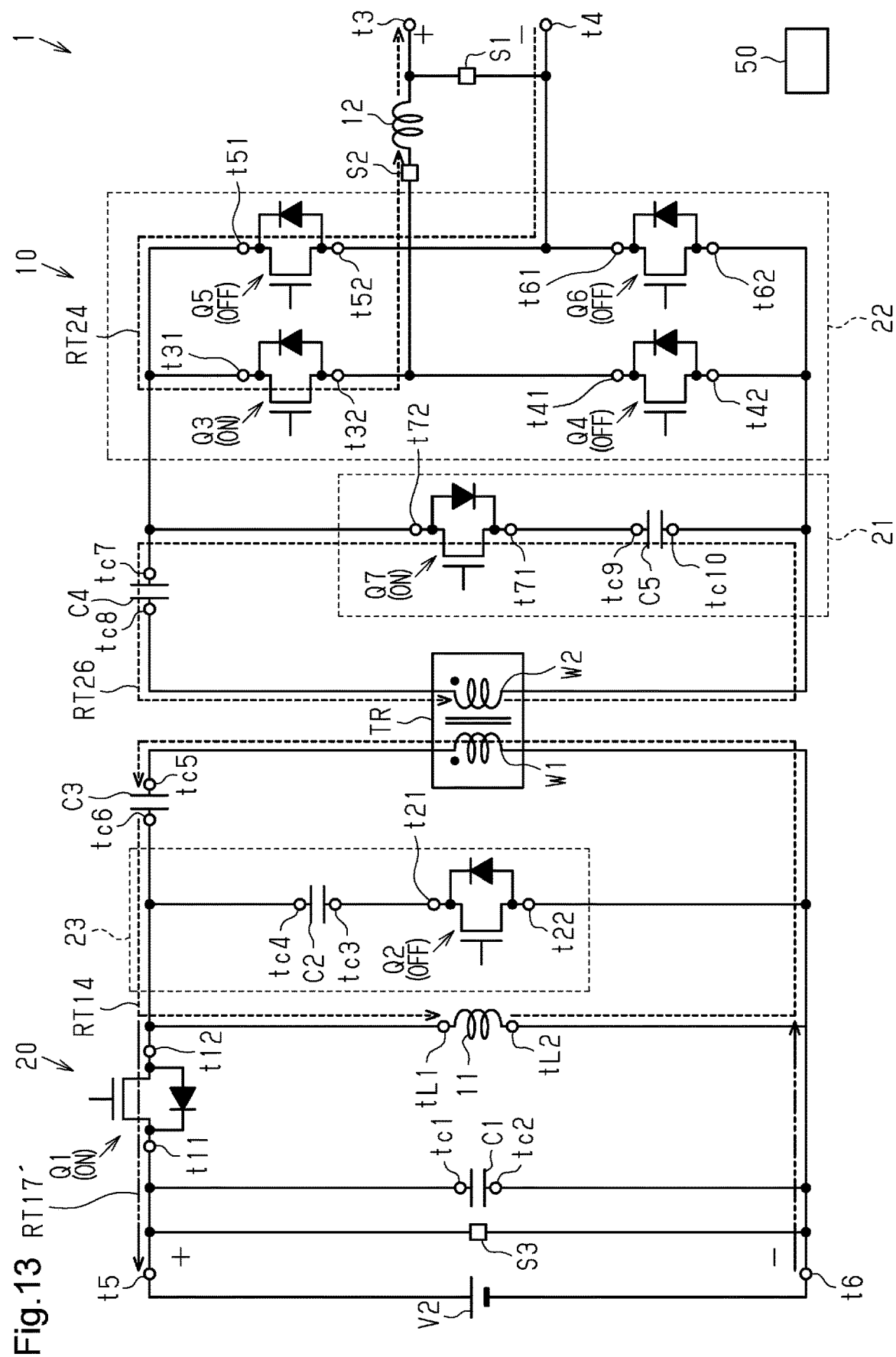
FIG. 13 is a diagram showing one example of the power converter 1 in a twelfth state $\Phi 12$.

The twelfth state Φ12 shown in FIG. 13 is a state in which the controlling unit 50 has set the switching pattern to the eleventh pattern α11. In the twelfth state Φ12, a current flows through the current path RT14 and the current path RT17' on the direct-current side of the power converter 1 as shown in FIG. 13. The current path RT14 and the current path RT17' are configured in the above-described manner. The direct-current-side winding current Ip increases as in the case of the tenth state Φ10.

In the twelfth state Φ12, a current flows through the current path RT24 and a current path RT26 on the alternating-current side of the power converter 1. The current path RT24 is configured in the above-described manner. The current path RT26 leads from the tail of the alternating-current-side winding W2 to the head of the alternating-current-side winding W2 via the alternating-current-side buffer capacitor C5, the alternating-current-side buffer switching element Q7, and the alternating-current-side capacitor C4. That is, the alternating-current-side winding current Is in the negative direction flows through the current path RT26. The alternating-current-side winding current Is increases as in the case of the tenth state Φ10. The alternating-current voltage Vo is applied to the alternating-current-side inductor 12 in the negative direction.

[Thirteenth State Φ13]

Figure 14:
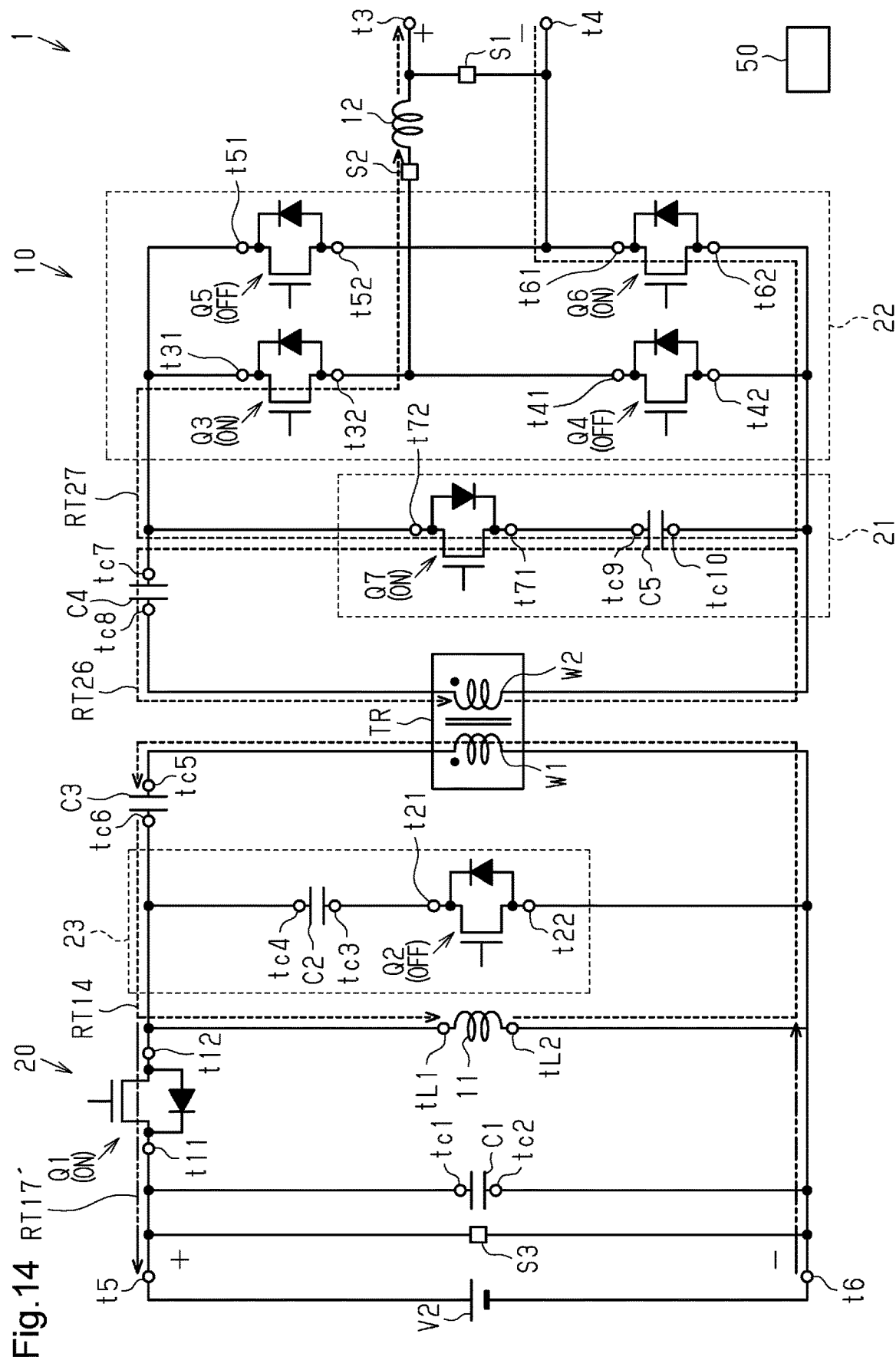
FIG. 14 is a diagram showing one example of the power converter 1 in a thirteenth state $\Phi 13$.

The thirteenth state Φ13 shown in FIG. 14 is a state in which the controlling unit 50 has set the switching pattern to the first pattern α1. In the thirteenth state Φ13, a current flows through the current path RT14 and the current path RT17' on the direct-current side of the power converter 1 as shown in FIG. 14. The current path RT14 and the current path RT17' are configured in the above-described manner.

In the thirteenth state Φ13, a current flows through the current path RT26 and a current path RT27 on the alternating-current side of the power converter 1. The current path RT26 is configured in the above-described manner. The current path RT27 leads from the first terminal tc9 of the alternating-current-side buffer capacitor C5 to the second terminal tc10 of the alternating-current-side buffer capacitor C5 via the alternating-current-side buffer switching element Q7, the first upper arm switching element Q3, the alternating-current-side inductor 12, the load connected to the alternating-current connection terminals t3, t4, and the second lower arm switching element Q6. The voltage difference between the alternating-current-side buffer capacitor voltage $V_{C5}$ and the alternating-current voltage Vo is applied to the alternating-current-side inductor 12. This increases the alternating-current-side inductor current $I_{L2}$, which flows through the alternating-current-side inductor 12.

When a specific time has elapsed since the state is shifted to the thirteenth state Φ13, the direction of the alternating-current-side winding current Is flowing through the alternating-current-side winding W2 is reversed from the negative direction to the positive direction. When the direct-current-side winding current Ip is greater than the direct-current-side inductor current $I_{L1}$, the current difference between the direct-current-side winding current Ip and the direct-current-side inductor current $I_{L1}$ returns to the direct-current power supply V2 via the current path RT17'. When the difference between the direct-current-side winding current Ip and the direct-current-side inductor current $I_{L1}$ is eliminated so that the currents are equal to each other, the direct-current-side winding current Ip flowing through the direct-current-side winding W1 is reversed from the negative direction to the positive direction, so that the state returns to the first state Φ1.

As described above, the action of causing an alternating-current voltage to have a negative polarity is the same as the action in the case in which the alternating-current voltage has a positive polarity except that the action of the first upper arm switching element Q3 and the action of the second upper arm switching element Q5 are interchanged, and the action of the first lower arm switching element Q4 and the action of the second lower arm switching element Q6 are interchanged. By interchanging the action of the first upper arm switching element Q3 and the action of the second upper arm switching element Q5 and interchanging the action of the first lower arm switching element Q4 and the second lower arm switching element Q6, the direction of the voltage applied the alternating-current-side inductor 12 is changed, so that the increasing/decreasing of the alternating-current-side inductor current $I_{L2}$ is reversed. As a result, the polarity of the alternating-current voltage Vo is inverted.

[Operation of Power Converter 1 According to Present Embodiment]

Operation of the present embodiment will now be described.

The switching pattern of the switching elements Q1 to Q7 is sequentially changed from the first pattern α1 to the eleventh pattern α11 and back to the first pattern α1, so that the state of the power converter 1 is sequentially shifted from the first state Φ1 to the thirteenth state Φ13. The alternating-current-side inductor current $I_{L2}$ increases during the period from the thirteenth state Φ13 to the first state Φ1, and the alternating-current-side inductor current $I_{L2}$ decreases during the period from the second state Φ2 to the twelfth state Φ12. Accordingly, the alternating-current voltage Vo increases during the period from the thirteenth state Φ13 to the first state Φ1, and the alternating-current voltage Vo decreases during the period from the second state Φ2 to the twelfth state Φ12. The amplitude of the alternating-current voltage Vo is controlled by the ratio of the period from the thirteenth state Φ13 to the first state Φ1 and the period from the second state Φ2 to the twelfth state Φ12.

The polarity of the alternating-current voltage Vo is inverted by interchanging the action of the first upper arm switching element Q3 and the action of the second upper arm switching element Q5 and interchanging the action of the first lower arm switching element Q4 and the second lower arm switching element Q6. Therefore, while repeating the state shifting from the first state Φ1 to the thirteenth state Φ13, it is possible to change the waveform of the alternating-current voltage Vo to a desired waveform (for example, a sine wave) by combining the following processes: the process for controlling the ratio of the period from the thirteenth state Φ13 to the first state Φ1 and the period from the second state Φ2 to the twelfth state Φ12; the process for interchanging the action of the first upper arm switching element Q3 and the action of the second upper arm switching element Q5; and the process for interchanging the action of the first lower arm switching element Q4 and the action of the second lower arm switching element Q6.

Particularly, during the period from the eighth state Φ8 to the ninth state Φ9, the direction of the direct-current-side inductor current $I_{L1}$ flowing through the direct-current-side inductor 11 and the direction of the direct-current-side winding current Ip flowing through the direct-current-side winding W1 are opposite to each other. It is thus difficult to ensure the continuity of current through the two inductors without the direct-current-side buffer circuit 23. This can result in a surge voltage. In this regard, the direct-current-side buffer circuit 23 according to the present embodiment passes the currents of the two inductors through the direct-current-side buffer capacitor C2 to restrict the occurrence of surge voltage and to discharge absorbed power as necessary. Also, during the period from the second state Φ2 to the fourth state Φ4, the direction of the alternating-current-side inductor current $I_{L2}$ flowing through the alternating-current-side inductor 12 and the direction of the alternating-current-side winding current Is flowing through the alternating-current-side winding W2 are opposite. It is thus difficult to ensure the continuity of current through the inductors without the alternating-current-side buffer circuit 21. This can result in a surge current. In this regard, the alternating-current-side buffer circuit 21 according to the present embodiment passes the currents of the two inductors through the alternating-current-side buffer capacitor C5 to restrict the occurrence of surge voltage and to discharge absorbed power as necessary.

[Advantages of Power Converter 1 According to Present Embodiment]

The above-described embodiment has the following advantages.

(1-1) The controlling unit 50 controls switching of the switching elements Q1 to Q7 so as to shift the state of the power converter 1 from the first state Φ1 to the thirteenth state Φ13. The power converter 1 converts the direct-current voltage Vi of the direct-current power supply V2 to the alternating-current voltage Vo by the following control processes: the process for controlling the amplitude of the alternating-current voltage Vo using the ratio of the period from the thirteenth state Φ13 to the first state Φ1 and the period from the second state Φ2 to the twelfth state Φ12; and the process for controlling the polarity of the alternating-current voltage Vo by interchanging the action of the first upper arm switching element Q3 and the action of the second upper arm switching element Q5 and interchanging the action of the first lower arm switching element Q4 and the action of the second lower arm switching element Q6.

At the same time, the switching operations of the rectification switching element Q1 and the direct-current-side buffer switching element Q2 apply a high-frequency alternating-current voltage to the direct-current-side winding W1 of the transformer TR, so that power is transmitted from the alternating-current-side winding W2 to the alternating-current-side circuit 10. This allows the power to be transmitted to the alternating-current side of the transformer TR while insulating the alternating-current-side circuit 10 from the direct-current power supply V2.

When converting a direct-current voltage to an alternating-current voltage, the prior art bidirectional power converter circuit uses the following separate full-bridge circuits: a circuit that converts a direct-current voltage to a high-frequency alternating-current voltage and applies it to a direct-current-side winding of a transformer; a circuit that rectifies the high-frequency alternating-current voltage generated in the alternating-current-side winding of the transformer to convert it to a direct current voltage; and a circuit that converts the direct-current voltage generated on the alternating-current side of the transformer to a desired alternating-current voltage. In contrast, the power converter 1 of the present embodiment includes the rectification switching element Q1, the direct-current-side inductor 11, and the direct-current-side capacitor C3, which construct a circuit that converts a direct-current voltage to a high-frequency alternating-current voltage and applies it to the direct-current-side winding W1 of the transformer TR. The power converter 1 also includes the alternating-current-side capacitor C4 and the bridge circuit 22, which construct a circuit that rectifies the high-frequency alternating-current voltage generated in the alternating-current-side winding W2 of the transformer TR and a circuit that generates a desired alternating-current voltage.

Accordingly, as compared to the prior art circuit, which uses a total of three full-bridge circuits, the power converter 1 reduces the number of active components such as switching elements and rectifiers. Also, as compared to the prior art circuit, which uses full-bridge circuits, the power converter 1 of the present embodiment includes a relatively small number of active components through which a current flows. The power converter 1 thus reduces the conduction loss in the active components.

(1-2) In the direct-current-side circuit 20, in order to ensure the continuity of current through the inductors (the direct-current-side inductor 11 and the direct-current-side winding W1), the direct-current-side buffer circuit 23 provides detour paths for these currents. In the alternating-current-side circuit 10, in order to ensure the continuity of current through the inductors (the alternating-current-side inductor 12 and the alternating-current-side winding W2), the alternating-current-side buffer circuit 21 provides detour paths for these currents.

With this configuration, the power converter 1 uses the direct-current-side buffer circuit 23 to suppress the occurrence of surge voltage that would be generated by mismatch between continuity of the direct-current-side inductor current $I_{L1}$ through the direct-current-side inductor 11 and current continuity of the excitation inductor of the direct-current-side winding W1. Also, with this configuration, the power converter 1 uses the alternating-current-side buffer circuit 21 to suppress the occurrence of surge voltage that would be generated by mismatch between continuity of the alternating-current-side inductor current $I_{L2}$ through the alternating-current-side inductor 12 and the alternating-current-side winding current Is.

(1-3) The transformer TR transmits power from the direct-current side to the alternating-current side in all of the first state Φ1 to the thirteenth state Φ13 regardless of the direction of the voltage applied to the direct-current-side winding W1 of the transformer TR. The power converter 1 thus increases the use efficiency of the transformer TR.

(1-4) The direct-current-side buffer circuit 23 includes the direct-current-side buffer capacitor C2, which is provided between the direct-current-side inductor 11 and the direct-current-side capacitor C3. With this configuration, when the direct-current-side inductor current $I_{L1}$ is greater than the direct-current-side winding current Ip, the direct-current-side buffer capacitor C2 can be charged using the current difference. When the direct-current-side inductor current $I_{L1}$ is less than the direct-current-side winding current Ip, power can be supplied from the direct-current-side buffer capacitor C2 to the direct-current-side winding W1. Accordingly, the difference between the direct-current-side inductor current ILI and the direct-current-side winding current Ip is absorbed by the direct-current-side buffer capacitor C2. This ensures matching of the currents in various sections in the direct-current-side circuit 20.

Also, the alternating-current-side buffer circuit 21 includes the alternating-current-side buffer capacitor C5, which is provided between the bridge circuit 22 and the alternating-current-side capacitor C4. With this configuration, when the alternating-current-side inductor current $I_{L2}$ is greater than the alternating-current-side winding current Is, the alternating-current-side buffer capacitor C5 can be charged using the current difference. When the alternating-current-side inductor current $I_{L2}$ is less than the alternating-current-side winding current Is, power can be supplied from the alternating-current-side buffer capacitor C5 to the alternating-current-side winding W2. Accordingly, the difference between the alternating-current-side inductor current $I_{L2}$ and the alternating-current-side winding current Is is absorbed by the alternating-current-side buffer capacitor C5. This ensures matching of the currents in various sections in the alternating-current-side circuit 10.

Second Embodiment

A second embodiment of the present disclosure will now be described with reference to the drawings. The second embodiment is different from the first embodiment in how components are connected in a direct-current-side circuit 20a of a power converter 2 and in that a capacitor is connected to opposite ends of each of switching elements Q11 to Q16. Like or the same reference numerals are given to those components that are like or the same as the corresponding components of the first embodiment and detailed explanations are omitted.

Figure 15:
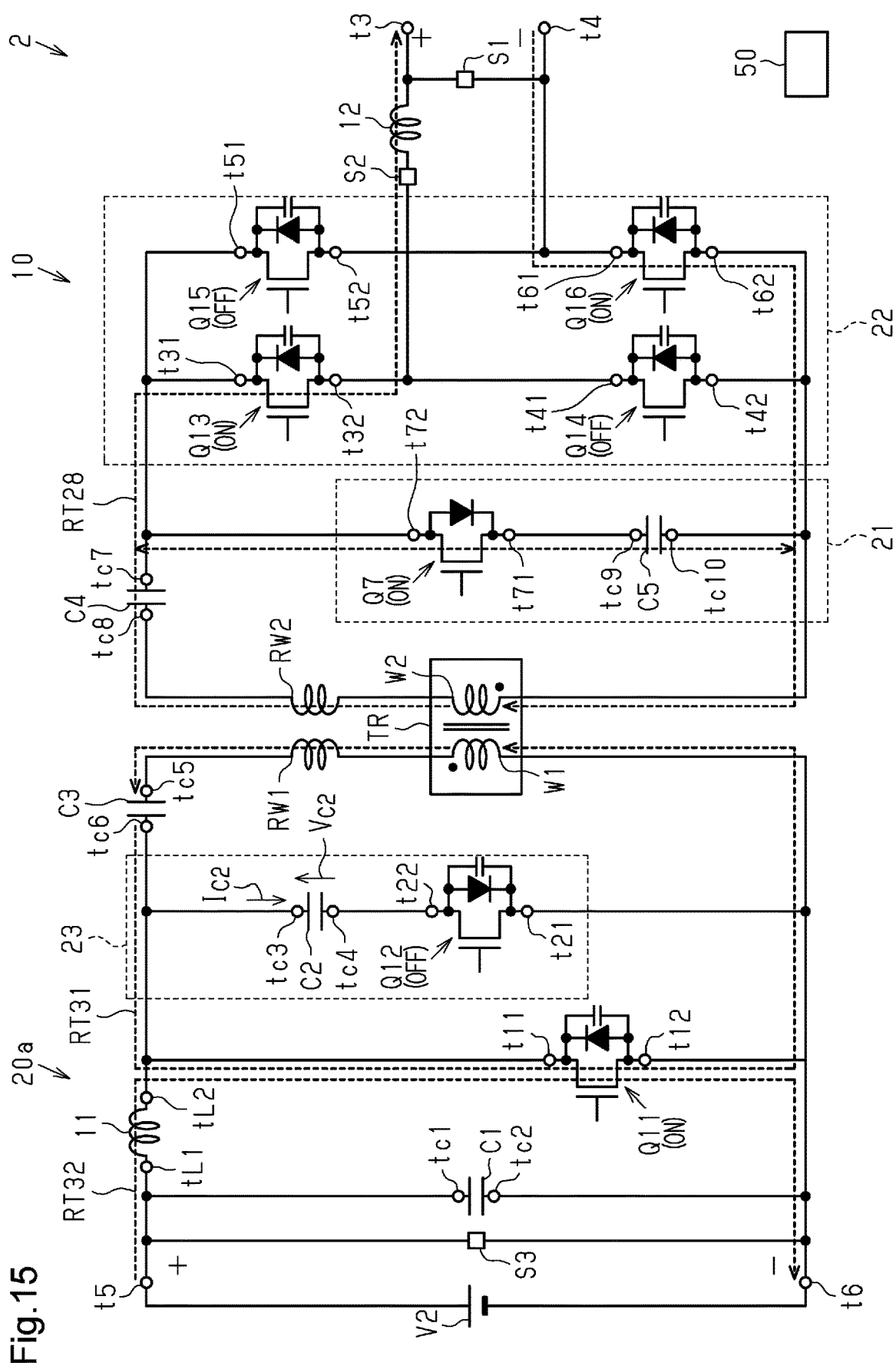
FIG. 15 is a diagram showing one example of a power converter 2 in a first state $\Psi 1$.

As shown in FIG. 15, the power converter 2 includes the switching elements Q11 to Q16 in place of the switching elements Q1 to Q6. The switching elements Q11 to Q16 are the same as the switching elements Q1 to Q6 except that a capacitor is provided between the drain and the source. The switching elements Q12 to Q16 are provided at positions that correspond to the positions of the switching elements Q2 to Q6. In contrast, the position of the rectification switching element Q11 does not correspond to the position of the rectification switching element Q1. The position of the rectification switching element Q11 will now be described.

The direct-current-side circuit 20 is replaced by the direct-current-side circuit 20a. The direct-current-side circuit 20a is different from the direct-current-side circuit 20 in that the positions of the direct-current-side inductor 11 and the rectification switching element Q11 are reversed. Specifically, the head of the direct-current-side winding W1 is connected to the first terminal tc5 of the direct-current-side capacitor C3, and the second terminal tc6 of the direct-current-side capacitor C3 is connected to the second terminal tL2 of the direct-current-side inductor 11 and to the first terminal t11 of the rectification switching element Q11. The tail of the direct-current-side winding W1 is connected to the second terminal t12 of the rectification switching element Q11. The first terminal tL1 of the direct-current-side inductor 11 is connected to the first direct-current connection terminal t5.

In the power converter 2, the directions of the direct-current-side buffer switching element Q12 and the direct-current-side buffer capacitor C2 are reversed from those in the power converter 1. Specifically, the first terminal tc3 of the direct-current-side buffer capacitor C2 is connected to the second terminal tc6 of the direct-current-side capacitor C3 and to the second terminal tL2 of the direct-current-side inductor 11. The second terminal tc4 of the direct-current-side buffer capacitor C2 is connected to the second terminal t22 of the direct-current-side buffer switching element Q12. The first terminal t21 of the direct-current-side buffer switching element Q12 is connected to the second connection terminal t6.

Further, in the power converter 2, the polarity of the alternating-current-side winding W2 is opposite from that in the power converter 1. Accordingly, the head of the alternating-current-side winding W2 is connected to the second terminal t42 of the first lower arm switching element Q14 and to the second terminal t62 of the second lower arm switching element Q16. The tail of the alternating-current-side winding W2 is connected to the second terminal tc8 of the alternating-current-side capacitor C4.

An inductor RW1 is connected in series with the direct-current-side winding W1. The inductance of the inductor RW1 may be sufficiently less than the inductance of the direct-current-side winding W1. In addition to the direct-current-side winding W1, another inductor may be provided. A leakage inductor of the direct-current-side winding W1 may be used. Also, an inductor RW2 may be connected in series with the alternating-current-side winding W2. In the following description, the inductors RW1, RW2 will respectively be referred to as a leakage inductor of the direct-current-side winding W1 and a leakage inductor of the alternating-current-side winding W2.

[Detailed Description of Switching Control by Controlling Unit 50]

The present embodiment has eight switching patterns: a first pattern β1 to an eighth pattern β8. A series of switching actions for changing the switching pattern in the order of β1, β2, β3, β4, β5, β6, β7, β8, and back to β1 is regarded as one unit. The controlling unit 50 executes a switching control by repeatedly performing the unit of switching actions at a specific cycle (switching cycle). The switching cycle is sufficiently short in relation to the cycle of the alternating-current voltage Vo. For example, the cycle of the alternating-current voltage Vo is 20 ms, whereas the switching cycle is 10 μs.

The first pattern β1 is a switching pattern in which the rectification switching element Q11, the first upper arm switching element Q13, the second lower arm switching element Q16, and the alternating-current-side buffer switching element Q7 are in the conducting state, and the direct-current-side buffer switching element Q12, the first lower arm switching element Q14, and the second upper arm switching element Q15 are in the non-conducting state.

The second pattern β2 is a switching pattern in which the rectification switching element Q11 and the alternating-current-side buffer switching element Q7 are in the conducting state, and the direct-current-side buffer switching element Q12, the first upper arm switching element Q13, the first lower arm switching element Q14, the second upper arm switching element Q15, and the second lower arm switching element Q16 are in the non-conducting state.

Third pattern β3 is a switching pattern in which the rectification switching element Q11 is in the conducting state, and the direct-current-side buffer switching element Q12, the first upper arm switching element Q13, the first lower arm switching element Q14, the second upper arm switching element Q15, the second lower arm switching element Q16, and the alternating-current-side buffer switching element Q7 are in the non-conducting state.

The fourth pattern β4 is a switching pattern in which the rectification switching element Q11, direct-current-side buffer switching element Q12, the first upper arm switching element Q13, the first lower arm switching element Q14, the second upper arm switching element Q15, the second lower arm switching element Q16, and the alternating-current-side buffer switching element Q7 are all in the non-conducting state.

The fifth pattern β5 is a switching pattern in which the direct-current-side buffer switching element Q12 is in the conducting state, and the rectification switching element Q11, the first upper arm switching element Q13, the first lower arm switching element Q14, the second upper arm switching element Q15, the second lower arm switching element Q16, and the alternating-current-side buffer switching element Q7 are in the non-conducting state.

The sixth pattern β6 is a switching pattern in which the direct-current-side buffer switching element Q12, the first upper arm switching element Q13, and the second lower arm switching element Q16 are in the conducting state, and the rectification switching element Q11, the first lower arm switching element Q14, the second upper arm switching element Q15, and the alternating-current-side buffer switching element Q7 are in the non-conducting state.

The seventh pattern β7 is a switching pattern in which the first upper arm switching element Q13 and the second lower arm switching element Q16 are in the conducting state, and the rectification switching element Q11, the direct-current-side buffer switching element Q12, the first lower arm switching element Q14, the second upper arm switching element Q15, and the alternating-current-side buffer switching element Q7 are in the non-conducting state.

The eighth pattern β8 is a switching pattern in which the rectification switching element Q11, the first upper arm switching element Q13, and the second lower arm switching element Q16 are in the conducting state, and the direct-current-side buffer switching element Q12, the first lower arm switching element Q14, the second upper arm switching element Q15, and the alternating-current-side buffer switching element Q7 are in the non-conducting state.

With reference to FIGS. 15 to 24, operation of the power converter 2 will be described. The power converter 2 converts the direct-current voltage Vi supplied by the direct-current power supply V2 to the alternating-current voltage Vo and outputs the alternating-current voltage Vo.

The controlling unit 50 repeatedly executes the switching control in which the switching pattern is changed from the first pattern β1, then sequentially changed from the second pattern β2 to the eighth pattern β8, and back to the first pattern β1. This shifts the state of the power converter 2 from a first state Ψ1 to a tenth state Ψ10. Each of these states will now be described.

An action of causing the alternating-current potential to be negative is the same as an action of causing the alternating-current potential to be positive except that the action of the first upper arm switching element Q13 and the action of the second upper arm switching element Q15 are interchanged, and the action of the first lower arm switching element Q14 and the action of the second lower arm switching element Q16 are interchanged. Accordingly, the action of causing the alternating-current potential to be positive will be described, and description of the action of causing the alternating-current potential to be negative will be omitted.

[First State Ψ1]

The first state Ψ1 shown in FIG. 15 is a state in which the controlling unit 50 has set the switching pattern to the first pattern β1. In the first state Ψ1, a current flows through a current path RT31 and a current path RT32, which are created by supply of power from the direct-current power supply V2, on the direct-current side of the power converter 2 as shown in FIG. 15.

The current path RT31 leads from the head of the direct-current-side winding W1 to the tail of the direct-current-side winding W1 via the leakage inductor RW1 of the direct-current-side winding W1, the direct-current-side capacitor C3, and the rectification switching element Q11. That is, the direct-current-side winding current Ip in the negative direction flows through the direct-current-side winding W1. The current path RT32 leads from the first direct-current connection terminal t5, which is connected to the direct-current power supply V2, to the second connection terminal t6 via the direct-current-side inductor 11 and the rectification switching element Q11. The direct-current voltage Vi is applied between the opposite ends of the direct-current-side inductor 11 in the positive direction. This increases the direct-current-side inductor current $I_{L1}$. The direct-current-side capacitor voltage $V_{C3}$ is applied to the direct-current-side winding W1 in the negative direction.

In the first state Ψ1, a current flows through the current path RT28 on the alternating-current side of the power converter 2. The current path RT28 leads from the tail of the alternating-current-side winding W2 to the head of the alternating-current-side winding W2 via the leakage inductor RW2 of the alternating-current-side winding W2, the alternating-current-side capacitor C4, the first upper arm switching element Q13, the alternating-current-side inductor 12, the load connected to the alternating-current connection terminals t3, t4, and the second lower arm switching element Q16. That is, the alternating-current-side winding current Is in the negative direction flows through the current path RT28. When a voltage in the negative direction is applied to the direct-current-side winding W1, the alternating-current-side winding voltage $V_{T2}$ is generated in the alternating-current-side winding W2 in the negative direction. This causes the alternating-current-side winding current Is in the negative direction to flow to the bridge circuit 22 via the alternating-current-side capacitor C4. The voltage difference between the alternating-current-side buffer capacitor voltage $V_{C5}$ and the alternating-current voltage Vo is applied to the alternating-current-side inductor 12. This increases the alternating-current-side inductor current $I_{L2}$, which flows through the alternating-current-side inductor 12, and increases the alternating-current voltage Vo.

The current difference between the alternating-current-side winding current Is and the alternating-current-side inductor current $I_{L2}$ flows through the alternating-current-side buffer capacitor C5. Specifically, when the alternating-current-side inductor current $I_{L2}$ is greater than the alternating-current-side winding current Is, the alternating-current-side buffer capacitor current $I_{C5}$ flows in the negative direction. When the alternating-current-side winding current Is is greater than the alternating-current-side inductor current $I_{L2}$, the alternating-current-side buffer capacitor current $I_{C5}$ flows in the positive direction. The alternating-current-side buffer capacitor current $I_{C5}$ in the positive direction charges the alternating-current-side buffer capacitor C5.

[Second State Ψ2]

Figure 16:
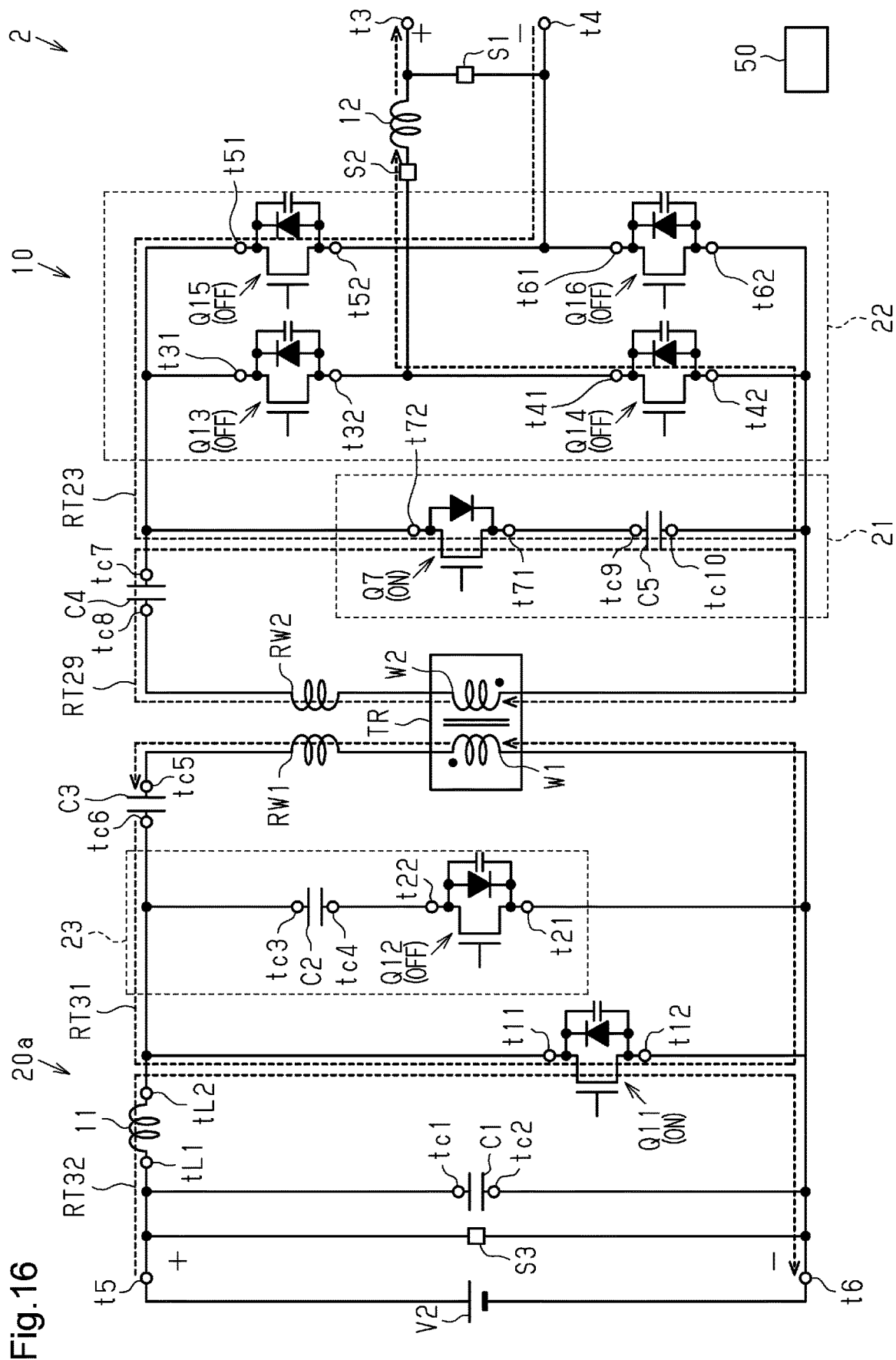
FIG. 16 is a diagram showing one example of the power converter 2 in a second state $\Psi 2$.

The second state Ψ2 shown in FIG. 16 is a state in which the controlling unit 50 has set the switching pattern to the second pattern β2. In the second state Ψ2, a current flows through the current path RT31 and the current path RT32 on the direct-current side of the power converter 2 as shown in FIG. 16. The current path RT31 and the current path RT32 are configured in the above-described manner.

In the second state Ψ2, a current flows through a current path RT29 and a current path RT23 on the alternating-current side of the power converter 2. The current path RT23 is configured in the above-described manner. The current path RT29 leads from the tail of the alternating-current-side winding W2 to the head of the alternating-current-side winding W2 via the leakage inductor RW2 of the alternating-current-side winding W2, the alternating-current-side capacitor C4, the alternating-current-side buffer switching element Q7, and the alternating-current-side buffer capacitor C5. That is, the alternating-current-side winding current Is in the negative direction flows through the current path RT29. When the first upper arm switching element Q13 and the second lower arm switching element Q16 are in the non-conducting state due to the continuity of the alternating-current-side inductor current $I_{L2}$, part of the alternating-current-side inductor current $I_{L2}$ discharges the capacitor provided between the drain and the source of the second upper arm switching element Q15, and simultaneously charges the capacitor provided between the drain and the source of the first upper arm switching element Q13. Another part of the alternating-current-side inductor current $I_{L2}$ discharges the capacitor provided between the drain and the source of the first lower arm switching element Q14 and charges the capacitor provided between the drain and the source of the second lower arm switching element Q16. After the first upper arm switching element Q13 and the second lower arm switching element Q16 are set to the non-conducting state, the first upper arm switching element voltage $V_{Q3}$ and the second lower arm switching element voltage $V_{Q6}$ gradually increase as each capacitor provided between the drain and the source is charged. Thus, when set to the non-conducting state, the first upper arm switching element Q13 and the second lower arm switching element Q16 enter zero voltage switching (ZVS) mode and thus reduce switching loss.

When the capacitor provided between the drain and the source of the first lower arm switching element Q14 and the capacitor provided between the drain and the source of the second upper arm switching element Q15 are discharged, the body diodes of the first lower arm switching element Q14 and the second upper arm switching element Q15 become conductive. Substantially simultaneously, the capacitor provided between the drain and the source of the first upper arm switching element Q13 and the capacitor provided between the drain and the source of the second lower arm switching element Q16 are charged. The alternating-current-side inductor current $I_{L2}$ flows to the alternating-current-side buffer capacitor C5 via the body diode of the second upper arm switching element Q15 and the alternating-current-side buffer switching element Q7. The sum of the alternating-current-side buffer capacitor voltage $V_{C5}$ and the alternating-current voltage Vo is applied to the alternating-current-side inductor 12 in the negative direction. This reduces the alternating-current-side inductor current $I_{L2}$, which flows through the alternating-current-side inductor 12.

The period of the second state Ψ2 is a period of dead time. Therefore, the second state Ψ2 may be relatively short as long as it is sufficient to charge the capacitor provided between the drain and the source of the first upper arm switching element Q13 and the capacitor provided between the drain and the source of the second lower arm switching element Q16, and discharge the capacitor provided between the drain and the source of the first lower arm switching element Q14 and the capacitor provided between the drain and the source of the second upper arm switching element Q15.

[Third State Ψ3]

Figure 17:
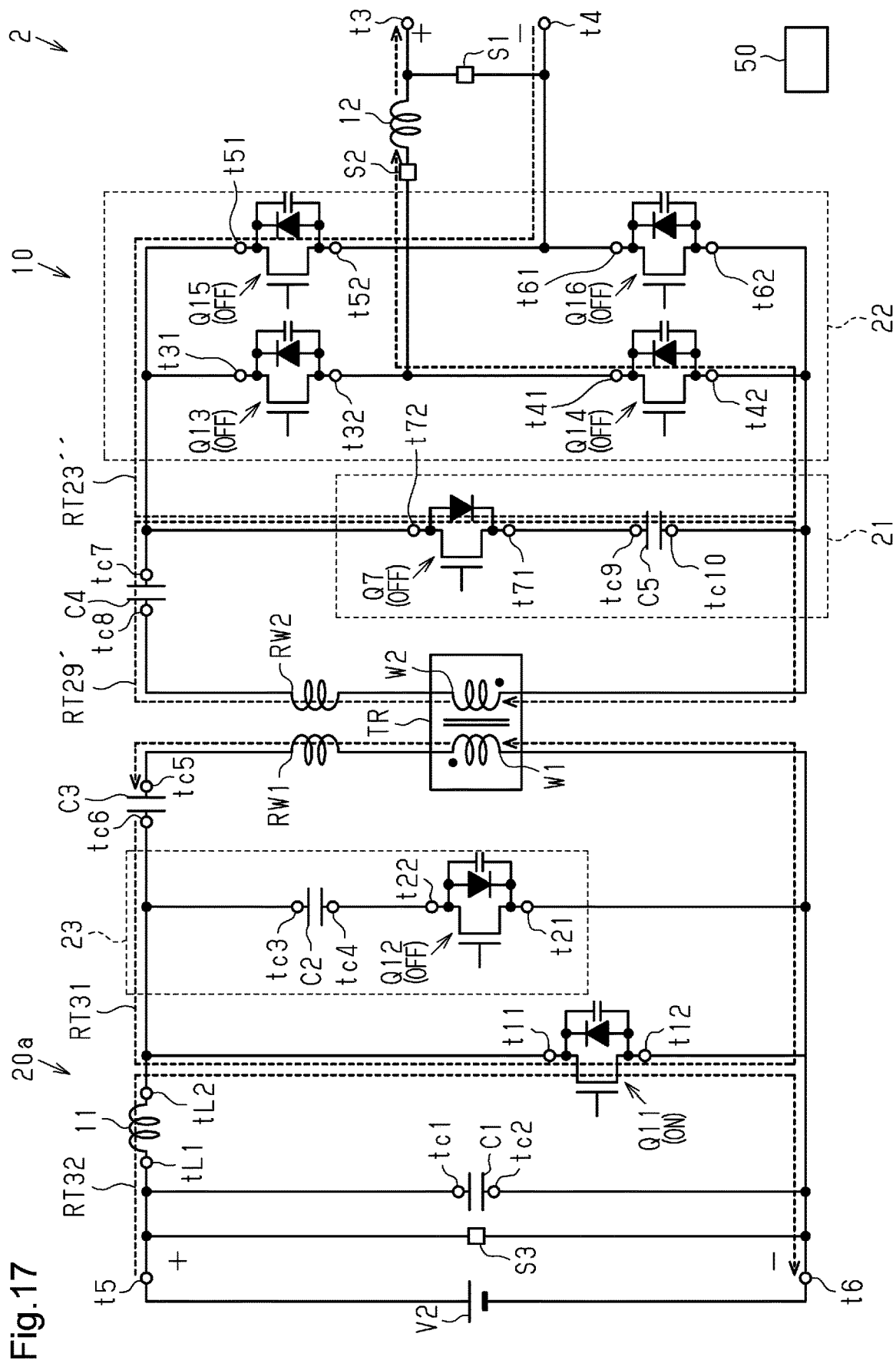
FIG. 17 is a diagram showing one example of the power converter 2 in a third state Ψ3.

The third state Ψ3 shown in FIG. 17 is a state in which the controlling unit 50 has set the switching pattern to the third pattern β3. In the third state Ψ3, a current flows through the current path RT31 and the current path RT32 on the direct-current side of the power converter 2 as shown in FIG. 17. The current path RT31 and the current path RT32 are configured in the above-described manner. In the third state Ψ3, a current flows through the current path RT29 and a current path RT23" on the alternating-current side of the power converter 2. The current that would flow through the alternating-current-side buffer switching element Q7 in the current path RT23 flows through the body diode of the alternating-current-side buffer switching element Q7 in the current path RT23". The current that would flow through the alternating-current-side buffer switching element Q7 in the current path RT29 flows through the body diode of the alternating-current-side buffer switching element Q7 in the current path RT29'.

After the alternating-current-side buffer switching element Q7 is set to the non-conducting state, the alternating-current-side winding current Is and the alternating-current-side inductor current $I_{L2}$ flow through the body diode of the alternating-current-side buffer switching element Q7. Thus, even if the alternating-current-side buffer switching element Q7 is in the non-conducting state, the voltage between the drain and the source of the alternating-current-side buffer switching element Q7 will not increase. Thus, when set to the non-conducting state, the alternating-current-side buffer switching element Q7 enters the ZVS mode and thus reduces switching loss. The period of the third state Ψ3 is a period of dead time. Thus, the period of the third state Ψ3 may be shorter than other periods.

[Fourth State Ψ4]

Figure 18:
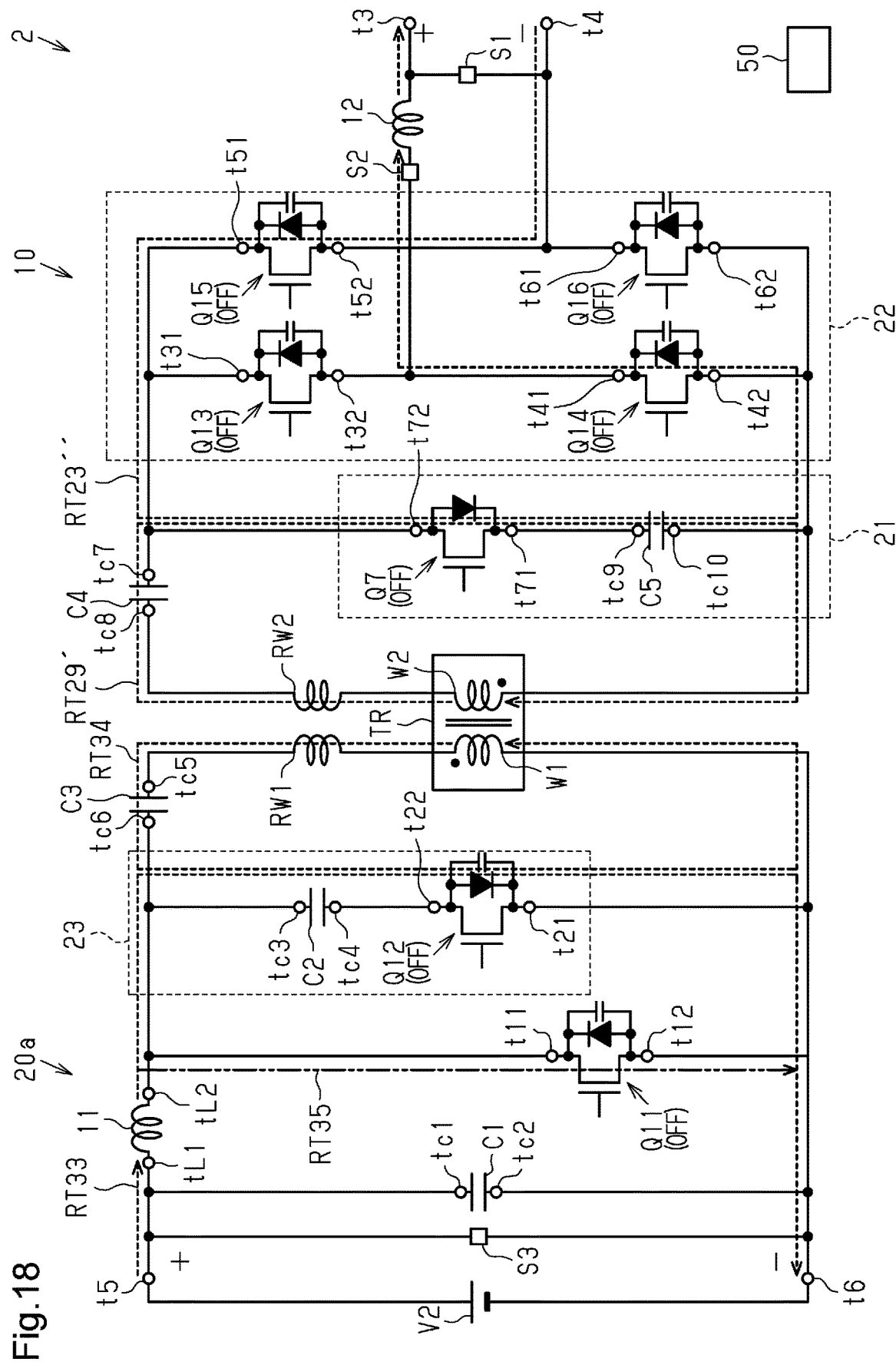
FIG. 18 is a diagram showing one example of the power converter 2 in a fourth state Ψ4.

The fourth state Ψ4 shown in FIG. 18 is a state in which the controlling unit 50 has set the switching pattern to the fourth pattern β4. In the fourth pattern β4, a current flows through the current path RT33, the current path RT34, and the current path RT35 on the direct-current side of the power converter 2 as shown in FIG. 18.

The current path RT33 leads from the first direct-current connection terminal t5, which is connected to the direct-current power supply V2, to the second connection terminal t6 via the direct-current-side inductor 11, the direct-current-side buffer capacitor C2, and the body diode of the direct-current-side buffer switching element Q12. The direct-current-side inductor current $I_{L1}$ flows through the current path RT33 by the current continuity of the direct-current-side inductor 11. The current path RT34 leads from the head of the direct-current-side winding W1 to the tail of the direct-current-side winding W1 via the leakage inductor RW1, the direct-current-side capacitor C3, the direct-current-side buffer capacitor C2, and the body diode of the direct-current-side buffer switching element Q12. The direct-current-side winding current Ip flows through the current path RT34 by the continuity of current through the excitation inductor and the leakage inductor RW1 of the direct-current-side winding W1. The direction of the direct-current-side winding voltage $V_{T1}$ changes since the state in which the direct-current voltage Vi is applied is changed to the state in which the voltage difference between the direct-current-side buffer capacitor voltage $V_{C2}$ and the direct-current-side capacitor voltage $V_{C3}$ is applied in the positive direction. This increases the direct-current-side winding current Ip in the negative direction (decreases the absolute value).

In the current path RT35, part of the direct-current-side inductor current $I_{L1}$ flowing through current path RT33 flows from the node between the second terminal tL2 and the second terminal tc6 to the second connection terminal t6 via the rectification switching element Q11. After the rectification switching element Q11 is set to the non-conducting state, part of the direct-current-side inductor current $I_{L1}$ flows through current path RT35, so that the capacitor provided between the drain and the source of the rectification switching element Q11 is charged. When the capacitor provided between the drain and the source of the rectification switching element Q11 is charged, the rectification switching element voltage $V_{Q1}$ gradually increases. Thus, when set to the non-conducting state, the rectification switching element Q11 enters the ZVS mode and thus reduces switching loss. When the capacitor provided between the drain and the source of the rectification switching element Q11 is charged, current stops flowing through the current path RT35.

In the fourth state Ψ4, a current flows through the current path RT29' and the current path RT23" on the alternating-current side of the power converter 2. The current path RT29' and the current path RT23" are configured in the above-described manner. The alternating-current-side winding current Is flows through the current path RT29' by the current continuity of the leakage inductor RW2 of the alternating-current-side winding W2. When the direction of the direct-current-side winding voltage $V_{T1}$ is changed, the direction of the alternating-current-side winding voltage $V_{T2}$ is changed, so that the alternating-current-side winding current Is in the negative direction is reduced. The period of the fourth state Ψ4 is a period of dead time. Thus, the period of the fourth state Ψ4 may be shorter than other periods.

[Fifth State Ψ5]

Figure 19:
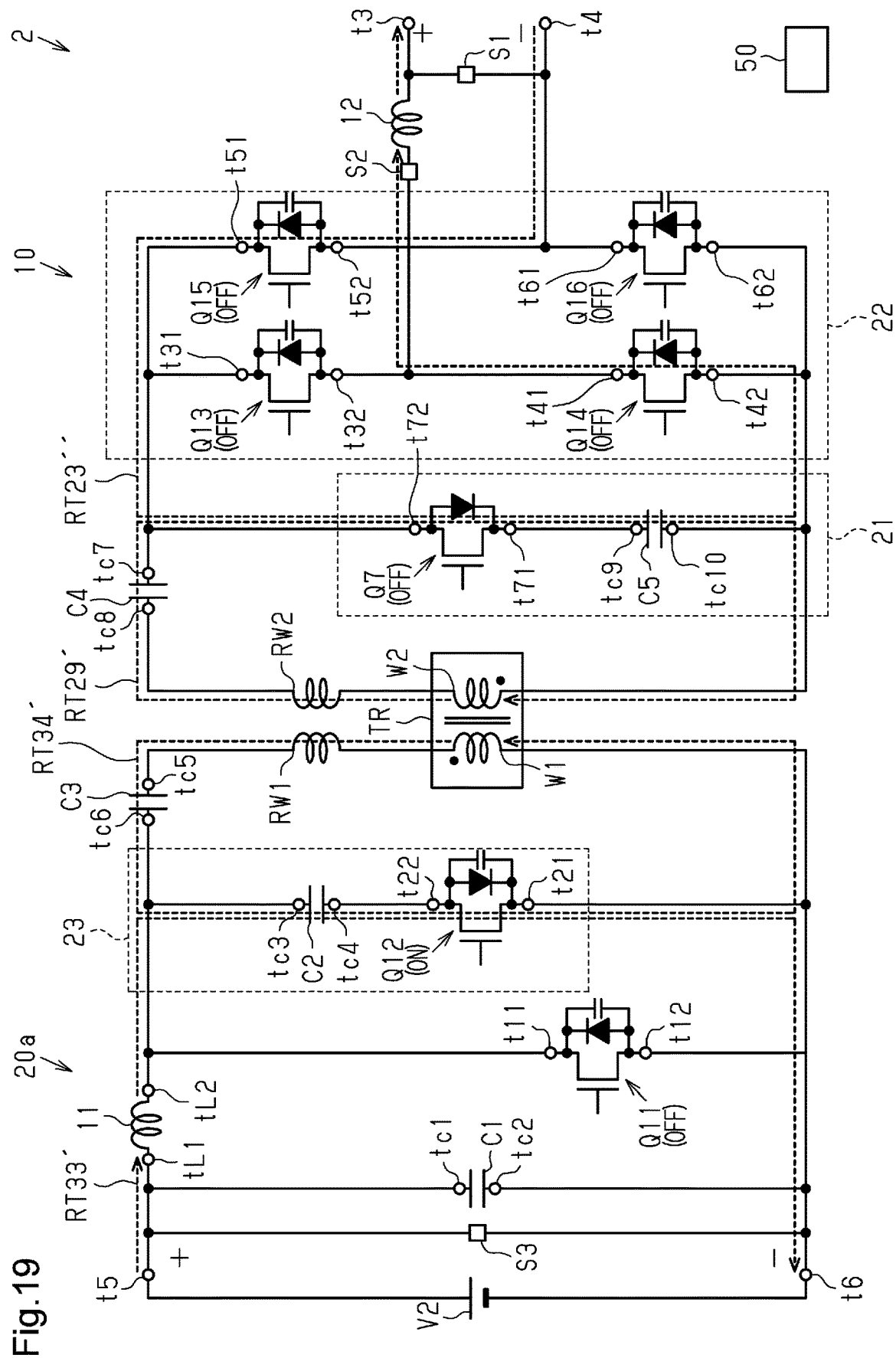
FIG. 19 is a diagram showing one example of the power converter 2 in a fifth state Ψ5.

The fifth state Ψ5 shown in FIG. 19 is a state in which the controlling unit 50 has set the switching pattern to the fifth pattern β5. In the fifth state Ψ5, a current flows through the current path RT33' and the current path RT34' on the direct-current side of the power converter 2 as shown in FIG. 19. The current that would flow through the body diode of the direct-current-side buffer switching element Q12 in the current path RT33 flows through the direct-current-side buffer switching element Q12 in the current path RT33'. The current that would flow through the body diode of the direct-current-side buffer switching element Q12 in the current path RT34 flows through the direct-current-side buffer switching element Q12 in the current path RT34'. This reduces the resistance of the current path RT33' and the current path RT34' compared to that of the current path RT33 and the current path RT34. When the body diode is in the conducting state and the direct-current-side buffer switching element voltage $V_{Q2}$ is substantially 0V, the direct-current-side buffer switching element Q12 is set to the conducting state and enters the ZVS mode. The direct-current-side buffer switching element Q12 thus reduces switching loss.

In the fifth state Ψ5, a current flows through the current path RT29' and the current path RT23" on the alternating-current side of the power converter 2. The current path RT29' and the current path RT23" are configured in the above-described manner.

[Sixth State Ψ6]

Figure 20:
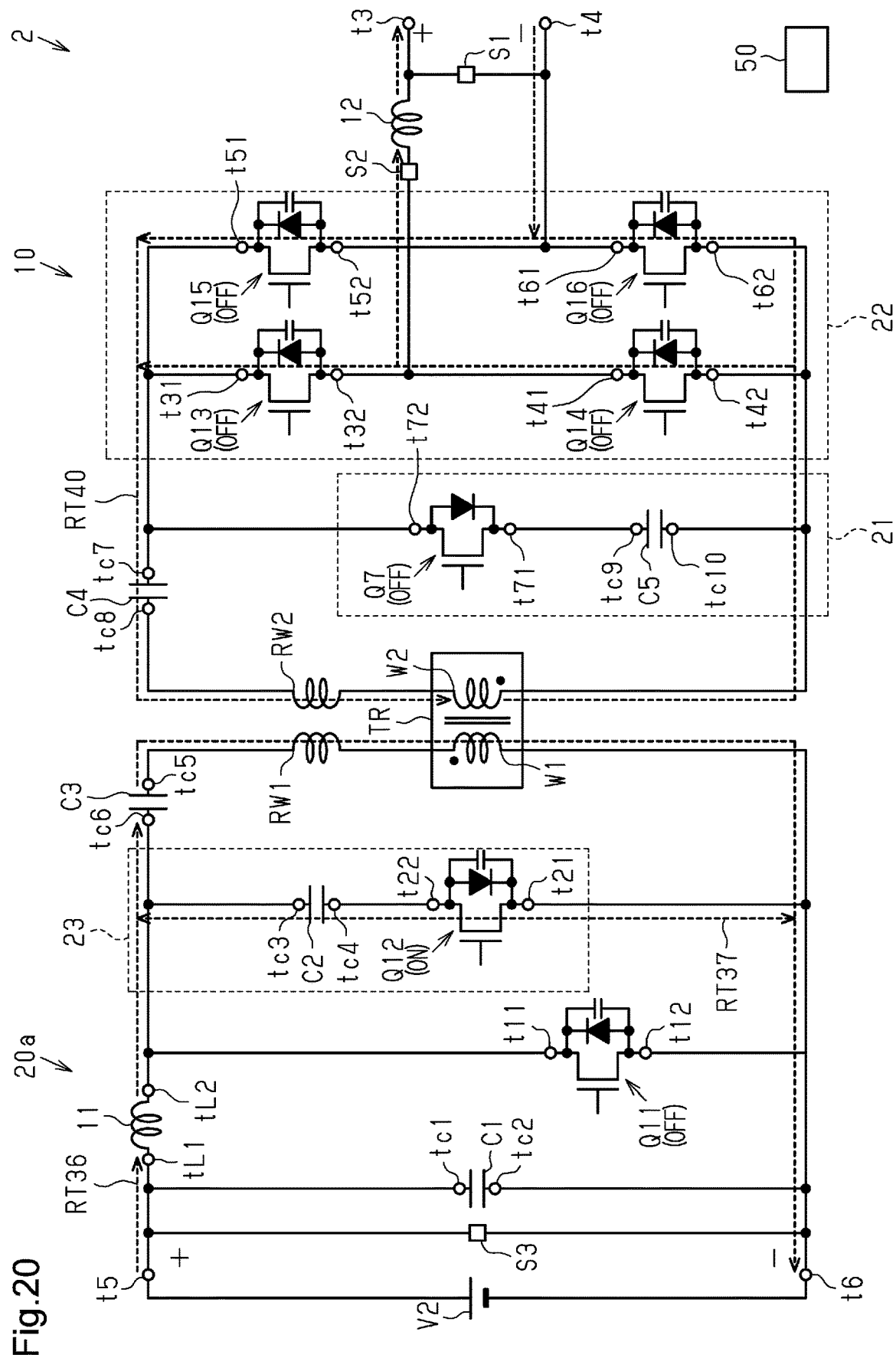
FIG. 20 is a diagram showing one example of the power converter 2 in a sixth state Ψ6.

The sixth state Ψ6 shown in FIG. 20 is a state after a specific time has elapsed since the controlling unit 50 set the switching pattern to the fifth pattern β5 so that the state was shifted to the fifth state Φ5. In the sixth state Ψ6, a current flows through the current path RT36 and the current path RT37 on the direct-current side of the power converter 2 as shown in FIG. 20.

The current path RT36 leads from the first direct-current connection terminal t5, which is connected to the direct-current power supply V2, to the second connection terminal t6 via the direct-current-side inductor 11, the direct-current-side capacitor C3, the leakage inductor RW1, and the direct-current-side winding W1. That is, the direct-current-side winding current Ip in the positive direction flows through the current path RT36. During the period from the fourth state Ψ4 to the fifth state Ψ5, the direct-current-side winding current Ip in the negative direction is increased. In the sixth state Ψ6, the direction of the direct-current-side winding current Ip is changed from the negative direction to the positive direction.

The current difference between the direct-current-side inductor current $I_{L1}$ and the direct-current-side winding current Ip flows through the current path RT37. Specifically, when the direct-current-side inductor current $I_{L1}$ is greater than the direct-current-side winding current Ip, the direct-current-side buffer capacitor current $I_{C2}$ in the positive direction flows. Since the direct-current-side buffer capacitor current $I_{C2}$ in the positive direction flows, the direct-current-side buffer capacitor C2 is charged. When the direct-current-side winding current Ip is greater than the direct-current-side inductor current $I_{L1}$, the direct-current-side buffer capacitor current $I_{C2}$ in the negative direction flows.

In the sixth state Ψ6, a current flows through the current path RT40 on the alternating-current side of the power converter 2. The current path RT40 leads from the head of the alternating-current-side winding W2, branches into a path including the body diode of the first lower arm switching element Q14 and the body diode of the first upper arm switching element Q13 and a path including the body diode of the second lower arm switching element Q16 and the body diode of the second upper arm switching element Q15, joins the first terminal tc7 of the alternating-current-side capacitor C4, and reaches the tail of the alternating-current-side winding W2 via the alternating-current-side capacitor C4 and the leakage inductor RW2. That is, the alternating-current-side winding current Is in the positive direction flows through the current path RT40. The alternating-current-side winding current Is in the negative direction is increased during the period from the fourth state Ψ4 to the fifth state Φ5, and the direction of the alternating-current-side winding current Is is changed from the negative direction to the positive direction in the sixth state Ψ6. The current path RT40 also includes a path that allows the current flowing through the body diode of the first lower arm switching element Q14 branches at the node between the first lower arm switching element Q14 and the first upper arm switching element Q13, and joins the current flowing through the body diode of the second lower arm switching element Q16 via the alternating-current-side inductor 12 and the load connected to the alternating-current connection terminals t3, t4. The alternating-current voltage Vo in the negative direction continues to be applied to the alternating-current-side inductor 12, so that the alternating-current-side inductor current $I_{L2}$ decreases.

[Seventh State Ψ7]

Figure 21:
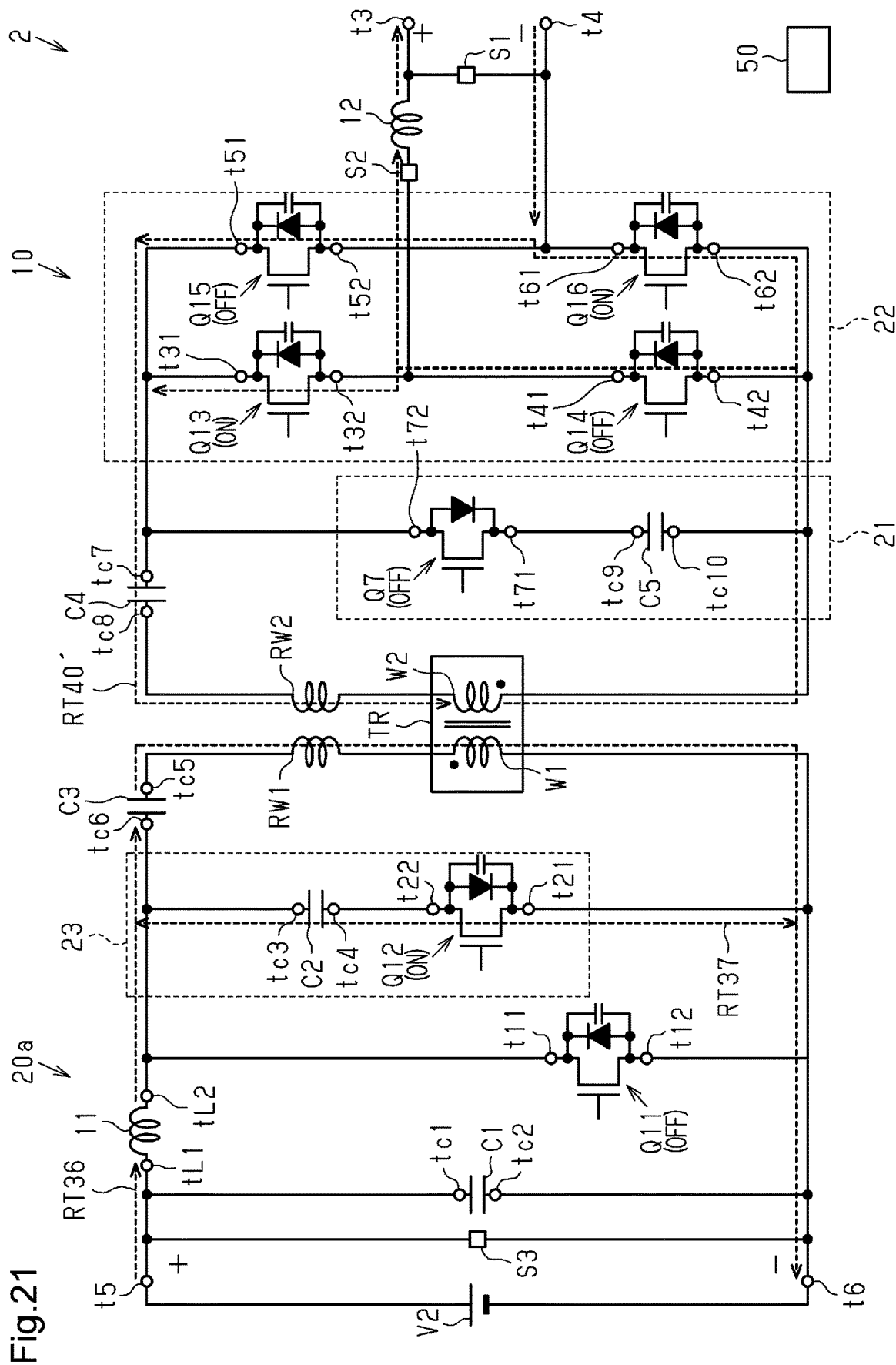
FIG. 21 is a diagram showing one example of the power converter 2 in a seventh state Ψ7.

The seventh state Ψ7 shown in FIG. 21 is a state in which the controlling unit 50 has set the switching pattern to the sixth pattern β6. In the seventh state Ψ7, a current flows through the current path RT36 and the current path RT37 on the direct-current side of the power converter 2 as shown in FIG. 21. The current path RT36 and the current path RT37 are configured in the above-described manner.

In the seventh state Ψ7, a current flows through a current path RT40' on the alternating-current side of the power converter 2. The current that would flow through the body diode of the first upper arm switching element Q13 and the body diode of the second lower arm switching element Q16 in the current path RT40 flows through the first upper arm switching element Q13 and the second lower arm switching element Q16 in the current path RT40'.

When the body diodes are in the conducting state and the drain-source voltage is substantially 0V, the first upper arm switching element Q13 and the second lower arm switching element Q16 are set to the conducting state and thus enter the ZVS mode. The first upper arm switching element Q13 and the second lower arm switching element Q16 thus reduce switching loss.

[Eighth State Ψ8]

Figure 22:
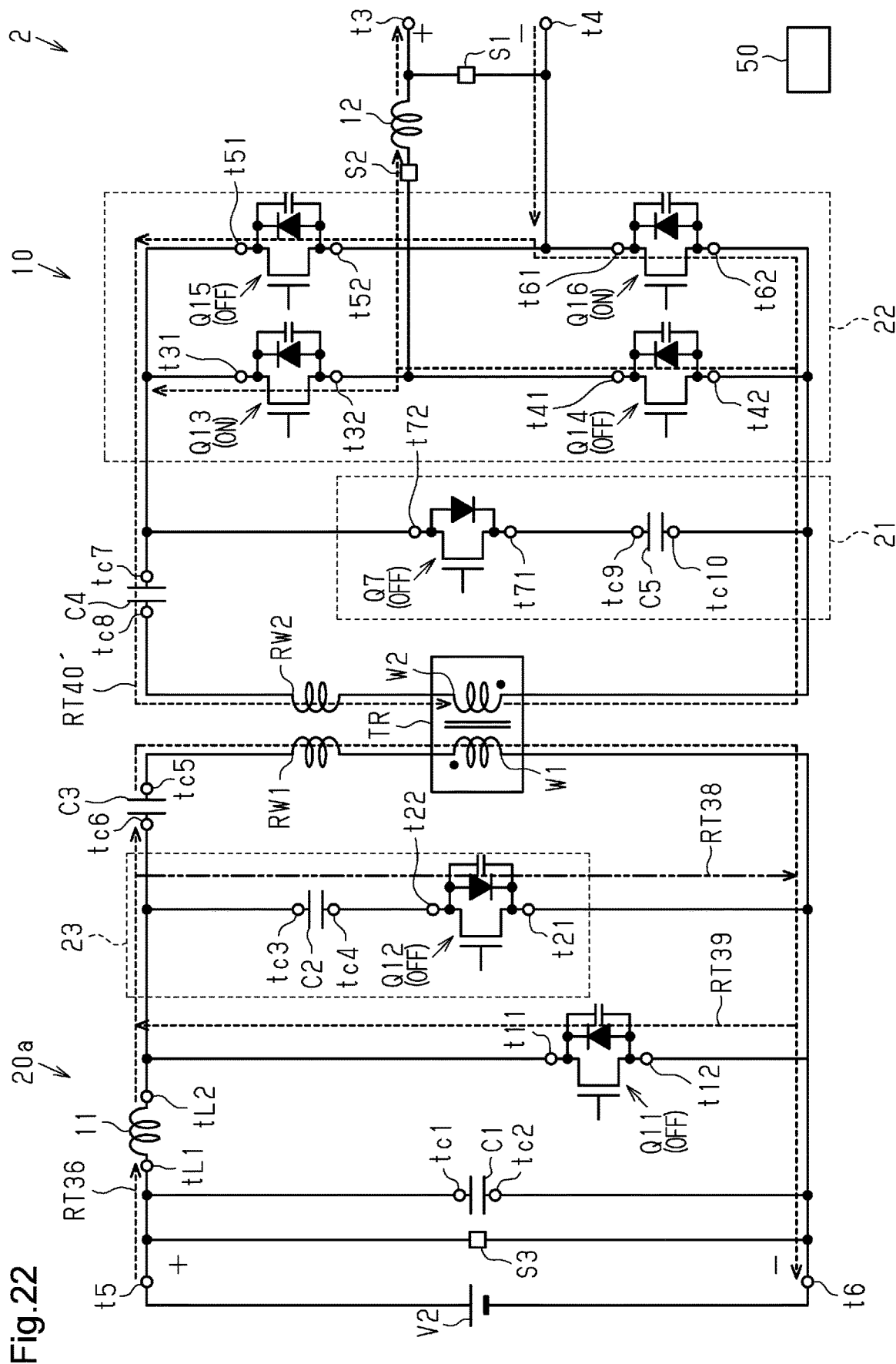
FIG. 22 is a diagram showing one example of the power converter 2 in an eighth state Ψ8.

The eighth state Ψ8 shown in FIG. 22 is a state in which the controlling unit 50 has set the switching pattern to the seventh pattern β7. In the eighth state Ψ8, a current flows through the current path RT36, the current path RT38, and the current path RT39 on the direct-current side of the power converter 2 as shown in FIG. 22. The current path RT36 is configured in the above-described manner.

The current path RT38 branches from the current path RT36 at the node between the second terminal tL2 and the second terminal tc6, and joins the current path RT36 at the tail of the direct-current-side winding W1 via the direct-current-side buffer capacitor C2, and direct-current-side buffer switching element Q12. In the current path RT38, part of the direct-current-side inductor current $I_{L1}$, which flows through current path RT36, flows to the body diode of the direct-current-side buffer switching element Q12 via the direct-current-side buffer capacitor C2. Since the current flows through the current path RT38, the voltage between the drain and the source will not increase even if the direct-current-side buffer switching element Q12 is in the non-conducting state. Thus, when set to the non-conducting state, the direct-current-side buffer switching element Q12 enters the ZVS mode and thus reduces switching loss.

The current path RT39 branches from the current path RT36 at the tail of the direct-current-side winding W1 and joins the current path RT36 at the node between the second terminal tL2 and the second terminal tc6 via the body diode of the rectification switching element Q11. Since the direct-current-side buffer switching element Q12 is set to the non-conducting state in the eighth state Ψ8, the direct-current-side buffer capacitor C2 stops being discharged. Accordingly, the current difference between the direct-current-side inductor current $I_{L1}$ and the direct-current-side winding current Ip flows through the current path RT39. The period of the eighth state Ψ8 is a period of dead time. Thus, the period of the eighth state Ψ8 may be shorter than other periods.

In the eighth state Ψ8, a current flows through the current path RT40' on the alternating-current side of the power converter 2. The current path RT40' is configured in the above-described manner.

[Ninth State Ψ9]

Figure 23:
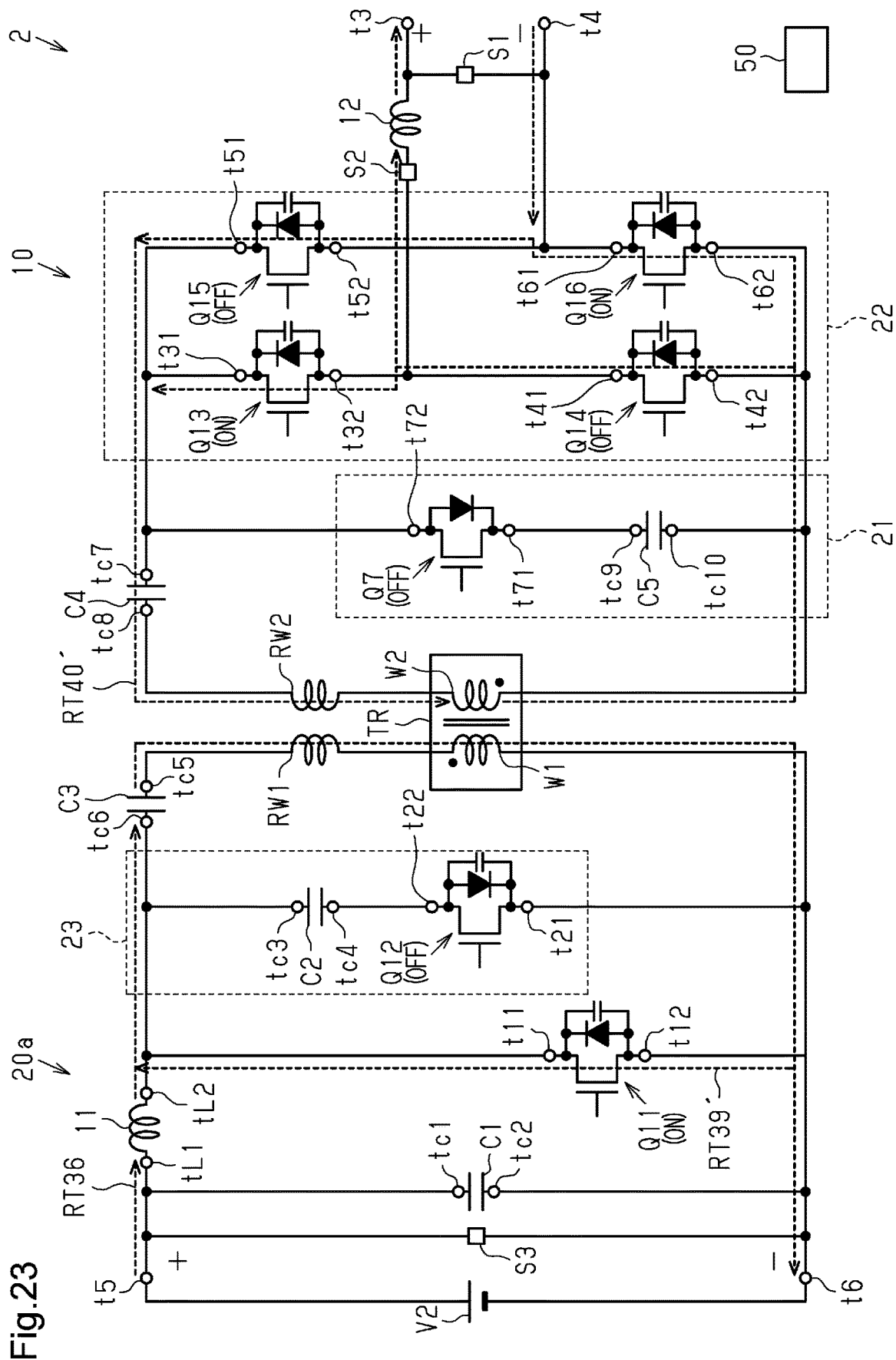
FIG. 23 is a diagram showing one example of the power converter 2 in a ninth state Ψ9.

The ninth state Ψ9 shown in FIG. 23 is a state in which the controlling unit 50 has set the switching pattern to the eighth pattern β8. In the ninth state Ψ9, a current flows through the current path RT36 and the current path RT39' on the direct-current side of the power converter 2 as shown in FIG. 23. The current path RT36 is configured in the above-described manner. The current that would flow through the body diode of the rectification switching element Q11 in the current path RT39 flows through the rectification switching element Q11 in the current path RT39'. This reduces the resistance of the current path RT39' as compared to that of the current path RT39. When set to the conducting state, the rectification switching element Q11 enters the ZVS mode and thus reduces switching loss. The direct-current voltage Vi is applied to the direct-current-side inductor 11. This increases the direct-current-side inductor current $I_{L1}$. The direction of the direct-current-side winding voltage $V_{T1}$ changes since the state in which the direct-current voltage Vi is applied is changed to the state in which the direct-current-side capacitor voltage $V_{C3}$ is applied in the negative direction. This reduces the direct-current-side winding current Ip in the positive direction.

In the ninth state Φ9, a current flows through the current path RT40' on the alternating-current side of the power converter 2. The current path RT40' is configured in the above-described manner. In the ninth state Ψ9, the alternating-current-side winding current Is in the positive direction decreases as the direct-current-side winding current Ip in the positive direction decreases.

[Tenth State Ψ10]

Figure 24:
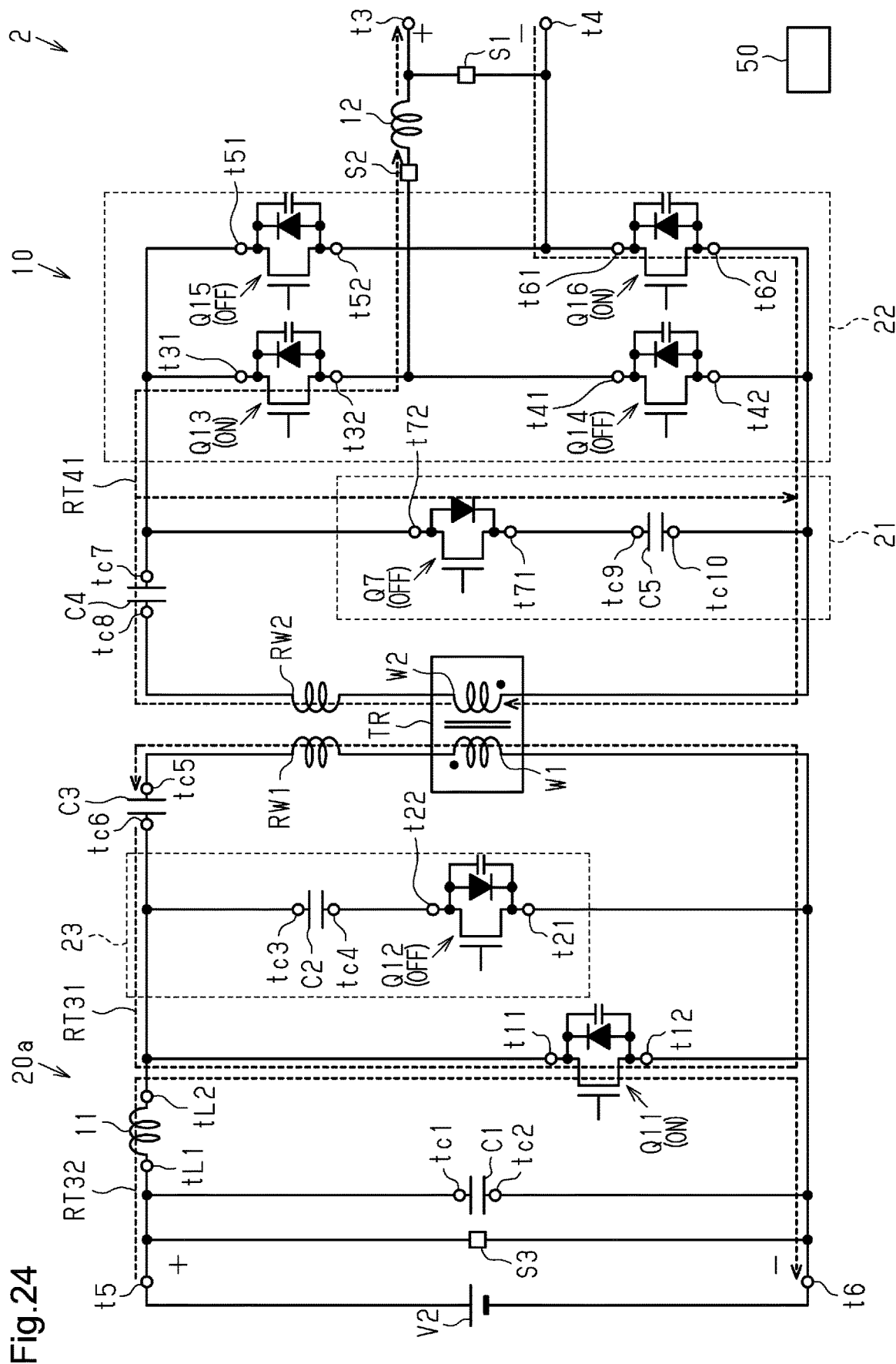
FIG. 24 is a diagram showing one example of the power converter 2 in a tenth state Ψ10.

The tenth state Ψ10 shown in FIG. 24 is a state after a specific time has elapsed since the controlling unit 50 set the switching pattern to the eighth pattern β8 so that the state was shifted to the ninth state Ψ9. In the ninth state Ψ9, the direct-current-side winding current Ip in the positive direction decreases, and the direction of the direct-current-side winding current Ip is changed from the positive direction to the negative direction, so that the state is shifted to the tenth state Ψ10. In the tenth state Ψ10, a current flows through the current path RT31 and the current path RT32 on the direct-current side of the power converter 2 as shown in FIG. 24. The current path RT31 and the current path RT32 are configured in the above-described manner.

In the tenth state Ψ10, a current flows through a current path RT41 on the alternating-current side of the power converter 2. When the direction of the direct-current-side winding current Ip is changed to the negative direction, the direction of the alternating-current-side winding current Is is also changed to the negative direction. The current path RT41 leads from the alternating-current-side inductor 12 to the alternating-current-side inductor 12 via the load connected to the alternating-current connection terminals t3, t4, the second lower arm switching element Q6, the alternating-current-side winding W2, the leakage inductor RW2, the alternating-current-side capacitor C4, and the first upper arm switching element Q13. The voltage difference between the alternating-current-side buffer capacitor voltage $V_{C5}$ and the alternating-current voltage Vo continues to be applied to the alternating-current-side inductor 12 in the positive direction. This increases the alternating-current-side inductor current $I_{L2}$, which flows through the alternating-current-side inductor 12.

When the alternating-current-side winding current Is is greater than the alternating-current-side inductor current $I_{L2}$, the difference between the alternating-current-side winding current Is and the alternating-current-side inductor current $I_{L2}$ branches from the node between the first terminal tc7 and the second terminal t72 and charges the alternating-current-side buffer capacitor C5 via the body diode of the alternating-current-side buffer switching element Q7.

After the tenth state Ψ10, the controlling unit 50 sets the switching pattern to the first pattern β1 and sets the alternating-current-side buffer switching element Q7 to the conducting state, so that state returns to the first state Ψ1.

When the body diode is in the conducting state and the drain-source voltage is substantially 0V, the alternating-current-side buffer switching element Q7 is set to the conducting state and enters the ZVS mode. The alternating-current-side buffer switching element Q7 thus reduces switching loss.

As described above, the action of causing an alternating-current voltage to have a negative polarity is the same as the action in the case in which the alternating-current voltage has a positive polarity except that the action of the first upper arm switching element Q13 and the action of the second upper arm switching element Q15 are interchanged, and the action of the first lower arm switching element Q14 and the action of the second lower arm switching element Q16 are interchanged. By interchanging the action of the first upper arm switching element Q13 and the action of the second upper arm switching element Q15 and interchanging the action of the first lower arm switching element Q14 and the second lower arm switching element Q16, the direction of the voltage applied the alternating-current-side inductor 12 is changed, so that the increasing/decreasing of the alternating-current-side inductor current $I_{L2}$ is reversed. As a result, the polarity of the alternating-current voltage Vo is inverted.

[Advantages of Power Converter 2 According to Present Embodiment]

The above-described embodiment has the following advantages.

(2-1) When the controlling unit 50 controls switching of the switching elements Q11 to Q16 and switching of the alternating-current-side buffer switching element Q7, the power converter 2 shifts the state from the first state Ψ1 to the tenth state 10. The alternating-current-side inductor current $I_{L2}$ increases during the period from the tenth state Ψ10 to the first state Ψ1, and the alternating-current-side inductor current $I_{L2}$ decreases during the period from the second state Ψ2 to the ninth state Ψ9. Accordingly, the alternating-current voltage Vo increases during the period from the tenth state Ψ10 to the first state Ψ1, and the alternating-current voltage Vo decreases during the period from the second state Φ2 to the ninth state Ψ9. The amplitude of the alternating-current voltage Vo is controlled by the ratio of the period from the tenth state Ψ10 to the first state Ψ1 and the period from the second state Ψ2 to the ninth state Ψ9.

The polarity of the alternating-current voltage Vo is inverted by interchanging the action of the first upper arm switching element Q13 and the action of the second upper arm switching element Q15 and interchanging the action of the first lower arm switching element Q14 and the second lower arm switching element Q16. Therefore, while repeating the state shifting from the first state Ψ1 to the tenth state Ψ10, it is possible to change the waveform of the alternating-current voltage Vo to a desired waveform (for example, a sine wave) by combining the following processes: the process for controlling the ratio of the period from the tenth state Ψ10 to the first state Ψ1 and the period from the second state Ψ2 to the ninth state Ψ9; the process for interchanging the action of the first upper arm switching element Q13 and the action of the second upper arm switching element Q15; and the process for interchanging the action of the first lower arm switching element Q14 and the action of the second lower arm switching element Q16.

Accordingly, as compared to the prior art circuit, which uses a total of three full-bridge circuits, the power converter 2 reduces the number of active components such as switching elements and rectifiers. Also, as compared to the prior art circuit, which uses full-bridge circuits, the power converter 2 of the present embodiment includes a relatively small number of active components through which a current flows. The power converter 2 thus reduces the conduction loss in the active components.

(2-2) In the direct-current-side circuit 20, in order to ensure the continuity of current through the inductors (the direct-current-side inductor 11 and the direct-current-side winding W1), the direct-current-side buffer circuit 23 provides detour paths for these currents. In the alternating-current-side circuit 10, in order to ensure the continuity of current through the inductors (the alternating-current-side inductor 12 and the alternating-current-side winding W2), the alternating-current-side buffer circuit 21 provides detour paths for these currents.

With this configuration, the power converter 2 uses the direct-current-side buffer circuit 23 to suppress the occurrence of surge voltage that would be generated by mismatch between continuity of the direct-current-side inductor current $I_{L1}$ through the direct-current-side inductor 11 and current continuity of the excitation inductor of the direct-current-side winding W1. Also, with this configuration, the power converter 2 uses the alternating-current-side buffer circuit 21 to suppress the occurrence of surge voltage that would be generated by mismatch between continuity of the alternating-current-side inductor current $I_{L2}$ through the alternating-current-side inductor 12 and current continuity of the excitation inductor of the alternating-current-side winding W2.

(2-3) The direct-current-side buffer circuit 23 includes the direct-current-side buffer capacitor C2, which is provided between the direct-current-side inductor 11 and the direct-current-side capacitor C3. With this configuration, when the direct-current-side inductor current $I_{L1}$ is greater than the direct-current-side winding current Ip, the direct-current-side buffer capacitor C2 can be charged using the current difference. When the direct-current-side inductor current $I_{L1}$ is less than the direct-current-side winding current Ip, power can be supplied from the direct-current-side buffer capacitor C2 to the direct-current-side winding W1. Accordingly, the difference between the direct-current-side inductor current $I_{L1}$ and the direct-current-side winding current Ip is absorbed by the direct-current-side buffer capacitor C2. This ensures matching of the currents in various sections in the direct-current-side circuit.

Also, the alternating-current-side buffer circuit 21 includes the alternating-current-side buffer capacitor C5, which is provided between the bridge circuit 22 and the alternating-current-side capacitor C4. With this configuration, when the alternating-current-side inductor current $I_{L2}$ is greater than the alternating-current-side winding current Is, the alternating-current-side buffer capacitor C5 can be charged using the current difference. When the alternating-current-side inductor current $I_{L2}$ is less than the alternating-current-side winding current Is, power can be supplied from the alternating-current-side buffer capacitor C5 to the alternating-current-side winding W2. Accordingly, the difference between the alternating-current-side inductor current $I_{L2}$ and the alternating-current-side winding current Is is absorbed by the alternating-current-side buffer capacitor C5. This ensures matching of the currents in various sections in the alternating-current-side circuit.

Further, the rectification switching element Q11 and the switching elements Q13 to Q16 each include a capacitor connected in parallel between the drain and the source. These capacitors start being charged immediately after the rectification switching element Q11 and the switching elements Q13 to Q16 are set to the non-conducting state, and the voltage between the opposite ends gradually increases. Thus, the drain-source voltage of each of the rectification switching element Q11 and the switching elements Q13 to Q16 gradually increases after the switching element is set to the non-conducting state and enters the ZVS mode. This reduces the switching loss of the rectification switching element Q11 and the switching elements Q13 to Q16.

When the body diodes are in the conducting state and the drain-source voltage is substantially 0V, the switching elements Q7 and Q11 to Q16 are set to the conducting state from the non-conducting state and thus enter the ZVS mode. The switching elements Q7 and Q11 to Q16 thus reduce switching loss.

In addition, as in the case of the power converter 1, the power converter 2 increases the use efficiency of the transformer TR.

Third Embodiment

A third embodiment of the present disclosure will now be described with reference to the drawings. A power converter 2 according to the third embodiment converts an alternating-current voltage Vo supplied by an alternating-current power supply V1 to a direct-current voltage Vi and supplies it to a load connected to the power converter 2. Like or the same reference numerals are given to those components that are like or the same as the corresponding components of the above-described embodiments and detailed explanations are omitted.

Figure 25:
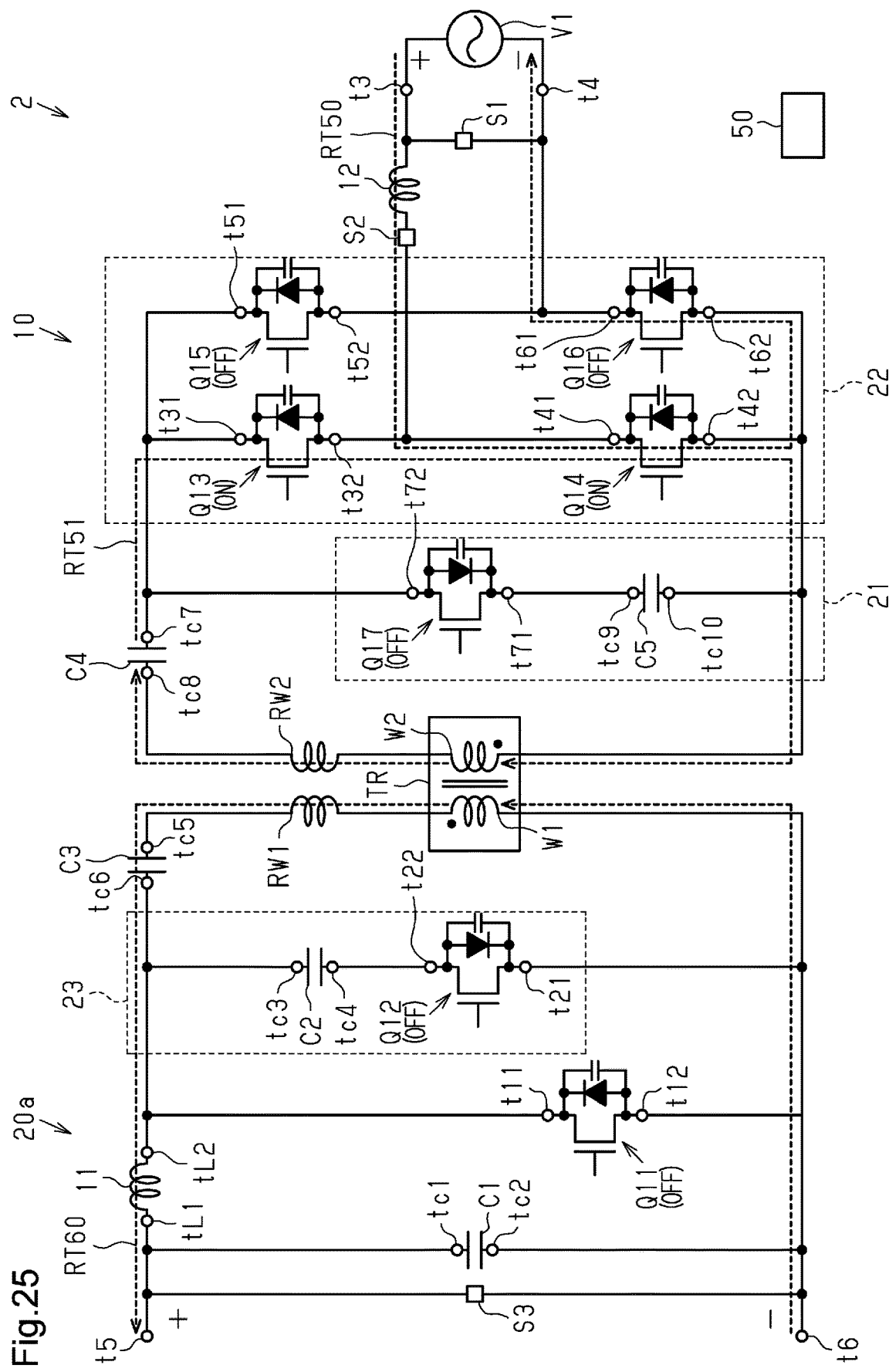
FIG. 25 is a diagram showing one example of the power converter 2 in a first state Ω1.

As shown in FIG. 25, the power converter 2 includes an alternating-current-side buffer switching element Q17 in place of the alternating-current-side buffer switching element Q7. The alternating-current-side buffer switching element Q17 includes a capacitor between the drain and the source. The alternating-current-side buffer switching element Q17 is provided at a position that corresponds to the alternating-current-side buffer switching element Q7.

The power converter 2 according to the present embodiment is connected to the alternating-current power supply V1 instead of the direct-current power supply V2. The alternating-current power supply V1 and the alternatingcurrent-side circuit 10 are electrically connected to each other. Specifically, one end, or a first end of the alternating-current power supply V1 is connected to the first alternating-current connection terminal t3 of the alternating-current-side circuit 10. Another end, or a second end of the alternating-current power supply V1 is connected to the second alternating-current connection terminal t4 of the alternating-current-side circuit 10. Accordingly, the alternating-current voltage Vo is applied to the alternating-current connection terminals t3, t4.

[Currents and Voltages at Several Parts]

In the present embodiment, the definition of the polarity of the alternating-current-side inductor voltage $V_{L2}$ are reversed. Specifically, in the alternating-current-side inductor 12, the alternating-current-side inductor voltage VL2 is defined to be negative when the electric potential at the end corresponding to the alternating-current-side circuit 10 is higher than the electric potential at the end corresponding to the first alternating-current connection terminal t3. The alternating-current-side inductor voltage $V_{L2}$ is defined to be positive when the electric potential at the end corresponding to the first alternating-current connection terminal t3 is higher than the electric potential at the end corresponding to the alternating-current-side circuit 10. Also, the definition of the polarity of the alternating-current-side inductor current $I_{L2}$ is reversed. Specifically, a direction from the alternating-current-side circuit 10 toward the alternating-current-side inductor 12 is defined as a negative direction of the alternating-current-side inductor current $I_{L2}$. A direction from the first alternating-current connection terminal t3 toward the alternating-current-side inductor 12 is defined as a positive direction of the alternating-current-side inductor current $I_{L2}$.

Also, the definition of the polarity of the direct-current-side inductor voltage $V_{L1}$ is reversed. Specifically, the direct-current-side inductor voltage $V_{L1}$ is defined to be negative when the electric potential of the first terminal tL1 is higher than the electric potential of the second terminal tL2. The direct-current-side inductor voltage $V_{L1}$ is defined to be positive when the electric potential of the second terminal tL2 is higher than the electric potential of the first terminal tL1. Also, the definition of the polarity of the direct-current-side inductor current $I_{L1}$ is reversed. Specifically, a direction from the first terminal tL1 toward the second terminal tL2 is defined as a negative direction of the direct-current-side inductor current $I_{L1}$. A direction from the second terminal tL2 toward the first terminal tL1 is defined as a positive direction of the direct-current-side inductor current $I_{L1}$.

[Controlling Unit 50]

The power converter 2 switches the respective switching elements Q11 to Q17 between the conducting state and the non-conducting state, so as to convert the alternating-current voltage Vo supplied by the alternating-current power supply V1 to a direct-current voltage Vi, and outputs the direct-current voltage Vi from the first and second direct-current connection terminals t5, t6, which form a pair.

[Detailed Description of Switching Control by Controlling Unit 50]

The present embodiment has five switching patterns: a first pattern γ1 to a fifth pattern γ5. A series of switching actions for changing the switching pattern in the order of γ1, γ2, γ3, γ4, γ5, and back to γ1 is regarded as one unit. The controlling unit 50 executes a switching control by repeatedly performing the unit of switching actions at a specific cycle (switching cycle). The switching cycle is sufficiently short in relation to the cycle of the alternating-current voltage Vo. For example, the cycle of the alternating-current voltage Vo is 20 ms, whereas the switching cycle is 10 μs.

The first pattern γ1 is a switching pattern in which the first upper arm switching element Q13 and the first lower arm switching element Q14 are in the conductive state, and the rectification switching element Q11, the direct-current-side buffer switching element Q12, the second upper arm switching element Q15, the second lower arm switching element Q16, and the alternating-current-side buffer switching element Q17 are in a non-conductive state.

The second pattern γ2 is a switching pattern in which the first lower arm switching element Q14 is in the conducting state, and the rectification switching element Q11, the direct-current-side buffer switching element Q12, the first upper arm switching element Q13, the second upper arm switching element Q15, the second lower arm switching element Q16, and the alternating-current-side buffer switching element Q17 are in the non-conducting state.

The third pattern γ3 is a switching pattern in which the first lower arm switching element Q14 and the alternating-current-side buffer switching element Q17 are in the conducting state, and the rectification switching element Q11, the direct-current-side buffer switching element Q12, the first upper arm switching element Q13, the second upper arm switching element Q15, and the second lower arm switching element Q16 are in the non-conducting state.

The fourth pattern γ4 is a switching pattern in which the alternating-current-side buffer switching element Q17 is in the conducting state, and the rectification switching element Q11, the direct-current-side buffer switching element Q12, the first upper arm switching element Q13, the first lower arm switching element Q14, the second upper arm switching element Q15, and the second lower arm switching element Q16 are in the non-conducting state.

The fifth pattern γ5 is a switching pattern in which the switching elements Q11 to Q17 are all in the non-conducting state.

With reference to FIGS. 25 to 32, operation of the power converter 2 will be described. The power converter 2 converts the alternating-current voltage Vo supplied by the alternating-current power supply V1 to the direct-current voltage Vi and outputs the direct-current voltage Vi.

When the alternating-current voltage has a positive polarity, the controlling unit 50 repeatedly executes the switching control in which the switching pattern is changed from the first pattern γ1, then sequentially changed from the second pattern γ2 to the fifth pattern γ5, and back to the first pattern γ1. This shifts the state of the power converter 2 from a first state Ω1 to an eighth state Ω8.

The action in the case in which the alternating-current voltage Vo has a negative polarity is the same as the action in the case in which the alternating-current voltage Vo has a positive polarity except that the action of the first upper arm switching element Q13 and the action of the second upper arm switching element Q15 are interchanged, and the action of the first lower arm switching element Q14 and the action of the second lower arm switching element Q16 are interchanged. Accordingly, the case in which the alternating-current voltage Vo has a positive polarity will be discussed, and description of the state in which the alternating-current voltage Vo has a negative polarity will be omitted.

[First State Ω1]

The first state Ω1 shown in FIG. 25 is a state in which the controlling unit 50 has set the switching pattern to the first pattern γ1. In the first state Ω1, a current flows through the current path RT50 and the current path RT51 on the alternating-current side of the power converter 2 as shown in FIG. 25.

The current path RT50 leads from the first alternating-current connection terminal t3, which is connected to the alternating-current power supply V1, to the second alternating-current connection terminal t4 via the alternating-current-side inductor 12, the first lower arm switching element Q14, and the body diode of the second lower arm switching element Q16. The alternating-current voltage Vo is applied to the alternating-current-side inductor 12 in the positive direction. This increases the alternating-current-side inductor current $I_{L2}$. The alternating-current-side capacitor voltage $V_{C4}$ is applied to the alternating-current-side winding W2 in the positive direction.

The current path RT51 leads to the second terminal tc8 of the alternating-current-side capacitor C4 via the first terminal tc7 of the alternating-current-side capacitor C4, the first upper arm switching element Q13, the first lower arm switching element Q14, the alternating-current-side winding W2, and the leakage inductor RW2 of the alternating-current-side winding W2. That is, the alternating-current-side winding current Is in the negative direction flows through the current path RT51.

In the first state Ω1, a current flows through the current path RT60 on the direct-current side of the power converter 2. The current path RT60 leads from the head of the direct-current-side winding W1 to the tail of the direct-current-side winding W1 via the leakage inductor RW1 of the direct-current-side winding W1, the direct-current-side capacitor C3, the direct-current-side inductor 11, and the load connected to the connection terminals t5, t6. That is, the direct-current-side winding current Ip in the negative direction flows through the current path RT60. When the alternating-current-side capacitor voltage $V_{C4}$ is applied to the alternating-current-side winding W2 in the positive direction, the direct-current-side winding voltage $V_{T1}$ is generated in direct-current-side winding W1 in the positive direction. The difference between the direct-current output voltage and the sum of the direct-current-side winding voltage $V_{T1}$ and the direct-current-side capacitor voltage $V_{C3}$ is applied to the direct-current-side inductor 11 in the positive direction. This increases the direct-current-side inductor current $I_{L1}$.

[Second State Ω2]

Figure 26:
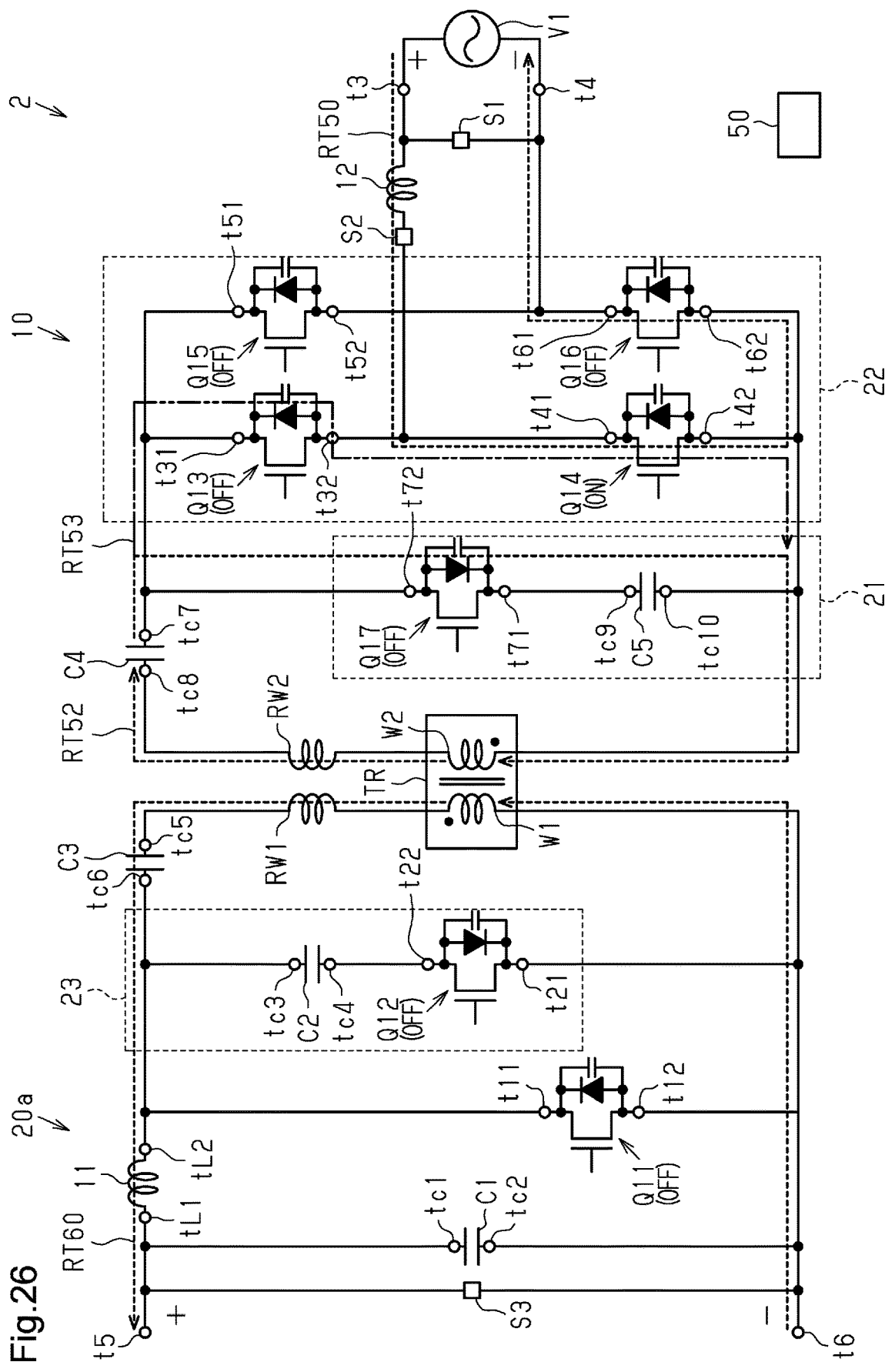
FIG. 26 is a diagram showing one example of the power converter 2 in a second state Ω2.

The second state Ω2 shown in FIG. 26 is a state in which the controlling unit 50 has set the switching pattern to the second pattern γ2. In the second state Ω2, a current flows through the current path RT50, the current path RT52, and the current path RT53 on the direct-current side of the power converter 2 as shown in FIG. 26. The current path RT50 is configured in the above-described manner. The alternating-current-side inductor current $I_{L2}$ continues to increase.

The current path RT52 leads from the tail of the alternating-current-side winding W2 to the head of the alternating-current-side winding W2 via the leakage inductor RW2 of the alternating-current-side winding W2, the alternating-current-side capacitor C4, the body diode of the alternating-current-side buffer switching element Q17, and the alternating-current-side buffer capacitor C5. That is, the alternating-current-side winding current Is in the negative direction flows through the current path RT52. The alternating-current-side winding current Is to flow through the current path RT52 by the continuity of current through the excitation inductor and the leakage inductor RW2 of the alternating-current-side winding W2. The voltage difference between the alternating-current-side buffer capacitor voltage $V_{C5}$ and the alternating-current-side capacitor voltage $V_{C4}$ is applied to the alternating-current-side winding W2 in the negative direction. This changes the direction of the alternating-current-side winding voltage $V_{T2}$.

The current path RT53 leads from the node between the first terminal tc7 and the first terminal t31 to the node between the second terminal t42 and the second terminal tc10 via the capacitor provided between the drain and the source of the first upper arm switching element Q13, and the drain and the source of the first lower arm switching element Q14. When the drain and the source of the first upper arm switching element Q13 are in the non-conducting state, part of the alternating-current-side winding current Is flows through the current path RT53 to charge the capacitor provided between the drain and the source of the first upper arm switching element Q13. Accordingly, when shifted from the conducting state to the non-conducting state, the first upper arm switching element Q13 enters the ZVS mode. When charging of the capacitor provided between the drain and the source of the first upper arm switching element Q13 ends, the current stops flowing through the current path RT53.

In the second state Ω2, a current flows through the current path RT60 on the direct-current side of the power converter 2. The current path RT60 is configured in the above-described manner. In the second state Ω2, since the direction of the alternating-current-side winding voltage $V_{T2}$ changes, the alternating-current-side winding current Is increases (in the second state Ω2, the absolute value decreases since the alternating-current-side winding current Is is flowing in the negative direction). Accordingly, the direct-current-side winding current Ip also increases (in the second state Ω2, the absolute value decreases since the direct-current-side winding current Ip is flowing in the negative direction). The period of the second state Ω2 is a period of dead time. Thus, the period of the second state Ω2 may be shorter than other periods.

[Third State Ω3]

Figure 27:
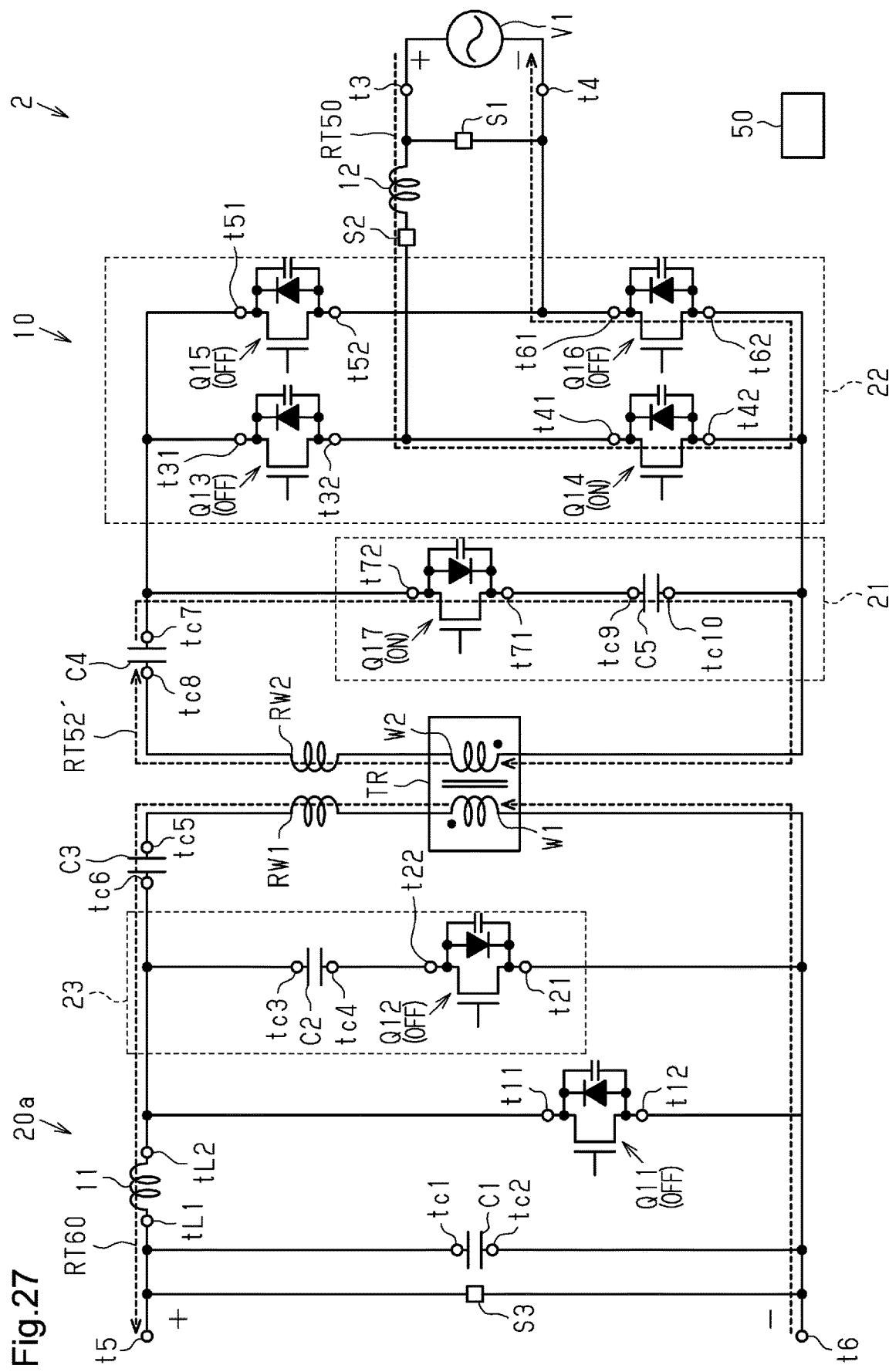
FIG. 27 is a diagram showing one example of the power converter 2 in a third state Ω3.

The third state Ω3 shown in FIG. 27 is a state in which the controlling unit 50 has set the switching pattern to the third pattern γ3. In the third state Ω3, a current flows through the current path RT50 and the current path RT52' on the alternating-current side of the power converter 2. The current that would flow through the body diode of the alternating-current-side buffer switching element Q17 in the current path RT52 flows through the alternating-current-side buffer switching element Q17 in the current path RT52'. In the third state Ω3, the alternating-current-side buffer switching element Q17 is set to the conducting state with its body diode being conductive. The alternating-current-side buffer switching element Q17 enters the ZVS mode and thus reduces switching loss. The current path RT50 is configured in the above-described manner. The alternating-current-side inductor current $I_{L2}$ continues to increase.

In the third state Ω3, a current flows through the current path RT60 on the direct-current side of the power converter 2. The current path RT60 is configured in the above-described manner.

[Fourth State Ω4]

Figure 28:
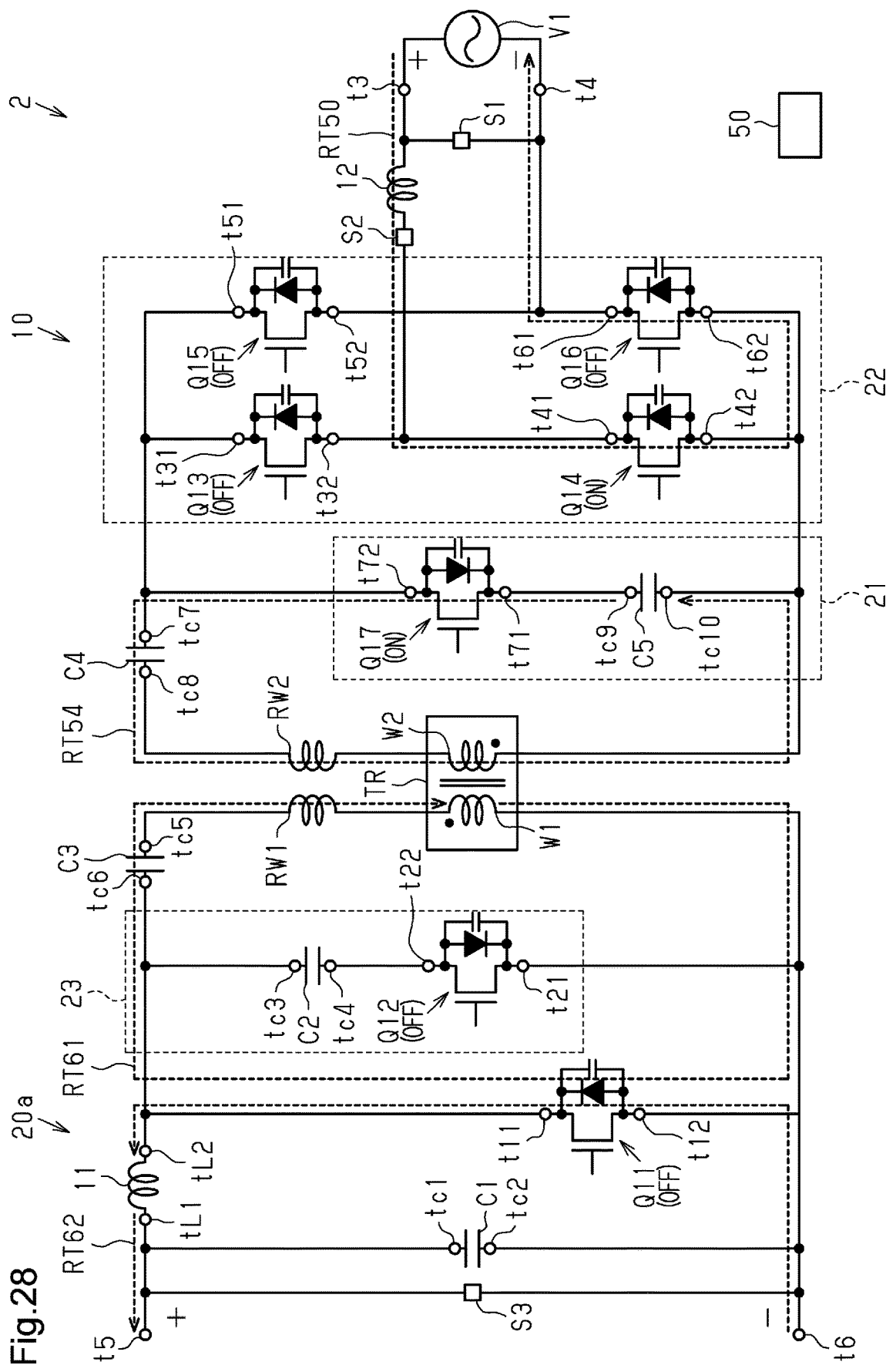
FIG. 28 is a diagram showing one example of the power converter 2 in a fourth state Ω4.

The fourth state Ω4 shown in FIG. 28 is a state after a specific time has elapsed since the controlling unit 50 set the switching pattern to the third pattern γ3 so that the state was shifted to the third state Ω3. In the fourth state Ω4, a current flows through the current path RT50 and the current path RT54 on the alternating-current side of the power converter 2 as shown in FIG. 28. The current path RT50 is configured in the above-described manner. The alternating-current-side inductor current $I_{L2}$ continues to increase.

The current path RT54 leads from the first terminal tc9 of the alternating-current-side buffer capacitor C5 to the second terminal tc10 of the alternating-current-side buffer capacitor C5 via the alternating-current-side buffer switching element Q17, the alternating-current-side capacitor C4, the leakage inductor RW2 of the alternating-current-side winding W2, and the alternating-current-side winding W2. That is, the alternating-current-side winding current Is in the positive direction flows through the current path RT54. During the period from the second state Ω2 to the third state Ω3, the alternating-current-side winding current Is in the negative direction is reduced, and the direction of the alternating-current-side winding current Is is changed from the negative direction to the positive direction, so that the state is shifted to the fourth state Ω2. The current generated when the alternating-current-side buffer capacitor C5 is discharged flows through the current path RT54.

In the fourth state Ω4, a current flows through a current path RT61 and a current path RT62 on the direct-current side of the power converter 2. The current path RT62 leads from the direct-current-side inductor 11 and includes the load connected to the direct-current connection terminals t5, t6 and the body diode of the rectification switching element Q11. The direct-current-side inductor current $I_L$ in the positive direction flows through the current path RT62 by the current continuity of the direct-current-side inductor 11.

The current path RT61 leads to the head of the direct-current-side winding W1 via the tail of the direct-current-side winding W1, the body diode of the rectification switching element Q11, the direct-current-side capacitor C3, and the leakage inductor RW1 of the direct-current-side winding W1. That is, the direct-current-side winding current Ip in the positive direction flows through the current path RT61. The direct-current-side winding current Ip in the negative direction is decreased during the period from the second state Ω2 to the third state Ω3, and the direction of the direct-current-side winding current Ip is changed from the negative direction to the positive direction in the fourth state Ω4.

[Fifth State Ω5]

Figure 29:
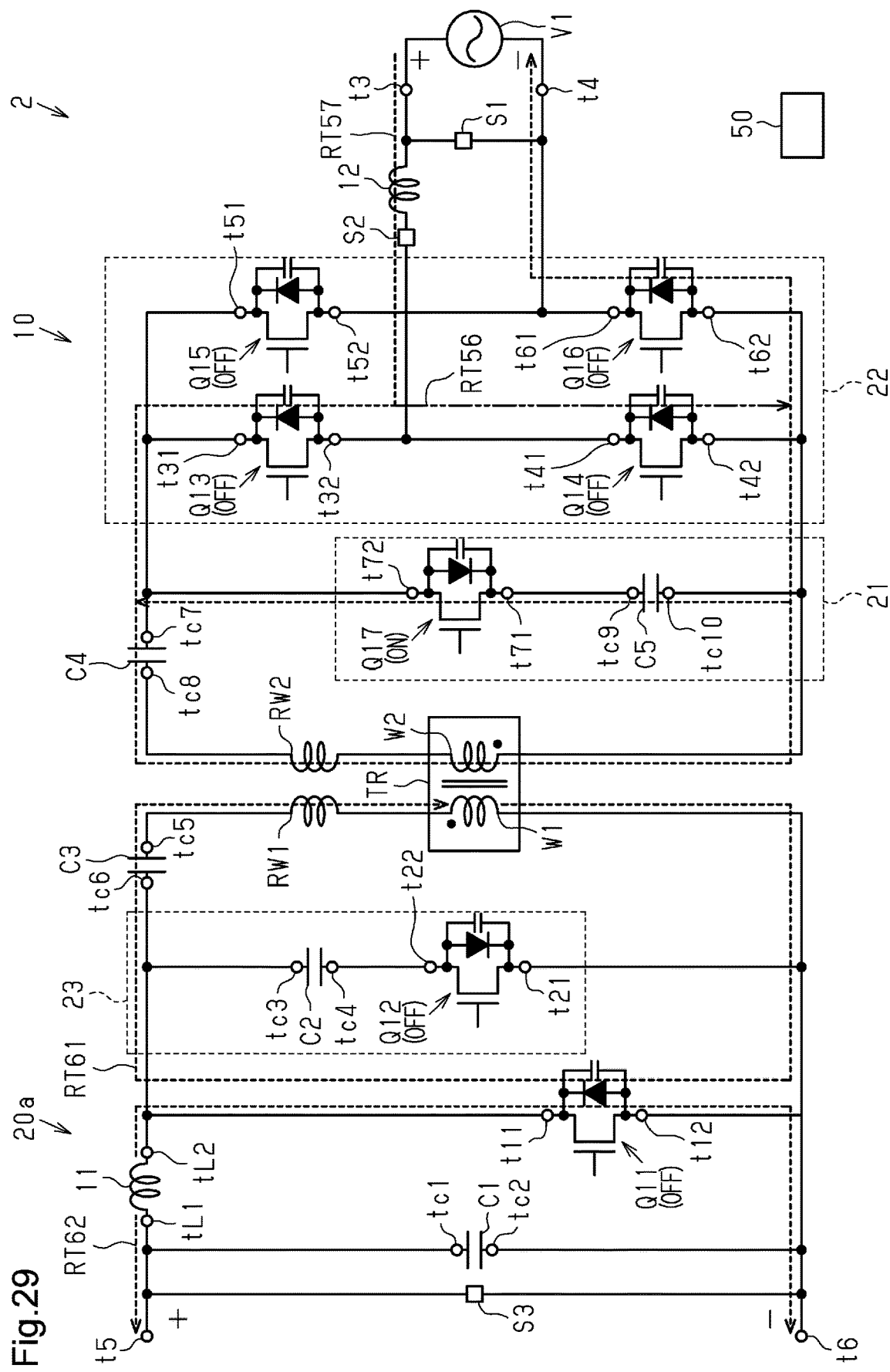
FIG. 29 is a diagram showing one example of the power converter 2 in a fifth state Ω5.

The fifth state Ω5 shown in FIG. 29 is a state in which the controlling unit 50 has set the switching pattern to the fourth pattern γ4. In the fifth state Ω5, a current flows through the current path RT56 and the current path RT57 on the alternating-current side of the power converter 2.

The current path RT57 includes a first path and a second path. The first path leads from the first alternating-current connection terminal t3, which is connected to the alternating-current power supply V1, to the second alternating-current connection terminal t4 via the alternating-current-side inductor 12, the body diode of the first upper arm switching element Q13, the alternating-current-side capacitor C4, the alternating-current-side winding W2, and the body diode of the second lower arm switching element Q16. That is, the alternating-current-side winding current Is in the positive direction flows through the current path RT57. The second path leads from the node between the head of the alternating-current-side winding W2 and the second terminal tc10 to the node between the first terminal tc7 and the first terminal t31 via the alternating-current-side buffer capacitor C5 and the alternating-current-side buffer switching element Q17.

The current difference between the alternating-current-side inductor current $I_{L2}$ and the alternating-current-side winding current Is flows through the second path. More specifically, when the alternating-current-side inductor current $I_{L2}$ is greater than the alternating-current-side winding current Is, the current difference flows from the node connected to the second terminal tc10 to the node between the first terminal tc7 and the first terminal t31 via the alternating-current-side buffer switching element Q17 and the alternating-current-side buffer capacitor C5. In this case, the alternating-current-side buffer capacitor C5 is charged. When the alternating-current-side inductor current $I_{L2}$ is less than the alternating-current-side winding current Is, the current difference flows from the alternating-current-side buffer capacitor C5 to the alternating-current-side winding W2 via the alternating-current-side buffer switching element Q17 and the alternating-current-side capacitor C4. In this case, the alternating-current-side buffer capacitor C5 is discharged.

The current path RT56 leads from the node between the second terminal t32, the first terminal t41, and the alternating-current-side inductor 12 to the node between the second terminal t42 and the second terminal t62 via the capacitor provided between the drain and the source of the first lower arm switching element Q14. Part of the current that flows through the current path RT57 flows through the current path RT56 so as to charge the capacitor provided between the drain and the source of the first lower arm switching element Q14. After the first lower arm switching element Q14 is set to the non-conducting state, the voltage between the drain and the source of the first lower arm switching element Q14 gradually increases as the capacitor provided between the drain and the source of the first lower arm switching element Q14 is charged. Thus, when set to the non-conducting state, the first lower arm switching element Q14 enters the ZVS mode and thus reduces switching loss. When the capacitor provided between the drain and the source of the first lower arm switching element Q14 is charged, current stops flowing through the current path RT56.

In the fifth state Ω5, a current flows through the current path RT61 and the current path RT62 on the direct-current side of the power converter 2. The current path RT61 and the current path RT62 are configured in the above-described manner.

[Sixth State Ω6]

Figure 30:
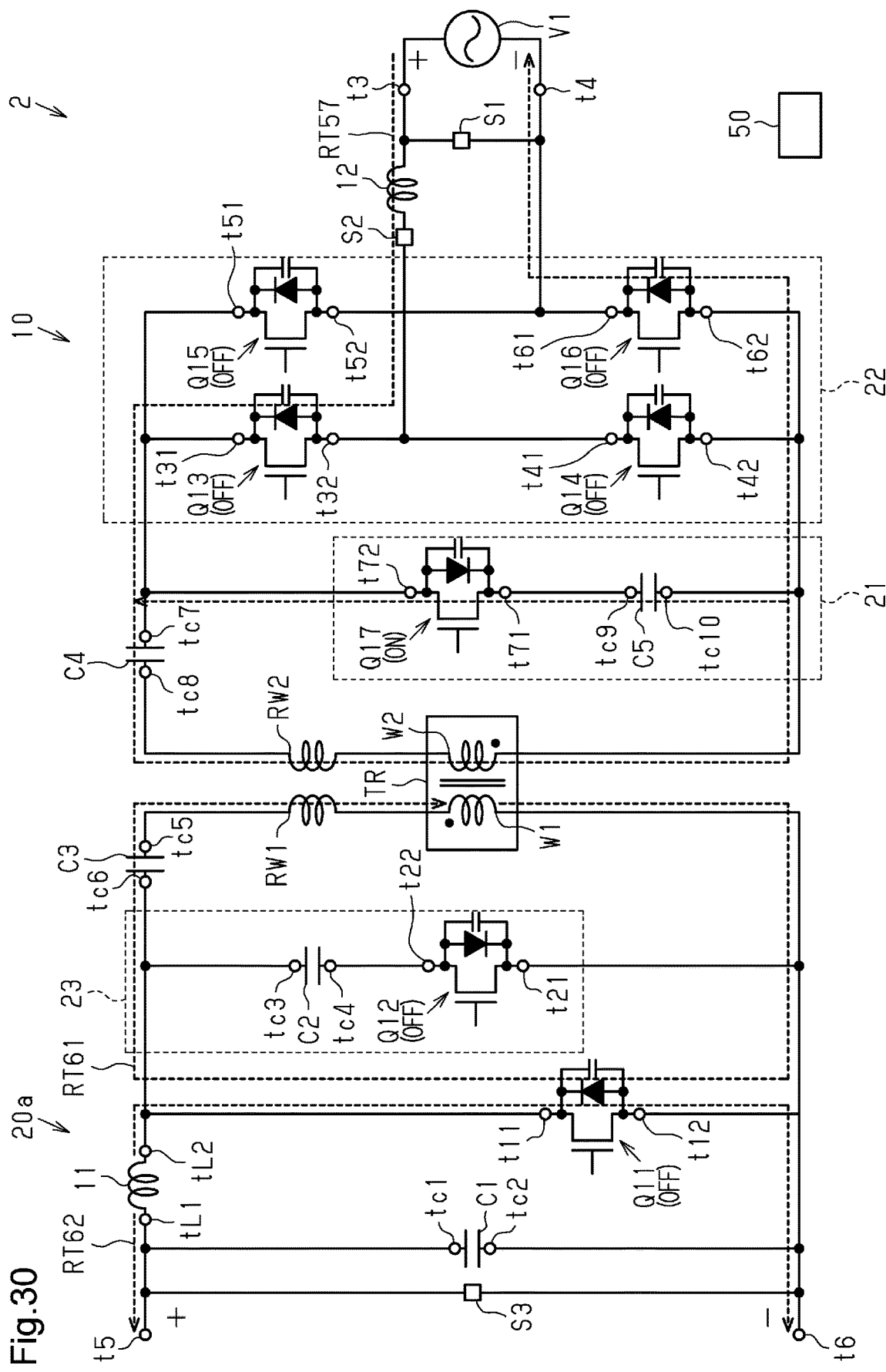
FIG. 30 is a diagram showing one example of the power converter 2 in a sixth state Ω6.

The sixth state Ω6 shown in FIG. 30 is a state after a specific time has elapsed since the controlling unit 50 set the switching pattern to the fourth pattern γ4 so that the state was shifted to the fifth state Ω5. In the sixth state Ω6, a current flows through the current path RT57 on the alternating-current side of the power converter 2 as shown in FIG. 30.

The current path RT57 is configured in the above-described manner. When the alternating-current-side inductor current $I_{L2}$ decreases so that the alternating-current-side inductor current $I_{L2}$ is less than the alternating-current-side winding current Is, the alternating-current-side buffer capacitor current $I_{C5}$, which is flowing through the alternating-current-side buffer capacitor C5, is reversed.

In the sixth state Ω6, a current flows through the current path RT61 and the current path RT62 on the direct-current side of the power converter 2. The current path RT61 and the current path RT62 are configured in the above-described manner.

[Seventh State Ω7]

Figure 31:
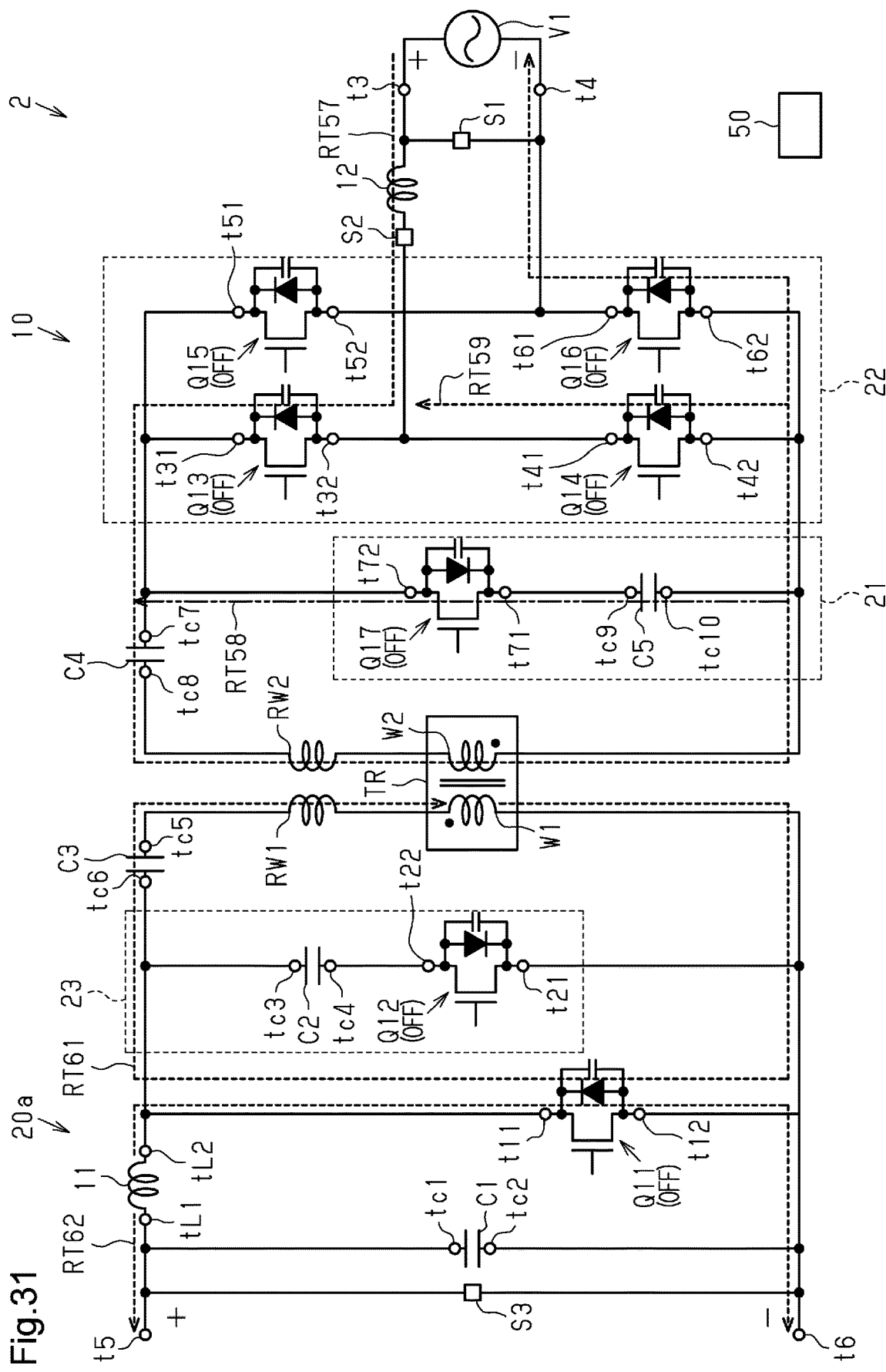
FIG. 31 is a diagram showing one example of the power converter 2 in a seventh state Ω7.

The seventh state Ω7 shown in FIG. 31 is a state in which the controlling unit 50 has set the switching pattern to the fifth pattern γ5. In the seventh state Ω7, a current flows through the current path RT57, the current path RT58, and the current path RT59 on the alternating-current side of the power converter 2. The current path RT57 is configured in the above-described manner.

The current path RT58 leads from the node between the head of the alternating-current-side winding W2 and the second terminal tc10 to the node between the first terminal tc7 and the first terminal t31 via the alternating-current-side buffer capacitor C5 and the capacitor provided between the drain and the source of the alternating-current-side buffer switching element Q17. Part of the current that flows through the current path RT57 flows through the current path RT58 so as to charge the capacitor provided between the drain and the source of the alternating-current-side buffer switching element Q17. After the alternating-current-side buffer switching element Q17 is set to the non-conducting state, the voltage between the drain and the source of the alternating-current-side buffer switching element Q17 gradually increases as the capacitor provided between the drain and the source of the alternating-current-side buffer switching element Q17 is charged. Thus, when set to the non-conducting state, the alternating-current-side buffer switching element Q17 enters the ZVS mode and thus reduces switching loss. When the capacitor provided between the drain and the source of the alternating-current-side buffer switching element Q17 is charged, current stops flowing through the current path RT58.

The current path RT59 leads from the node between the second terminal t42 and the second terminal t62 to the node between the second terminal t32 and the alternating-current-side inductor 12 via the body diode of the first lower arm switching element Q14. The current difference between the alternating-current-side winding current Is and the alternating-current-side inductor current $I_{L2}$ flows through current path RT59. The current then joins the current path RT57. When the body diode of the first lower arm switching element Q14 is in the conducting state, the alternating-current voltage Vo is applied to the alternating-current-side inductor 12 in the positive direction, so that the alternating-current-side inductor current $I_{L2}$ starts increasing. The period of the seventh state Ω7 is a period of dead time. Thus, the period of the seventh state Ω7 may be shorter than other periods.

[Eighth State Ω8]

Figure 32:
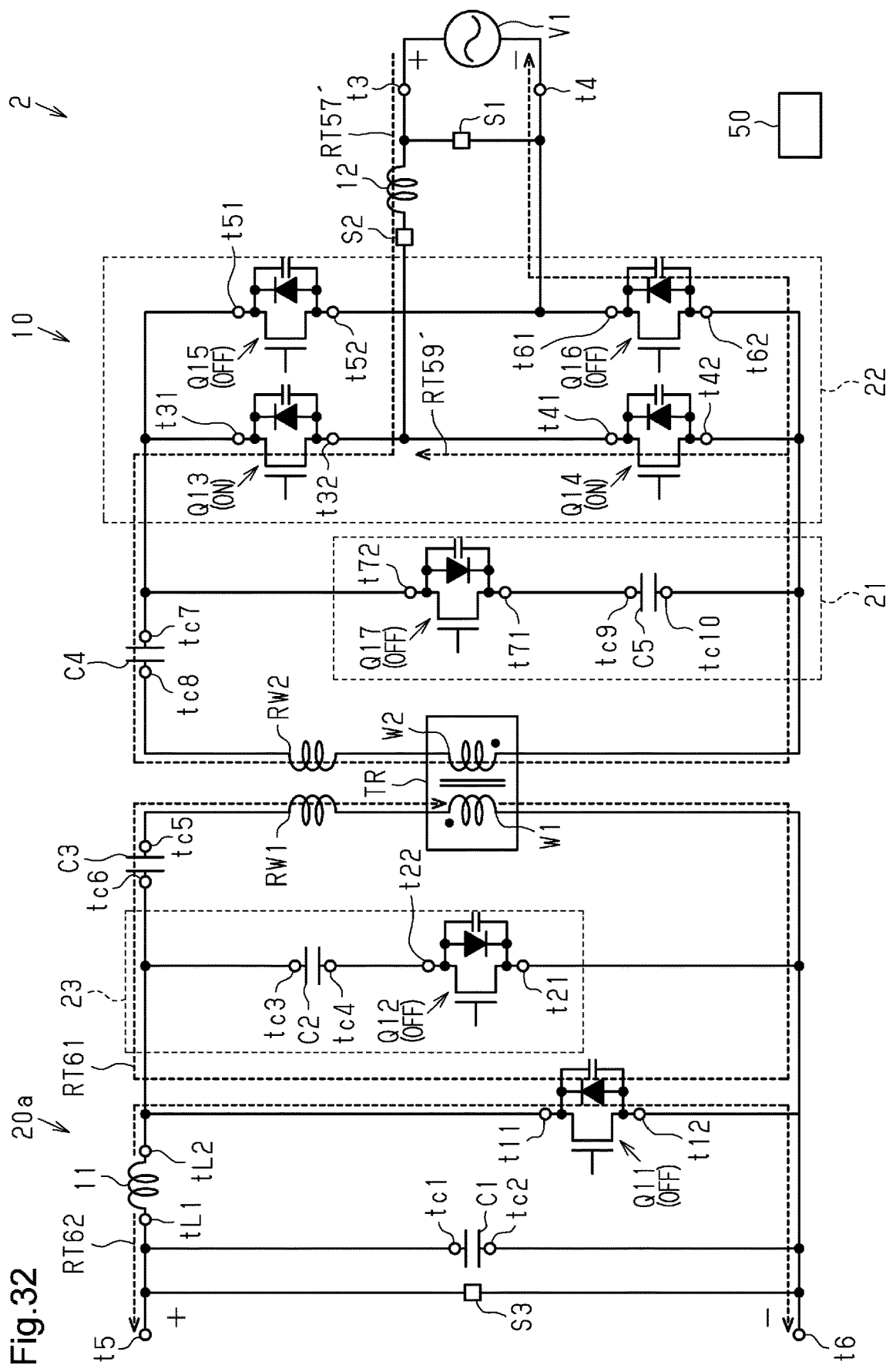
FIG. 32 is a diagram showing one example of the power converter 2 in an eighth state Ω8.

The eighth state Ω8 shown in FIG. 32 is a state in which the controlling unit 50 has set the switching pattern to the first pattern γ1. In the eighth state Ω8, a current flows through a current path RT57' and a current path RT59' on the alternating-current side of the power converter 2 as shown in FIG. 32. The current that would flow through the body diode of the first upper arm switching element Q13 in the current path RT57 flows through the first upper arm switching element Q13 in the current path RT57'. The current that would flow through the body diode of the first lower arm switching element Q14 in the current path RT59 flows through the first lower arm switching element Q14 in the current path RT59'. In the eighth state Ω8, the first upper arm switching element Q13 and the first lower arm switching element Q14 are set to the conducting state with the body diodes being in the conducting state. Thus, the first upper arm switching element Q13 and the first lower arm switching element Q14 enter the ZVS mode and thus reduce switching loss.

In the eighth state Ω8, a current flows through the current path RT61 and the current path RT62 on the direct-current side of the power converter 2. The current path RT61 and the current path RT62 are configured in the above-described manner.

When a specific time has elapsed since the state is shifted to the eighth state Ω8, the direction of the direct-current-side winding current Ip flowing through the direct-current-side winding W1 and the direction of the alternating-current-side winding current Is flowing through the alternating-current-side winding W2 are reversed. The state of the power converter 2 then returns to the first state Ω1.

As has been described above, the action in the case in which the alternating-current voltage Vo has a negative polarity is the same as the action in the case in which the alternating-current voltage Vo has a positive polarity except that the action of the first upper arm switching element Q13 and the action of the second upper arm switching element Q15 are interchanged, and the action of the first lower arm switching element Q14 and the action of the second lower arm switching element Q16 are interchanged.

[Control by Controlling Unit 50]

In the present embodiment, the controlling unit 50 is capable of controlling switching so as to improve the power factor based on the current flowing through the alternating-current-side inductor 12 and the input voltage. For example, the controlling unit 50 controls time from the seventh state Ω7 to the fourth state Ω4, so as to cause the bridge circuit 22 to operate as a power-factor correction circuit. During the period from the seventh state Ω7 to the fourth state Ω4, the alternating-current power supply V1 and the alternating-current-side inductor 12 form a closed circuit, so that the current from the alternating-current power supply V1 is limited by the alternating-current-side inductor 12. Since the amount of increase in the current flowing through the alternating-current-side inductor 12 is proportional to the time for which the period from the seventh state Ω7 to the fourth state Ω4 continues, the current through the alternating-current-side inductor 12 can be controlled by controlling the time for which the period from the seventh state Ω7 to the fourth state Ω4 continues. The controlling unit 50 controls the time for which the period from the seventh state Ω7 to the fourth state Ω4 continues based on signals from the voltage sensor S1 and the current sensor S2 such that the waveform of the current flowing through the alternating-current-side inductor 12 substantially becomes a sine wave, and that the frequency and the phase of the sine wave match the frequency and the phase of the alternating-current power supply V1.

The controlling unit 50 can also control switching such that a specified direct-current voltage is output based on the detection result of the voltage sensor S3. Specifically, the controlling unit 50 controls the duty cycles of the switching elements Q13 to Q17, for example, based on the difference between the output voltage detected by the voltage sensor S3 and a specified direct-current voltage (target voltage). Further, the controlling unit 50 is also capable of simultaneously performing the power-factor correction and controlling the output voltage.

[Advantages of Power Converter 2 According to Present Embodiment]

The above-described embodiment has the following advantages.

(3-1) The controlling unit 50 controls switching of the switching elements Q11 to Q17 so as to shift the state of the power converter 2 from the first state Ω1 to the eighth state Ω8. Accordingly, the power converter 2 converts the alternating-current voltage Vo of the alternating-current power supply V1 to the direct-current voltage Vi.

Accordingly, as compared to the prior art circuit, which uses a total of three bridge circuits, the power converter 2 reduces the number of active components such as switching elements and rectifiers. Also, as compared to the prior art circuit, which uses full-bridge circuits, the power converter 2 of the present embodiment includes a relatively small number of active components through which a current flows. The power converter 2 thus reduces the conduction loss in the active components.

(3-2) In the alternating-current-side circuit 10, in order to ensure the continuity of current through the inductors (the alternating-current-side inductor 12 and the alternating-current-side winding W2), the alternating-current-side buffer circuit 21 provides detour paths for these currents.

With this configuration, the power converter 2 uses the alternating-current-side buffer circuit 21 to suppress the occurrence of surge voltage that would be generated by mismatch between continuity of the alternating-current-side inductor current $I_{L2}$ through the alternating-current-side buffer circuit 21 and current continuity of the excitation inductor of the alternating-current-side winding W2.

(3-3) The transformer TR transmits power from the alternating-current side to the direct-current side in all of the first state $\Omega 1$ to the eighth state $\Omega 8$ regardless of the direction of the voltage applied to the head and the tail of the alternating-current-side winding W2 of the transformer TR. The power converter 2 thus increases the use efficiency of the transformer TR.

(3-4) The controlling unit 50 controls switching so as to improve the power factor based on the current flowing through the alternating-current-side inductor 12 and the input voltage from the alternating-current power supply V1. With this configuration, the power converter 2 improves the power factor of the power supplied by the alternating-current power supply V1.

(3-5) The controlling unit 50 also controls switching of the bridge circuit 22 such that the specified direct-current voltage is output based on the voltage between the direct-current connection terminals t5 and t6.

With this configuration, the power converter 2 performs feedback control based on the voltage between the direct-current connection terminals t5 and t6, thereby causing the direct-current voltage output by the power converter 2 to approach the specified direct-current voltage (target voltage).

The above-described embodiments may be modified as follows. The above-described embodiments and the following modifications can be combined as long as the combined modifications remain technically consistent with each other.

The position to which the direct-current-side buffer capacitor C2 is connected is not particularly limited. For example, the direct-current-side buffer capacitor C2 may be connected to a position below the direct-current-side buffer switching elements Q2, Q12. In this case, in the power converter 1, the second terminal tc4 of the direct-current-side buffer capacitor C2 is connected to the second terminal t22 of the direct-current-side buffer switching element Q2. In the power converter 2, the second terminal tc4 of the direct-current-side buffer capacitor C2 is connected to the first terminal t21 of the direct-current-side buffer switching element Q12. The first terminal tc3 of the direct-current-side buffer capacitor C2 is connected to the second connection terminal t6. In the power converter 1, the first terminal t21 of the direct-current-side buffer switching element Q2 is connected to the second terminal tc6 of the direct-current-side capacitor C3. In the power converter 2, the second terminal t22 of direct-current-side buffer switching element Q12 is connected to the second terminal tc6 of the direct-current-side capacitor C3.

The position to which the alternating-current-side buffer capacitor C5 is connected is not particularly limited. For example, the alternating-current-side buffer capacitor C5 may be connected to a position above the alternating-current-side buffer switching elements Q7, Q17. In this case, the first terminal tc9 of the alternating-current-side buffer capacitor C5 is connected to the first terminal tc7 of the alternating-current-side capacitor C4. The second terminal tc10 of the alternating-current-side buffer capacitor C5 is connected to the second terminal t72 of the alternating-current-side buffer switching element Q7, Q17. The first terminal t71 of the alternating-current-side buffer switching element Q7, Q17 is connected to the second terminal t42 of the first lower arm switching element Q4, Q14, and to the second terminal t62 of the second lower arm switching element Q6, Q16.

The direct-current-side capacitor C3 is connected between the head of the direct-current-side winding W1 and the second terminal t12 of the rectification switching element Q1 in the power converter 1, and is connected between the head of the direct-current-side winding W1 and the second terminal tL2 of the direct-current-side inductor 11 in the power converter 2. The present disclosure is not limited to these configurations. The direct-current-side capacitor C3 may be connected between the tail of the direct-current-side winding W1 and the second connection terminal t6. The direct-current-side capacitor C3 may include two capacitors. In this case, the direct-current-side capacitor C3 is provided between the head of the direct-current-side winding W1 and the second terminal t12 of the rectification switching element Q1 in the power converter 1. Also, the direct-current-side capacitor C3 is provided between the head of the direct-current-side winding W1 and the second terminal tL2 of the direct-current-side inductor 11 and between the tail of the direct-current-side winding W1 and the second connection terminal t6 in the power converter 2.

In the above-described embodiments, the alternating-current-side inductor 12 is connected between the first alternating-current connection terminal t3 and the node between the switching elements Q3 and Q4 in the power converter 1. The alternating-current-side inductor 12 is connected between the first alternating-current connection terminal t3 and the node between the switching elements Q13 and Q14 in the power converter 2. The position of the alternating-current-side inductor 12 is not limited to these positions. The alternating-current-side inductor 12 may be connected between the second alternating-current connection terminal t4 and the node between the switching elements Q5 and Q6 in the power converter 1. The alternating-current-side inductor 12 may be connected between the second alternating-current connection terminal t4 and the node between the switching elements Q15 and Q16 in the power converter 2. Also, the alternating-current-side inductor 12 may include two inductors. In this case, in the power converter 1, one of the inductors is connected between the first alternating-current connection terminal t3 and the node between the switching elements Q3 and Q4, and the other inductor is connected between the second alternating-current connection terminal t4 and the node between the switching elements Q5 and Q6. The alternating-current-side inductor 12 may be connected between the first alternating-current connection terminal t3 and the node between the switching elements Q13 and Q14 in the power converter 2. The alternating-current-side inductor 12 may be connected between the second alternating-current connection terminal t4 and the node between the switching elements Q15 and Q16 in the power converter 2.

In the above-described embodiments, the alternating-current-side capacitor C4 is connected between the head of the alternating-current-side winding W2 and the first terminal t31 of the first upper arm switching element Q3 in the power converter 1. The alternating-current-side capacitor C4 is connected between the tail of the alternating-current-side winding W2 and the first terminal t31 of the first upper arm switching element Q13 in the power converter 2. However, the position of the alternating-current-side capacitor C4 is not limited to these positions. For example, the alternating-current-side capacitor C4 may be connected between the tail of the alternating-current-side winding W2 and the second terminal t42 of the first lower arm switching element Q4 in the power converter 1. Also, the alternating-current-side capacitor C4 may be connected between the head of the alternating-current-side winding W2 and the second terminal t42 of the first lower arm switching element Q14 in the power converter 2. The alternating-current-side capacitor C4 may include two capacitors. In this case, in the power converter 1, one of the capacitors may be provided between the head of the alternating-current-side winding W2 and the first terminal t31 of the first upper arm switching element Q3, and the other capacitor may be provided between the tail of the alternating-current-side winding W2 and the second terminal t42 of the first lower arm switching element Q4. In the power converter 2, one of the capacitors may be provided between the tail of the alternating-current-side winding W2 and the first terminal t31 of the first upper arm switching element Q13, and the other capacitor may be provided between the head of the alternating-current-side winding W2 and the second terminal t42 of the first lower arm switching element Q14.

In the power converter 1, the current sensor S2 is provided between the alternating-current-side inductor 12 and the node between the switching elements Q3 and Q4. In the power converter 2, the current sensor S2 is provided between the alternating-current-side inductor 12 and the node between the switching elements Q13 and Q14. However, the position of the current sensor S2 is not limited to these positions. The current sensor S2 may be provided between the first alternating-current connection terminal t3 and the alternating-current-side inductor 12. The current sensor S2 may be provided between the second alternating-current connection terminal t4 and the node between the switching elements Q5 and Q6.

In the above-described embodiments, the switching cycle is constant. However, the switching cycle may vary. Particularly, when the PFC control is performed in the third embodiment, the use of hysteresis control simplifies the control although the switching cycle varies depending on the value of the alternating-current voltage Vo.

The power converter 1 may include a physical inductor that operates similarly to the leakage inductor RW1 of the direct-current-side winding W1.

The power converter 2 may include a physical inductor that operates similarly to the leakage inductor RW1 of the direct-current-side winding W1. The power converter 2 may include a physical inductor that operates similarly to the leakage inductor RW2 of the alternating-current-side winding W2.

The first embodiment describes a case in which the controlling unit 50 shifts the state of the power converter 1 from the first state Φ1 to the thirteenth state Φ13. The present disclosure is not limited to this. The controlling unit 50 may repeat the first state Φ1 and the second state Φ2 during the period in which the rectification switching element Q1 is in the conducting state, and then shift the state to the fifth state Φ5, the sixth state Φ6, the seventh state Φ7, and eventually the thirteenth state Φ13. In this case, the power converter 1 is effective in maintaining the alternating-current voltage Vo at a constant level when the alternating-current voltage has a positive polarity or a negative polarity. To maintain the alternating-current voltage Vo at a constant level refers to a case in which an alternating-current voltage having square waves is output.

In the first embodiment, the controlling unit 50 may repeat at least one of the set of the first state Φ1 and the second state 42 and the set of the third state Φ3 and the fourth state 44 during the period in which the rectification switching element Q1 is in the conducting state, and then shift the state to the fifth state Φ5, the sixth state Φ6, the seventh state Φ7, and eventually the thirteenth state 413. In this case, each time the rectification switching element Q1 is set to the conducting state, the controlling unit 50 alternately repeats the set of the first state Φ1 and the second state Φ2 and the set of the third state Φ3 and the fourth state Φ4.

In the first embodiment, the controlling unit 50 may execute the same state as the fifth state Φ5 in place of the second state Φ2 and the fourth state Φ4, and shift the state from the fourth state Φ4 to the sixth state Φ6. This allows the power converter 1 to restrict the alternating-current-side inductor current $I_{L2}$ of the alternating-current-side inductor 12 from being reduced during the period of dead time.

In the first embodiment, the controlling unit 50 sets the switching elements Q3 to Q6 to the conducting state during the period from the ninth state Φ9 to the eleventh state Φ11. This causes the current that is flowing through the body diodes of the switching elements Q3 to Q6 during the synchronous rectification to flow through the switching elements Q3 to Q6. Accordingly, the power converter 1 reduces conduction loss in the active components.

In the first embodiment, the controlling unit 50 may set the second lower arm switching element Q6 to the conducting state during the period from the fifth state Φ5 to the twelfth state Φ12, instead of setting the first upper arm switching element Q3 to the conducting state.

In the second embodiment, the controlling unit 50 may set the switching elements Q13 to Q16 to the conducting state during a period in which a current flows through the body diodes of the switching element Q13 to Q16. That is, the controlling unit 50 may perform a synchronous rectification operation. Specifically, during the period from the second state Ψ2 to fifth state Ψ5, the controlling unit 50 may set the first lower arm switching element Q14 and the second upper arm switching element Q15 (the first upper arm switching element Q13 and the second lower arm switching element Q16 when the alternating-current voltage has a negative polarity) to the conducting state. Also, during the period from the sixth state Φ6 to the ninth state Ψ9, the controlling unit 50 may set the switching elements Q13 to Q16 to the conducting state. The current that is flowing through the body diodes of the switching elements Q3 to Q6 flows between the drain and the source of each of the switching elements Q3 to Q6. Accordingly, the power converter 2 reduces conduction loss in the active components.

In the second embodiment, in part or all of the period from the second state Ψ2 to the fifth state Ψ5, the controlling unit 50 may set only the first upper arm switching element Q13 and the second lower arm switching element Q16 (only the first lower arm switching element Q14 and the second upper arm switching element Q15 in a case in which the alternating-current voltage has a negative polarity) to the conducting state instead of setting the switching elements Q13 to Q16 to the non-conducting state. Accordingly, during the period from the second state Ψ2 to the fifth state Ψ5, the voltage applied to the alternating-current-side inductor 12 is changed to the alternating-current voltage Vo from the alternating-current-side buffer capacitor C5 in the negative direction and the alternating-current-side capacitor voltage $V_{C4}$ in the negative direction. This reduces the degree of reduction in the alternating-current-side inductor current $I_{L2}$. Accordingly, the power converter 2 restricts reduction in the alternating-current-side inductor current $I_{L2}$ during the period from the second state Ψ2 to the fifth state Ψ5.

In the second embodiment, the controlling unit 50 may simultaneously set the rectification switching element Q11 and the alternating-current-side buffer switching element Q7 to the non-conducting state during the period from the third state Ψ3 to the fourth state Ψ4.

In the third embodiment, during the period from the first state Ω1 to the eighth state Ω8, the controlling unit 50 may set the first lower arm switching element Q14 to the conducting state when the alternating-current voltage of the alternating-current power supply V1 has a positive polarity, and may set the first upper arm switching element Q13 to the conducting state when the alternating-current voltage of the alternating-current power supply V1 has a negative polarity. This causes, during the period from the first state Ω1 to the eighth state Ω8, the current that is flowing through the body diodes of the switching elements Q13 and Q14 to flow through the switching elements Q13 and Q14. Accordingly, the power converter 2 reduces conduction loss in the active components.

In the third embodiment, during part or all of the period from the fifth state Ω5 to the seventh state Ω7, the controlling unit 50 may set the second upper arm switching element Q15 to the conducting state when the alternating-current voltage of the alternating-current power supply V1 has a positive polarity, and may set the second lower arm switching element Q16 to the conducting state when the alternating-current voltage of the alternating-current power supply V1 has a negative polarity. This causes, during the period from the fifth state Ω5 to the seventh state Ω7, the current that is flowing through the body diodes of the switching elements Q15 and Q15 to flow through the switching elements Q15 and Q16. Accordingly, the power converter 2 reduces conduction loss in the active components.

In the third embodiment, the controlling unit 50 may set the rectification switching element Q11 to the conducting state in part of or all of the period from the fourth state Ω4 to the eighth state Ω8. This causes, during the period from the fourth state Ω4 to the eighth state Ω8, the current that is flowing through the body diodes of the rectification switching element Q11 to flow through the rectification switching element Q11. Accordingly, the power converter 2 reduces conduction loss in the active components.

In the third embodiment, when the controlling unit 50 converts the alternating-current voltage Vo to the direct-current voltage Vi, and the alternating-current voltage has a positive polarity, the controlling unit 50 may control the switching elements Q15 to Q17 in the order of the first state, the second state, the third state, the fourth state, and the first state. When the controlling unit 50 converts the alternating-current voltage Vo to the direct-current voltage Vi, and the alternating-current voltage has a negative polarity, the controlling unit 50 switches the action of the second upper arm switching element Q15 and the action of the second lower arm switching element Q16.

First State
Second Upper Arm Switching Element Q15: conducting state
Second Lower Arm Switching element Q16: conducting state
Alternating-Current-Side Buffer Switching Element Q17: non-conducting state Second State
Second Upper Arm Switching Element Q15: conducting state
Second Lower Arm Switching Element Q16: non-conducting state
Alternating-Current-Side Buffer Switching Element Q17: non-conducting state Third State
Second Upper Arm Switching Element Q15: conducting state
Second Lower Arm Switching Element Q16: non-conducting state
Alternating-Current-Side Buffer Switching Element Q17: conducting state Fourth State
Second Upper Arm Switching Element Q15: conducting state
Second Lower Arm Switching Element Q16: non-conducting state
Alternating-Current-Side Buffer Switching Element Q17: non-conducting state In the third embodiment, when the controlling unit 50 converts the alternating-current voltage Vo to the direct-current voltage Vi, the controlling unit 50 may control the switching elements Q15 to Q17 in the order of the first state, the second state, the third state, the fourth state, and the first state regardless of the polarity of the alternating-current voltage. The power converter 2 can convert the alternating-current voltage Vo to the direct-current voltage Vi through the simple switching control shown below regardless of the polarity of the alternating-current voltage.

First State
Second Upper Arm Switching Element Q15: conducting state
Second Lower Arm Switching element Q16: conducting state
Alternating-Current-Side Buffer Switching Element Q17: non-conducting state Second State
Second Upper Arm Switching element Q15: non-conducting state
Second Lower Arm Switching Element Q16: non-conducting state
Alternating-Current-Side Buffer Switching Element Q17: non-conducting state Third State
Second Upper Arm Switching element Q15: non-conducting state
Second Lower Arm Switching Element Q16: non-conducting state
Alternating-Current-Side Buffer Switching Element Q17: conducting state Fourth State
Second Upper Arm Switching element Q15: non-conducting state
Second Lower Arm Switching Element Q16: non-conducting state
Alternating-Current-Side Buffer Switching Element Q17: non-conducting state In each of the embodiments, the controlling unit 50 may include circuitry including one or more processors that perform various processes according to computer programs (software). Further, the controlling unit 50 may include circuitry including one or more dedicated hardware circuits such as application specific integrated circuits (ASIC) that execute at least part of the various processes, or circuitry including a combination of the one or more processors and the one or more dedicated hardware circuits. The processor includes a CPU and memory such as a RAM, a ROM, and the like. The memory, which is a non-transitory computer readable memory medium, stores program codes or instructions configured to cause the CPU to execute processes. The memory includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power converter, comprising:
a transformer that includes a direct-current-side winding and an alternating-current-side winding;
a direct-current-side capacitor;
an alternating-current-side capacitor;
a direct-current-side circuit that includes a direct-current-side inductor, a rectification switching element, first and second direct-current connection terminals forming a pair, and a direct-current-side buffer circuit; and
an alternating-current-side circuit that includes first and second alternating-current connection terminals forming a pair, an alternating-current-side inductor, a first upper arm switching element, a second upper arm switching element, a first lower arm switching element, a second lower arm switching element, and alternating-current-side buffer circuit, wherein
a series connection of the first upper arm switching element and the first lower arm switching element and a series connection of the second upper arm switching element and the second lower arm switching element form a bridge circuit,
a node between the first upper arm switching element and the first lower arm switching element and a node between the second upper arm switching element and the second lower arm switching element are connected to each other via the first and second alternating-current connection terminals and the alternating-current-side inductor,
the direct-current-side buffer circuit includes a direct-current-side buffer switching element and a direct-current-side buffer capacitor,
the alternating-current-side buffer circuit includes an alternating-current-side buffer switching element and an alternating-current-side buffer capacitor and is connected in parallel with the bridge circuit,
the direct-current-side circuit is connected to the direct-current-side winding of the transformer via the direct-current-side capacitor, and
the alternating-current-side circuit is connected to the alternating-current-side winding of the transformer via the alternating-current-side capacitor.

2. The power converter according to claim 1, wherein
the first and second direct-current connection terminals are connected to a direct-current power supply,
the power converter is configured to convert a direct-current voltage provided by the direct-current power supply to an alternating-current voltage,
the direct-current-side inductor includes a first end and a second end,
the first end of the direct-current-side inductor is connected to the first direct-current connection terminal via the rectification switching element,
the second end of the direct-current-side inductor is connected to the second direct-current connection terminal, and
the direct-current-side buffer circuit is connected in parallel with the direct-current-side inductor.

3. The power converter according to claim 1, wherein
the first and second direct-current connection terminals are connected to a direct-current power supply,
the power converter is configured to convert a direct-current voltage provided by the direct-current power supply to an alternating-current voltage,
the rectification switching element includes a first end and a second end,
the first end of the rectification switching element is connected to the first direct-current connection terminal via the direct-current-side inductor, and
the second end of the rectification switching element is connected to the second direct-current connection terminal, and the direct-current-side buffer circuit is connected in parallel with the rectification switching element.

4. The power converter according to claim 1, wherein
the first and second alternating-current connection terminals are connected to an alternating-current power supply,
the power converter is configured to convert an alternating-current voltage provided by the alternating-current power supply to a direct-current voltage,
the direct-current-side inductor includes a first end and a second end,
the rectification switching element includes a first end and a second end,
the first end of the rectification switching element is connected to the first direct-current connection terminal via the direct-current-side inductor,
the second end of the rectification switching element is connected to the second direct-current connection terminal, and
the direct-current-side buffer circuit is connected in parallel with the rectification switching element.

5. The power converter according to claim 4, further comprising a controlling unit that is configured to control switching of the rectification switching element, the first upper arm switching element, the second upper arm switching element, the first lower arm switching element, the second lower arm switching element, the direct-current-side buffer switching element, and the alternating-current-side buffer switching element,
the controlling unit controls the switching so as to improve a power factor based on the alternating-current voltage of the alternating-current power supply and a current flowing through the alternating-current-side inductor.

6. The power converter according to claim 4, further comprising a controlling unit that controls switching of the rectification switching element, the first upper arm switching element, the second upper arm switching element, the first lower arm switching element, the second lower arm switching element, the direct-current-side buffer switching element, and the alternating-current-side buffer switching element, and the controlling unit controls the switching such that a specified direct-current voltage is output based on a voltage between the first and second direct-current connection terminals.

* * * * *